(12) United States Patent
Vrobel et al.

(10) Patent No.: US 6,781,597 B1
(45) Date of Patent: Aug. 24, 2004

(54) EDIT MODES FOR THREE DIMENSIONAL MODELING SYSTEMS

(75) Inventors: Patricia A. Vrobel, Roswell, GA (US); David G. Phelan, Marietta, GA (US); Tao-Yang Han, Marietta, GA (US)

(73) Assignee: Ironcad, LLC., Atlanta, GA (US)

( * ) Notice: Subject to any disclaimer, the term of this patent is extended or adjusted under 35 U.S.C. 154(b) by 0 days.

(21) Appl. No.: 09/425,988

(22) Filed: Oct. 25, 1999

(51) Int. Cl.$^7$ ............................................. G09G 5/00
(52) U.S. Cl. .................. 345/619; 345/652; 345/835; 345/848
(58) Field of Search ........................... 345/433, 652, 345/629, 848, 964, 649, 862, 835, 976, 619

(56) References Cited

U.S. PATENT DOCUMENTS

| | | | |
|---|---|---|---|
| 5,359,703 A | 10/1994 | Robertson et al. | 345/419 |
| 5,452,414 A | 9/1995 | Rosendahl et al. | 345/836 |
| 5,588,097 A | 12/1996 | Ono et al. | 345/653 |
| 5,734,805 A | 3/1998 | Isensee et al. | 345/419 |
| 5,861,889 A | 1/1999 | Wallace et al. | 345/619 |
| 5,894,310 A | 4/1999 | Arsenault et al. | 345/679 |

OTHER PUBLICATIONS

Shelton et al, Using Lotus 1–2–3 Release 2.2, Copyright 1991, Houghton Mifflin Company, Release 2.2p. 21, Moving One Cell at a Time.*

Newton, "Inside Generic CADD:, The Complete Tutorial and Reference to Affordable CADD!", © 1991, pp. 210–214.

Chapter 5, "Using Objects", *The Showplace Companion*, 1990, pp. 91–115.

U.S. patent application Ser. No. 09/135,818, filed Aug. 18, 1998, entitled "Three Dimensional Movement of Displayed Object" and references cited therein.

MetalMan 2.0 Technical Data Aid and Specification, Jul. 27, 1998.

SolidWorks 98 User's Guide, 1998, pp. 11–1–11–17.

CoCreate/Sheet Advisor Administration Guide, Oct. 6, 1998.

SolidWorks Tutorial, 1998, pp. 13–1–13–8.

Solid Edge User's Guide, Version 4, Chapter 2, "Working with Sheet Metal Parts in Solid Edge", pp. 50–57.

* cited by examiner

*Primary Examiner*—Matthew C. Bella
*Assistant Examiner*—Anthony Blackman
(74) *Attorney, Agent, or Firm*—Nixon & Vanderhye, P.C.

(57) ABSTRACT

A computer program product executes in a computer workstation according to methods of the invention to provide editing handles for solid shapes. The computer program provides a graphical user interface in the preferred form of an icon which is visually associated with a selected displayed solid shape and which, when activated via a user input device, toggles or cycles through plural editing modes of the displayed shape. In the plural editing modes, other graphical user interfaces which include editing "handles" can be utilized to perform various editing functions, the handles of each editing mode having functions dependent upon the respective editing mode. The editing handles themselves are subject to novel employments and manipulations in accordance with aspects of the present invention.

8 Claims, 45 Drawing Sheets

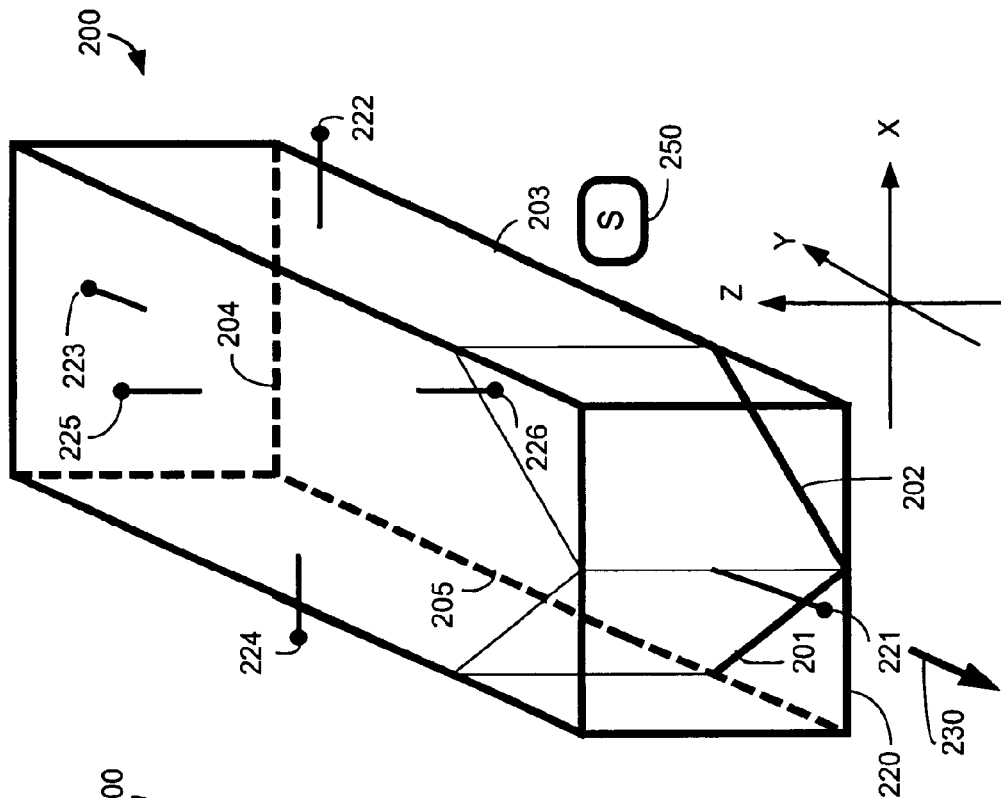
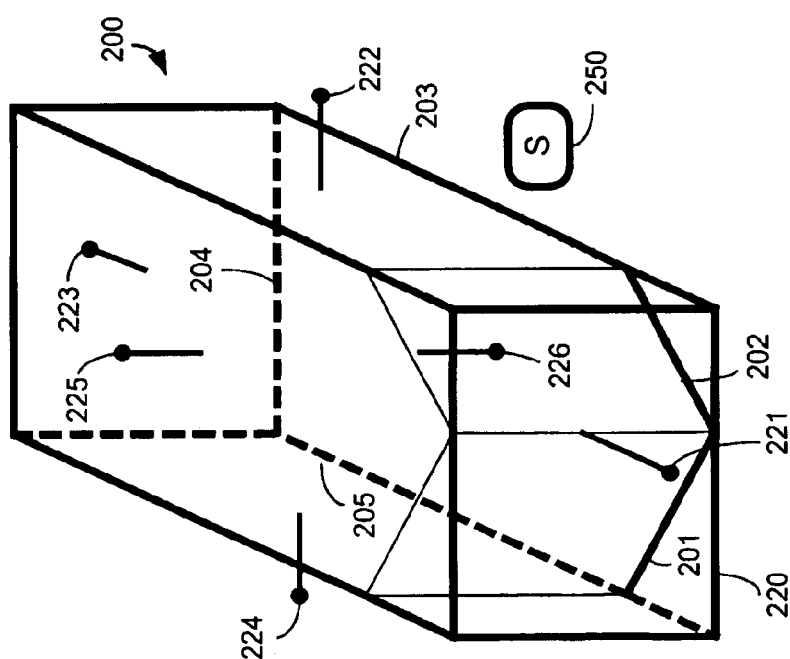
Fig. 3B
Fig. 3A

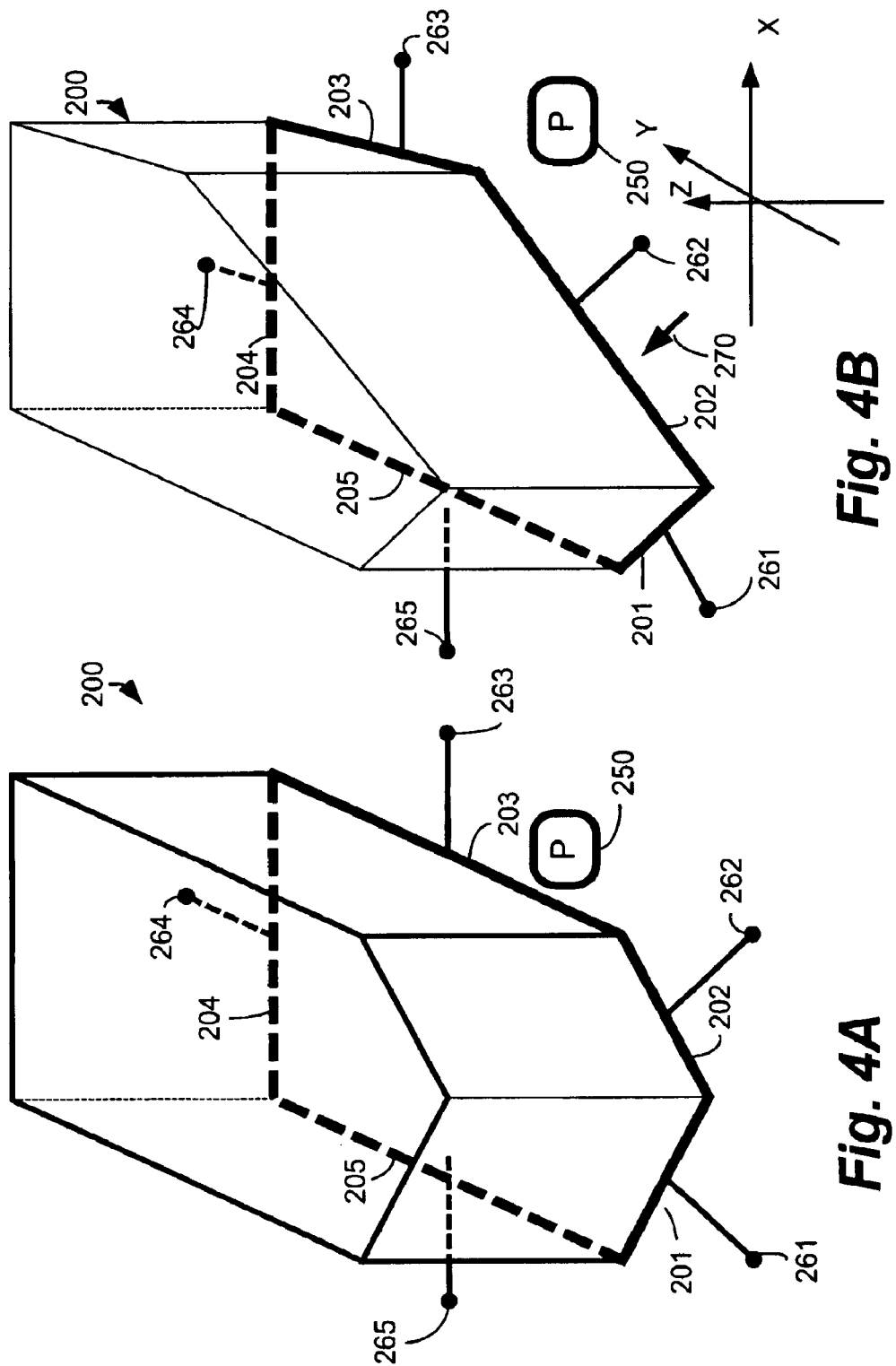

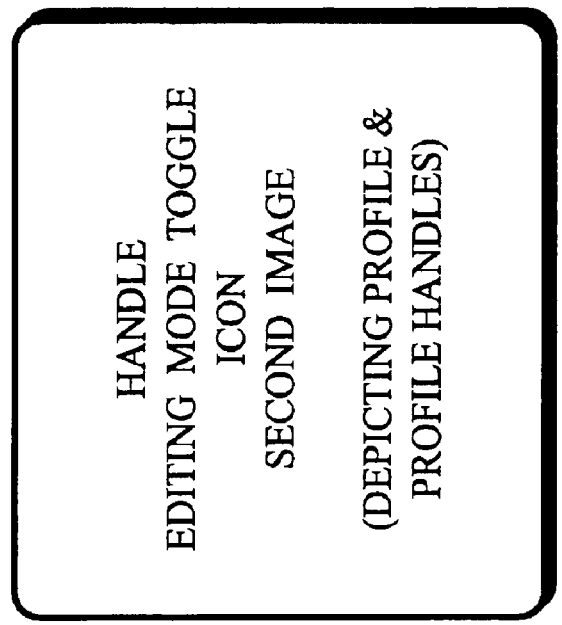
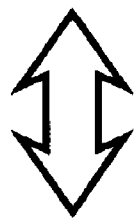
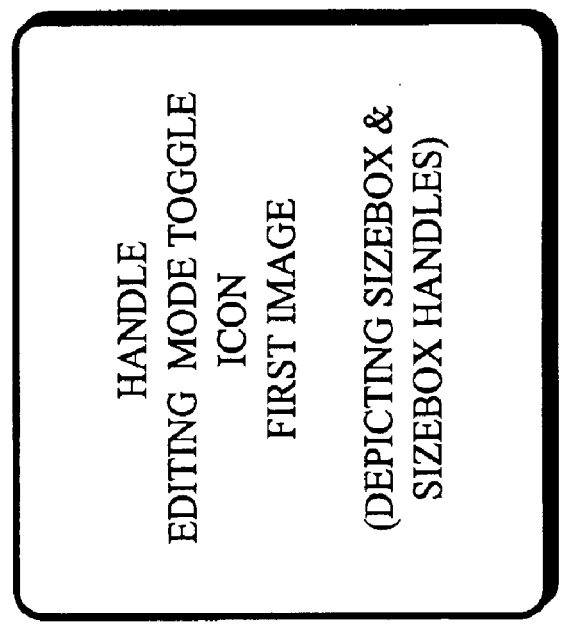
Fig. 5

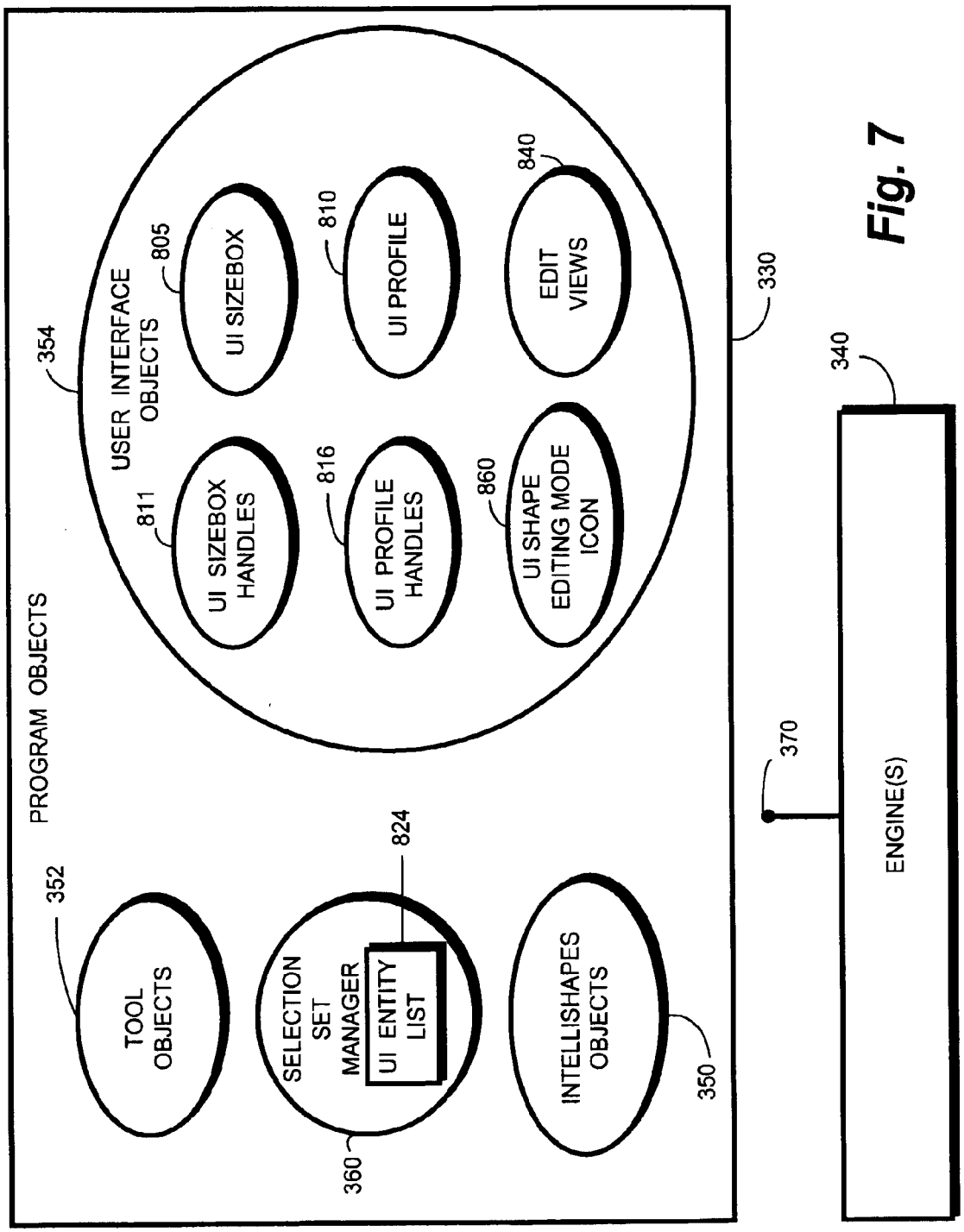

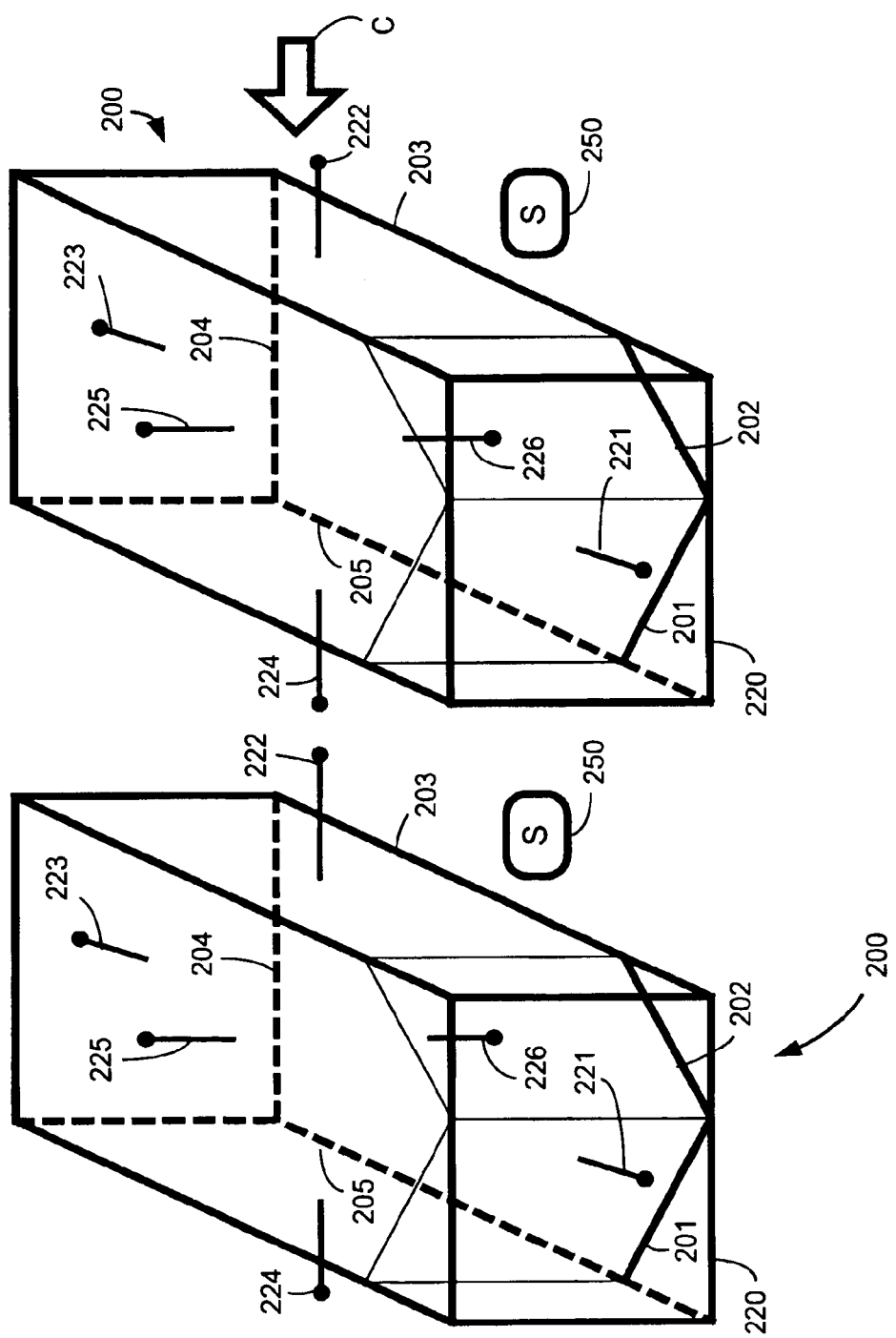

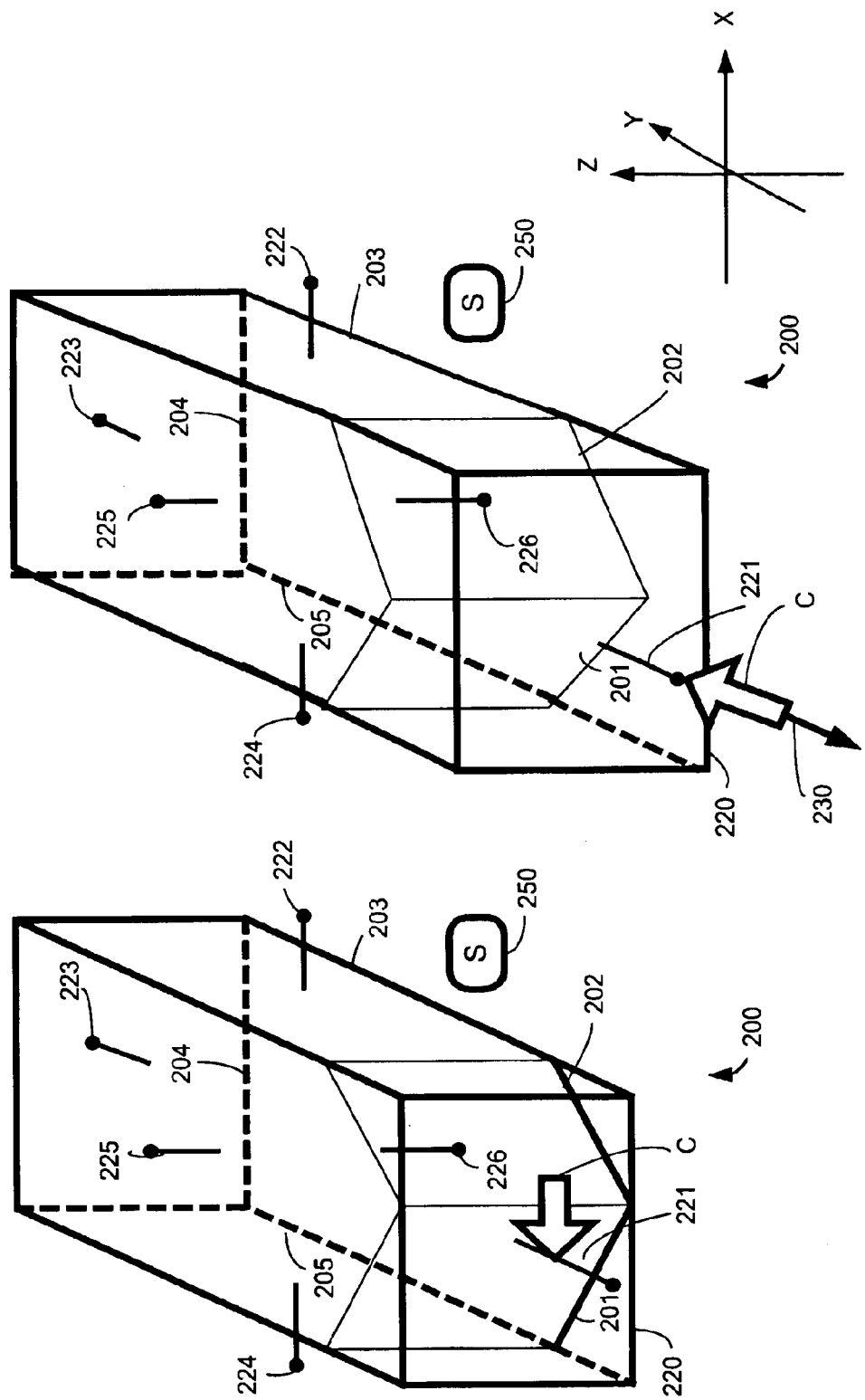

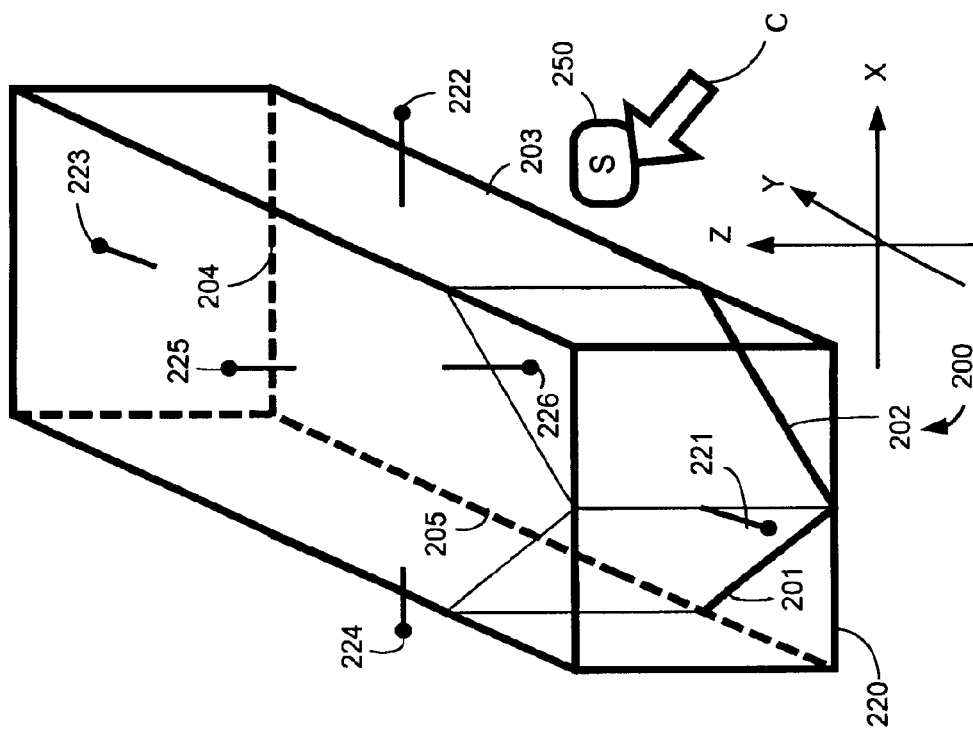
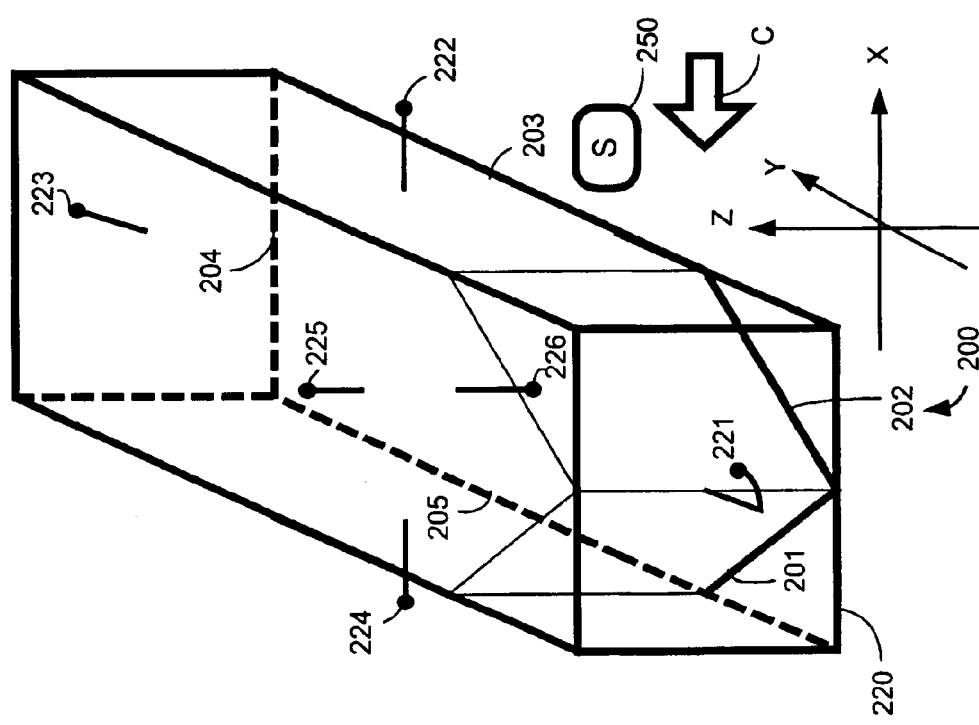

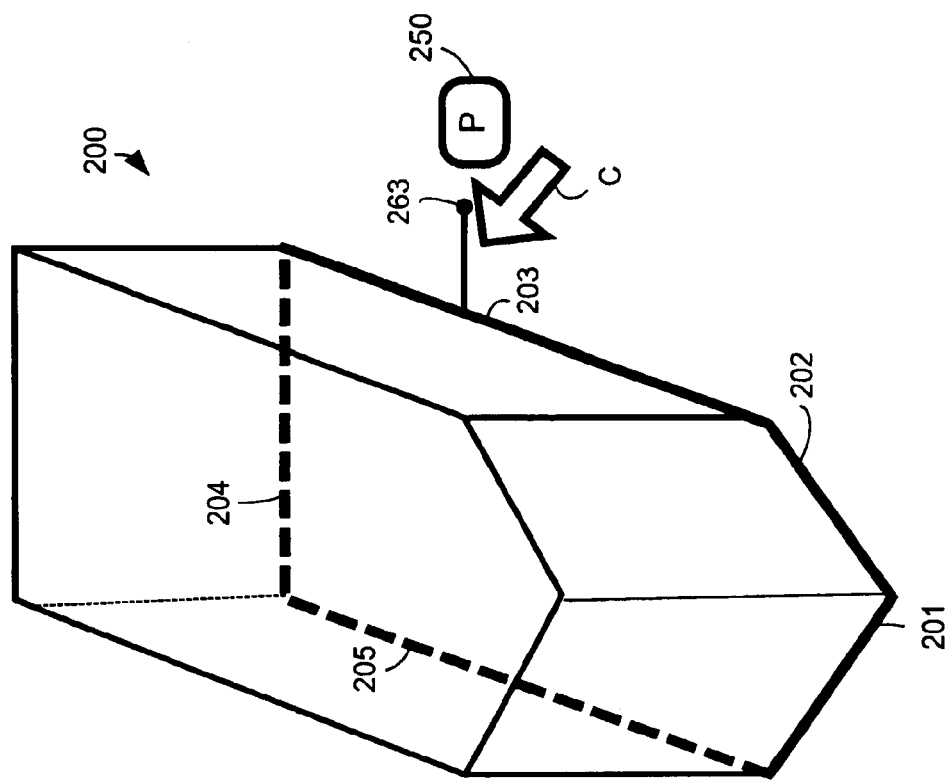
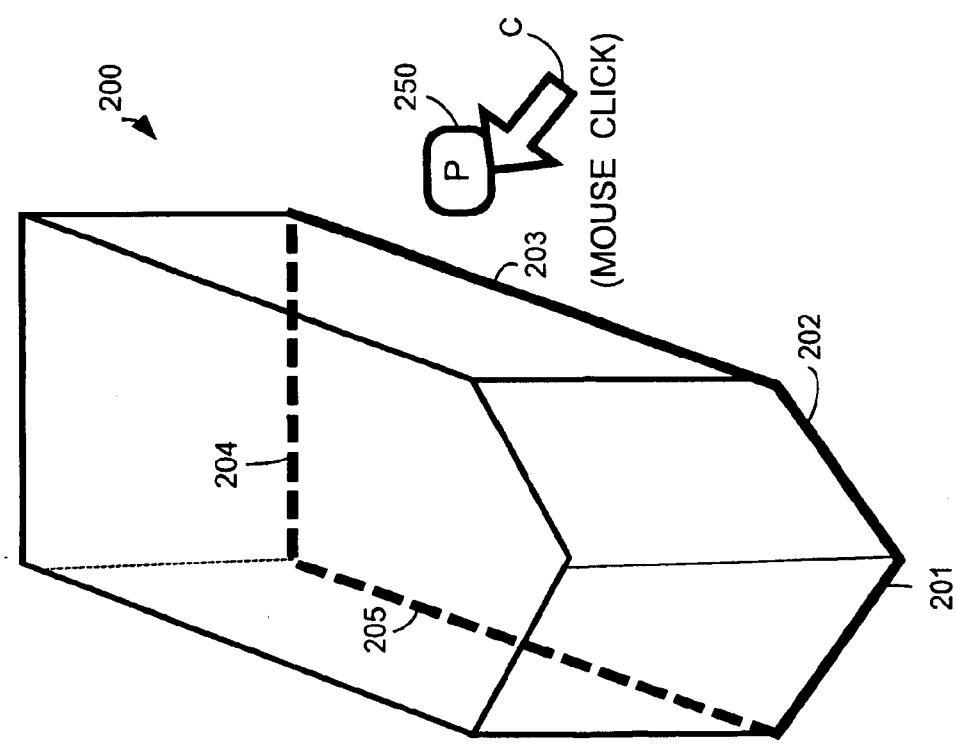
Fig. 11H
Fig. 11G

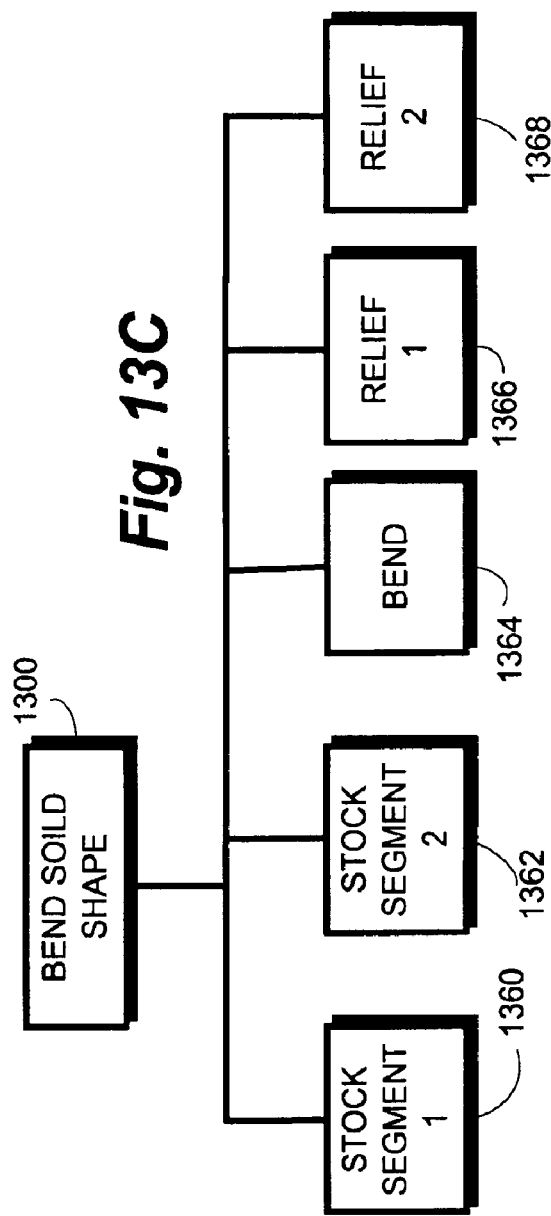

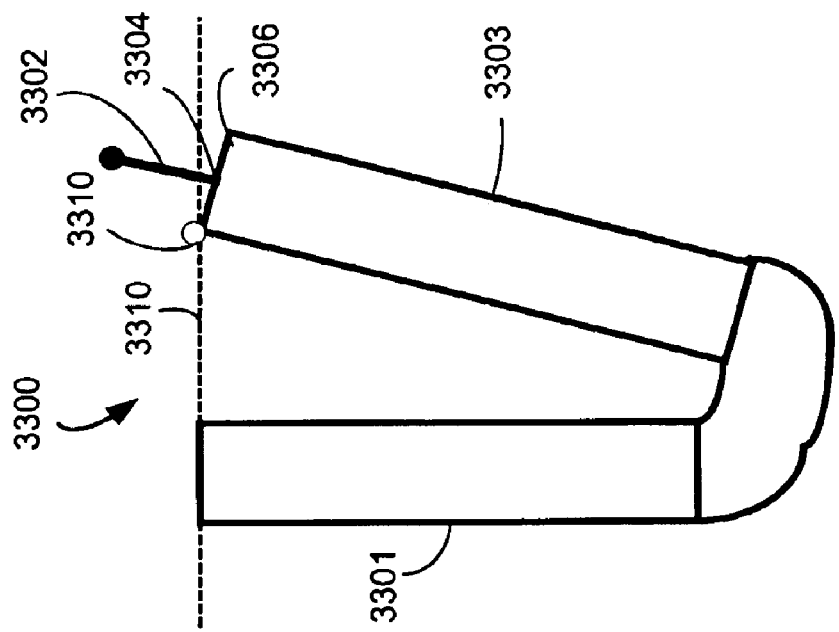
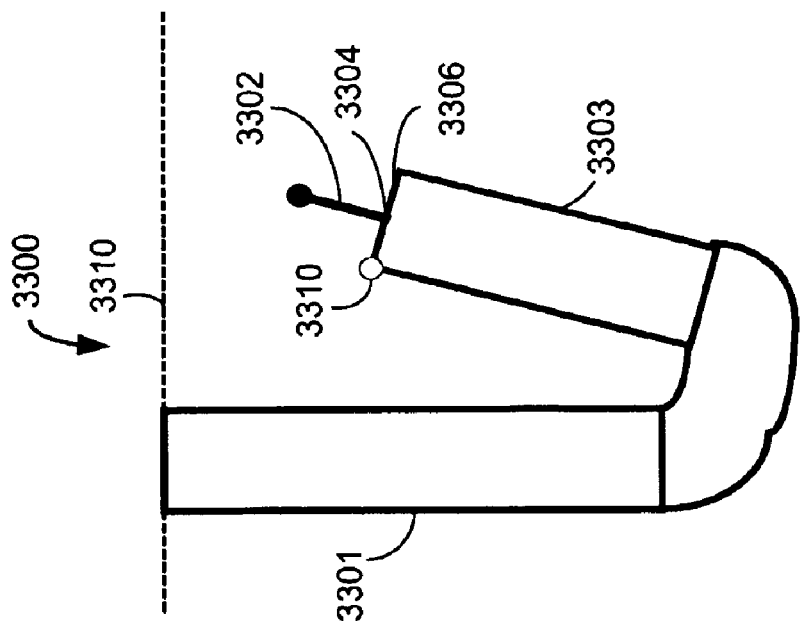

EDIT MODES FOR THREE DIMENSIONAL MODELING SYSTEMS

This application is related to simultaneously filed U.S. patent application Ser. No. 09/425,987, entitled "Sheet Metal Geometric Modeling System", which is incorporated herein by reference.

BACKGROUND

1. Field of the Invention

The present invention pertains to computerized three dimensional geometric modeling systems, and particularly to the editing of solid shapes.

2. Related Art and Other Considerations

The computer has greatly affected essentially all forms of information management, including the geometric modeling arts. Nowadays there are numerous computer program products that allow the user to create, store, and modify geometric models and their graphical renderings of various types on a display screen, and to print or otherwise output such geometric models and their renderings. Such geometric models and their graphical renderings span the gambit from simple to complex, and can vary in subject matter, e.g., artistic, industrial, etc. Some geometric modeling computer program products are two dimensional, providing only length and width dimensions of objects. The more complex three dimensional computer program products, on the other hand, provide three dimensions—length, width, and depth/thickness.

Three dimensional geometric modeling programs can generate a scene or part which can comprise one or more constituent 3D solid shapes. For example, a scene or part featuring a simple table would comprise a solid shape for each leg of the table, as well as a solid shape for a flat table top. Thus, solid parts can be formed from other solid parts. In geometric modeling terms, the building of more complicated solid shapes in hierarchical fashion from simpler solid shapes (known as "primitives") is known as "constructed solid geometry" ("CSG"). The simpler solid shapes can be combined using various operations (e.g., Boolean operations such as "and", "or", "not", etc.). The computer stores the overall (complex) solid shape as a tree, each of the "leaves" of the tree comprising a primitive solid shape.

In one example geometric modeling computer program which is object-oriented, an executable object is used to define and generate each solid shape. The object for each solid shape can have several associated components, the components being a combination of executable code and data structure. Examples of such components are a boundary representation ("B-rep") component (having a data structure describing the geometry and topology data for the solid shape [e.g., length, width, depth, and coordinates of the solid part], a history/creation component (which includes data which indicates an order or chronological sequence of steps employed to construct the solid shape), a visual component; a physical component; a functional component; and a behavioral component. Other example components, and the employment of components generally, are described in U.S. Pat. No. 5,894,310, entitled "Intelligent Shapes For Authoring Three-Dimensional Models", incorporated herein by reference.

One of the components described in U.S. Pat. No. 5,894,310 is a sizebox component. In U.S. Pat. No. 5,894,310, once a solid shape has been selected by a user with a mouse cursor or the like, the sizebox component for the shape is accessed. The sizebox component specifies the dimensions of the maximum extent of the corresponding selected solid shape, and thus defines a parallelpiped (e.g., a box) in space that may enclosed the selected shape. A sizebox is drawn around the selected shape. The sizebox includes handles displayed on each of the six faces of the sizebox. The user can use a drag technique to pull or move a handle to change an associated sizebox dimension, and in response the dimension of the displayed solid shape is correspondingly changed graphically as the sizebox handle is moved in one direction or the other.

U.S. Pat. No. 5,894,310, entitled "Three Dimensional Computing Graphics Tool Facilitating Movement of Displayed Object", incorporated herein by reference, discloses a graphics tool, commercially known as the TriBall®, which facilitates positioning of a selected solid shape or solid part. The tool includes a displayed object reference frame which takes the form of a spherical countour line and various handles. The handles of the object reference frame include both object image handles (classified as both planar and knob handles) and frame handles. The object image handles are used to position the object for which the tool was selected, the frame handles facilitate movement of the tool relative to the displayed selected object. When a mouse pointer is near one of the handles, the mouse pointer can change its appearance, and selected geometry of the tool can be highlighted. Certain enhancements to this graphics tool are described in U.S. Pat. No. 6,295,069, which is also incorporated herein by reference.

Solid shapes typically have one or more profiles. Profiles are two dimensional shapes that can be extruded, spun, lofted, or swept to form a three dimensional solid shape. The profile information is typically included in one of the components of the is solid shape, e.g., the profile component.

When a user designs a new solid shape, the profile shape that is used for generating the new solid shape is typically much more irregular and complex than a simple rectangular profile. When a user resizes a shape that has a rectangular profile, the sizebox handles behave very nicely and give the user what is expected. However, with solid shapes that have irregular or complex profiles, using the sizebox handles will resize the shape, but with the side effect of stretching the curves or paths of the profile such that the curves or paths more or change undesirably. Therefore, although the overall sizebox of a solid shape could be changed by manipulation of sizebox handles as described above, heretofore it has not been possible to edit the profile information without the user entering a special editing mode. In other words, previously the user had to terminate the current mode of operation and select a special button or the like for entering a two-dimensional editing mode. The two-dimensional editing mode had its own characteristic operations which facilitated editing of the profile information. Upon completion of the profile editing, the user had to perform a separate step of exiting the editing mode before continuing work on the solid shape or part in a three dimensional mode. What is desired is that users can quickly adjust the position of the underlying geometry without having to enter a two dimensional editing mode.

What is needed, therefore, and an object of the present invention, is a three dimensional computer aided geometric modeling system which effectively and efficiently allows plural editing modes in a three dimensional graphical context.

BRIEF SUMMARY OF THE INVENTION

A computer program product executes in a computer workstation according to methods of the invention to provide editing handles for solid shapes. The computer program provides a graphical user interface in the preferred form of an icon which is visually associated with a selected displayed solid shape and which, when activated via a user input device, toggles or cycles through plural editing modes of the displayed shape. In the plural editing modes, other graphical user interfaces which include editing "handles" can be utilized to perform various editing functions, the handles of each editing mode having functions dependent upon the respective editing mode. The editing handles themselves are subject to novel employments and manipulations in accordance with aspects of the present invention.

The toggled or cycle graphical user interface, known as a shape editing mode icon, is used to cycle or toggle through plural editing modes of a selected displayed shape. The number and nature of the editing modes for a solid shape depend upon the type of solid shape that is selected. For example, an extruded solid shape may have a first edit mode being a sizebox edit mode (for editing dimensions of a maximum extent of the displayed shape) and a second edit mode being a profile edit mode (for editing the profile that is extruded to form the solid shape). For a bend shape such as utilized for sheet metal work, one of the editing modes can be used for editing one of a distance, angle, and radius of the bend solid shape, and another editing modes can be used to edit a relief feature of the bend solid shape.

When entered, most of the plural editing modes generate their own graphical user interfaces, with those graphical user interfaces having plural members known as editing "handles". For example, the sizebox editing mode generates a sizebox graphical user interface having, in addition to a six-faced sizebox displayed for the selected displayed solid shape, six sizebox handles for the respective six faces of the sizebox. Similarly, toggling to the profile editing mode generates a graphical user interface depicting each of the segments or paths of the profile that is extruded or otherwise utilized to form the solid shape, as well as an associated profile handle for each segment or path. As illustrated herein, one example embodiment of a handle has an attachment point or base point relative to the displayed object, a handle knob which can be grasp by the user input device (cursor), and a handle stem which connects the handle attachment point to the handle knob.

In accordance with one aspect of the present invention, the editing handles of at least some of the graphical user interfaces of the various editing modes are not displayed until a cursor roams into a neighborhood of each handle. In other words, an editing handle is displayed only when the cursor is nearby, and only one editing handle is displayed at a time.

The invention provides various techniques for directly positioning or aligning a selected handle with other features. For example, the handle and the displayed object associated therewith are directly moveable so that (1) when a point is selected, the handle becomes coincident with the selected point; or (2) when a center point of a face of a solid shape is selected, the handle becomes aligned with the center point of the face of the solid shape.

In accordance with yet another direct movement technique of the invention known as Direct SmartSnap™, when the user input device is utilized to select a handle and the selected handle is subsequently dragged across a scene shown on the display device, features of the scene having one or more predetermined relationships with positions on the scene through which a snap point of the handle is dragged are sequentially highlighted for visual feedback. Moreover, upon occurrence of a prescribed action of the user input device the handle is aligned with a last of the sequentially highlighted features. The predetermined relationships include a feature being hit or having a projection which is hit by the dragged handle.

The computer program also provides yet other features for various editing handles. These features include (1) the ability of a user to specify an offset distance to move a selected handle relative to a chosen point; (2) the ability for the user to specify a snap point other than the default snap point; (3) the ability of the user to orient the handle away from its default orientation; and (4) the display of dimensional feedback. In the illustrated embodiment, the features are particularly implemented with respect to profile handles.

In accordance with the offset distance specification feature of the invention, after a point in a scene depicted on the display device has been selected by the user input device, the program provides visual feedback regarding a distance currently separating the selected point and the handle. Advantageously, the program provides means for the user to input a new distance to be used for separating the selected point and the handle, and in response to input of the new distance the program displays the selected point and the handle as being separated by the new distance.

The orientation of the handle stem is selectively adjustable as follows: (1) to be aligned with an imaginary line connecting the handle attachment point and a point specified by the user input device; (2) to be aligned with an imaginary line connecting the handle attachment point and a center point of a face of a displayed object specified by the user input device; (3) to be aligned with an imaginary line connecting the handle attachment point and two points specified by the user input device; (4) to be parallel with a selected edge of a displayed object as specified by the user input device; (5) to be perpendicular to a selected edge of a displayed object as specified by the user input device; (6) to be perpendicular to an axis of a selected face of a displayed object as specified by the user input device.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 3A is an isometric view of the three dimensional solid shape of FIG. 2 along with its displayed sizebox.

FIG. 3B is an isometric view showing how the sizebox can be utilized to adjust a dimension of the three dimensional solid shape of FIG. 2.

FIG. 4A is an isometric view of the three dimensional solid shape of FIG. 2 along with its displayed profile handles.

FIG. 4B is an isometric view showing how the profile handles can be utilized to change the profile of the three dimensional solid shape of Fig. SRN-1.

FIG. 5 is a diagrammatic view depicting toggling of a user interface device between two editing states.

FIG. 7 is a diagrammatic view showing elements of an executable program of the computer geometric modeling workstation of FIG. 1.

FIG. 11A–FIG. 11J are isometric views of a selected solid shape reflecting display of features resulting from various manipulations of a cursor by a user.

FIG. 13A is a side view of a sheet metal bend solid shape in accordance with an embodiment of the invention.

FIG. 13B is an isometric view of the sheet metal bend solid shape of FIG. 13A as attached to a target sheet metal solid shape.

FIG. 13C is a diagrammatic view of a CSG tree for the sheet metal bend solid shape of FIG. 13A and FIG. 13B.

FIG. 33A–FIG. 33D are diagrammatic views showing advantages of Set Handle Snap Point operations of the present invention.

DETAILED DESCRIPTION

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
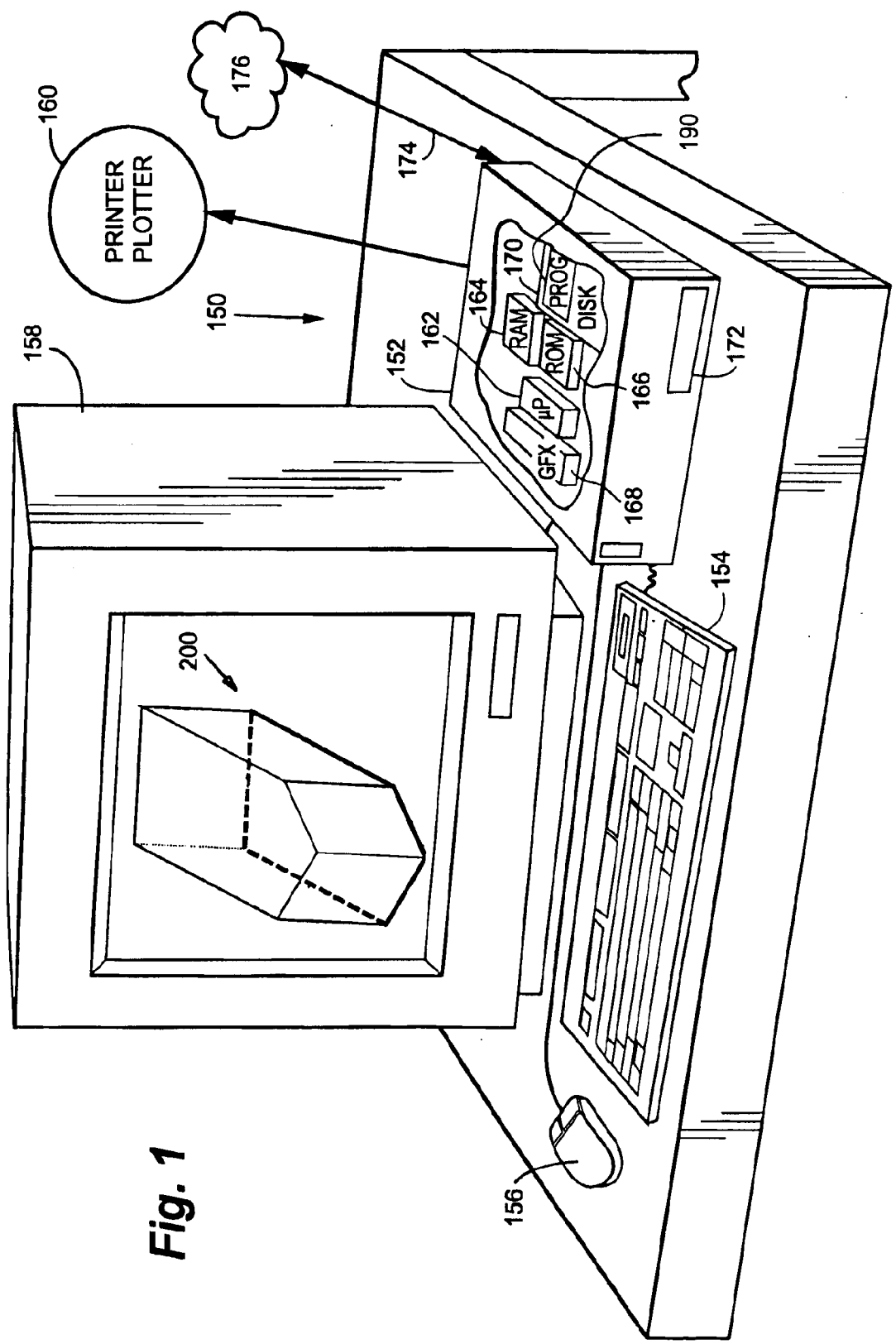
FIG. 1 is a schematic view of an example computer geometric modeling workstation according to an embodiment of the invention.

FIG. 1 shows an example computer graphics workstation 150 accordingly to an embodiment of the invention. Workstation 150 includes a general purpose computer 152, a keyboard 154, a mouse pointing device 156, a display 158, and a printer/plotter 160. Computer 152 may be, for example, a conventional microcomputer such as an IBM compatible personal computer including a microprocessor 162, random access memory 164, read only memory 166, a graphics video adapter 168, a mass storage device such as a magnetic disk 170, and an optical and/or floppy diskette drive 172. Computer 152 displays images on display 158 (and/or prints the images on printer/plotter 160) in response to user inputs via keyboard 154 and/or mouse pointing device 156. The computer 152 creates images based on steps it performs under control of a computer program product 190 stored on mass storage device 170 and/or another storage media (e.g., an optical or magnetic disk, not shown) provided via drive 172. Program 190 is executed by microprocessor 162. A communications connection 174 between computer 152 and a network 176 (e.g., the Internet) may be provided to allow the user to access information from the network and/or exchange information with another computer also connected to the network.

Upon start up the three dimensional geometric modeling program generates a screen which includes various tool bars and a catalog browser for browsing a set of catalogs. The catalogs included in the set are identified by catalog tabs. Each catalog includes icons corresponding to solid shapes which can be selected and positioned (clicked, dragged and dropped) into a scene or assembly being created in a work space portion of the screen. The solid shape 200 shown in FIG. 2 is an example solid shape which can be created or dragged and dropped into the work space portion of the screen.

Figure 2:
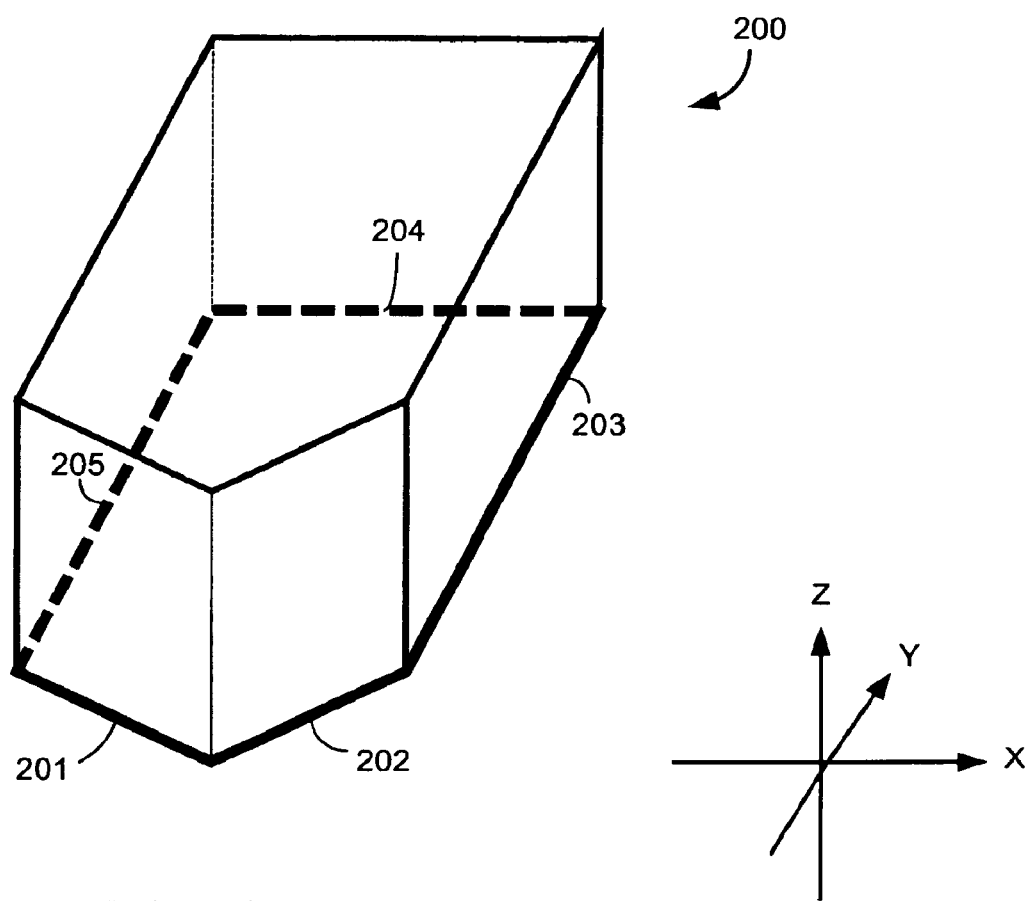
FIG. 2 is an isometric view of a selected three dimensional solid shape.

The solid shape 200 shown in FIG. 2 is formed by a five-sided two-dimensional polygon (formed in the X-Y plane of FIG. 2) which has been extruded (e.g., along the Z axis of FIG. 2). The five segments of the five-sided two-dimensional polygon, labeled as segments or paths 201–205 in FIG. 2, form the profile for solid shape 200.

As shown in FIG. 3A, when solid shape 200 is selected (e.g., at a shape level), a sizebox 220 appears on the display for solid shape 200. As explained before, as visually displayed the sizebox is a parallelpiped having dimensions of the maximum extent of the corresponding selected solid shape, and as such is depicted graphically as a box in space that encloses the selected shape. In FIG. 3A, sizebox 220 is shown with bold lines (in contrast to the fainter lines of solid shape 200). Further, the sizebox has auxiliary features including graphically depicted handles 221–226.

The "handles" described herein, such as sizebox handles 221–226 as well as other types of handles including profile handles and sheet metal bend solid shape handles, are each a graphical user interface being displayed as having an attachment point or base point relative to the displayed object (e.g., the displayed object itself, its sizebox, or its profile), a handle knob, and a handle stem which connects the handle attachment point to the handle knob.

The sizebox handles 221–226 are located centrally on each of the six perpendicular faces of the sizebox. As seen in FIG. 3A, sizebox handle 221 is on the front face of sizebox 220, handle 222 is on the right side face, handle 223 is on the rear face; handle 224 is on the left side face; handle 225 is on the top face, and handle 226 is on the bottom face of sizebox 220.

Accompanying sizebox 220, upon selection of any solid shape, is an editing mode graphical user interface visually associated with the selected shape. In the illustrated embodiment, the editing mode graphical user interface takes the form of shape editing mode icon 250. At the time shown in FIG. 3A for solid shape 200, the shape editing mode icon 250 includes an image with the letter "S" to indicate that a sizebox editing mode is in effect. Of course, the present invention is not limited to a display of the letter "S" in the shape editing mode icon 250, as other suitable letters or pictorial representations can be depicted in the icon.

FIG. 3B shows that, when the sizebox editing mode is in effect, the handles of sizebox 220 can be dragged or otherwise moved by its sizebox handles 221–226 in order to change the extent of solid shape 200 along one of the axes of the shape's local Cartesian coordinate system. In the particular example shown in FIG. 3B, the sizebox handle 221 has been dragged in the direction of the −Y axis as depicted by arrow 230, with the result that solid shape 200 is more elongated along the Y axis in FIG. 3B than in FIG. 3A.

The present invention advantageously provides other shape editing modes for a solid shape or solid part in addition to the sizebox editing mode, and allows for a cycling or toggling between the plural shape editing modes by user interaction with shape editing mode icon 250. For example, FIG. 4A shows that a shape profile editing mode can be entered by user interaction with (e.g., mouse clicking on) shape editing mode icon 250. Toggling or cycling from the sizebox editing mode to the shape profile editing mode is reflected by shape editing mode icon 250 changing its image or representation from the letter "S" to the letter "P" (or some other suitable letter or pictorial representation for the shape profile editing mode). FIG. 4 particularly shows solid shape 200 in the shape profile editing mode wherein the profile of solid shape 200 is highlighted (e.g., segments or paths 201–205) and profile handles 261–265 are provided. The profile handles 261–265 are preferably connected to the midpoints of respective segments or paths 201–205 and extend perpendicularly from the respective segments or paths 201–205, with each of the profile handles 261–265 having a knob or bulb at distal ends thereof. The profile handles 261–265 are not automatically displayed upon entering the shape profile editing mode, but rather are displayed in response to cursor roaming proximate the respective positions of the profile handles 261–265. For this reason, the profile handles 261–265 are shown in phantom lines in FIG. 4A to indicate location of the potential displayable profile handles 261–265. The profile handles 261–265 are not displayed on the scene in phantom lines; rather the phantom lines in FIG. 4A are employed in the drawings merely to depict locations where profile handles 261–265 can be displayed.

FIG. 4B, in contrast to FIG. 4A, shows how (in the shape profile editing mode) the profile of solid shape 200 can be editing or modified using the profile handles 261–265. In particular, FIG. 4B shows that profile handle 262 has been displaced (e.g., dragged by the mouse) in the direction of arrow 270. Movement of profile handle 262 in the direction of arrow 270 profoundly influences the geometry of solid shape 200 in a manner incapable by utilization of sizebox 220. Thus, the shape profile editing mode has advantages and capabilities distinct from the sizebox editing mode.

Advantageously, the changing from the sizebox editing mode to the shape profile editing mode is simply implemented by the user selecting or again activating (e.g., clicking via the mouse) the shape editing mode icon 250. For example, as depicted by FIG. 5, if the sizebox editing mode is current (as evidenced by the display on shape editing mode icon 250 indicative of the sizebox editing mode [e.g., the letter "S" or other indicator]), then clicking on shape editing mode icon 250 causes a toggling, switching, or cycling to the shape profile editing mode as indicated by the doubleheaded arrow in FIG. 5. In the shape profile editing mode the shape editing mode icon 250 has a display indicative of the shape profile editing mode [e.g., the letter "P" or other indicator]. Conversely, if the shape profile editing mode is current, the user can revert back to the sizebox editing mode by clicking on shape editing mode icon 250.

For simplicity, two shape editing modes have been discussed in the context of the illustrated example. It should be understood, however, that other shape editing modes can be implemented according to the same principles discussed above. In such case, the clicking or activation of the shape editing mode icon 250 could cycle through three or more shape editing modes. While examples of the sizebox editing mode and the shape profile editing mode have been specifically discussed and illustrated, other modes can be implemented either as substitutions or additions to one or more of these illustrated modes. For example, other shape editing modes can certain editing modes for bend solid shapes, as described hereinafter.

Figure 6A:
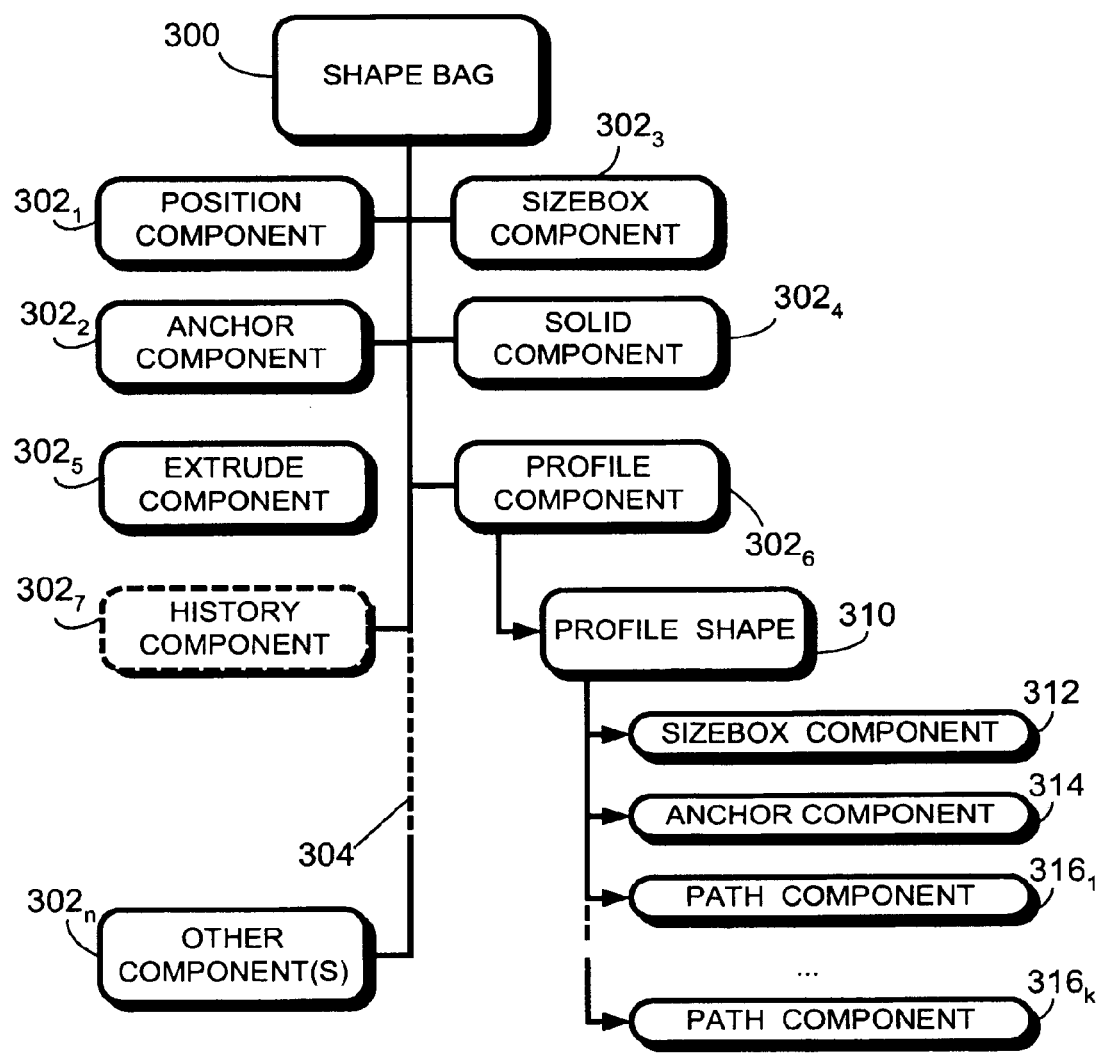
FIG. 6A is a diagrammatic view showing selected shape program objects associated with a displayed solid shape.

On example implementation of the present invention occurs in context of the object-oriented computer program 190. The computer program 190 governs and executes both the sizebox editing mode (e.g., generating sizebox 220 and its sizebox handles 221–226) and the shape profile editing mode (e.g., generating the profile and profile handles 261–265). In this regard, as understood from U.S. No. Pat. 5,894,310, entitled "Intelligent Shapes For Authoring Three-Dimensional Models", each solid shape has plural program objects. As shown in FIG. 6A, for example, solid shape 200 has a shape bag program object 300 and plural components $302_1$–$302_n$. Each component is a program object, with the type and number of components for a solid shape depending on the nature of the particular solid shape.

As employed herein, shape bag 300 is a program object that holds onto (e.g., has a memory pointer to) an interface for components (e.g., components $302_1$–$302_n$) utilized for the solid shape. The shape bag program object 300 and components $302_1$–$302_n$ are shown as communicating over a bus 304. Certain components illustrated for solid shape 200 in FIG. 6A include position component $302_1$, anchor component $302_2$, sizebox component $302_3$, solid component $302_4$, extrude component $302_5$, profile component $302_6$, and other components (some of which are collectively represented as component $302_n$).

It should be understood that other types of solid components (e.g., loft, spin, sweep) can exist for other types of solid shapes. Moreover, the particular solid shape 200 shown in FIG. 2 does not necessarily require a history component, but could do so if solid shape 200 were formed from a child shape. Although solid shape 200 does not include a history component, history component $302_7$ is illustrated in phantom lines in FIG. 6A just to advise the reader that some solid shapes and solid parts do have such a history component.

Since the particular solid shape 200 shown in FIG. 2 is an extruded solid shape, the profile component $302_6$ holds onto a profile shape 310. The extrude solid component $302_5$ holds onto parameters that define the extrusions such as extrude height. The profile shape 310 in turn has its own components, including sizebox component 312 and anchor component 314 as well as plural profile path components $316_1$–$316_k$. For solid shape 200, there are five profile path components $316_1$–$316_5$ (i.e., k=5), corresponding to profile paths or segments 201–215, respectively, shown in FIG. 2.

FIG. 7 shows various elements of program 190 for the computer geometric modeling workstation of FIG. 1. In a general sense, computer program 190 is divided into a collection 330 of program objects and one or more engine(s) 340. The collection 330 of program objects includes a collection of program objects for various solid shapes (e.g., Intellishapes program objects 350), as well as various tool program objects 352; a main user interface program object 354; and a selection set manager 360 discussed hereinafter. The Intellishapes program objects 350 include program objects such as those shown in FIG. 6A for solid shape 200, and include memory persistent versions of solid shapes for which an icon exists in a shape catalog as well as instantiated program objects for solid shapes actually dragged or created in a scene or assembly displayed on the screen of the workstation. The main user interface program object 354 acts as a wrapper when a solid shape is selected, and controls and manages highlighting and interactivity by owning a list of sub-user interface objects such as those encompassed by the oval depicted as 354 in FIG. 7. Examples of user interface program objects managed and controlled by main user interface program object 354 are described subsequently.

Although not illustrated as such, the engine(s) 340 can include various types of engines, such as one or more shape engines, modeling engines, and rendering engines. A shape engine is invoked by a scene document to generate an in-memory instance of a solid shape program object corresponding to a solid shape icon selected from a catalog by the user. The modeling engine can be invoked by a newly created shape program object to construct, e.g., a B-rep and facets for the newly created solid shape. The rendering engine can be invoked by the newly solid shape for displaying of itself on the screen.

The engine(s) 340 and various program objects in collection 330 communicate with each other over interfaces, such as a component object model (COM) interface. Details of component object modeling and the operation of the COM Interfaces as implemented by computer program 190 are understood by those skilled in the art, particularly with reference to such publications as Rogerson, Dale, Inside COM (Microsoft Press, 1997), ISBN 1-57231-349-8. One such COM interface is represented by symbol 370 in FIG. 7.

As will be understood from the ensuing discussion, upon selection of a solid shape or solid part (e.g., a mouse click on the solid shape or solid part by a user), various user interface program objects (managed by main user interface program object 354 of FIG. 7) are also created and have a correspondence with the selected solid shape or solid part. For example, generation of the sizebox 220 in the sizebox editing mode and generation of the profile highlight and profile handles 261–265 in the shape profile editing mode result from creation of certain user interface program objects for a selected shape, as described below.

Figure 8:
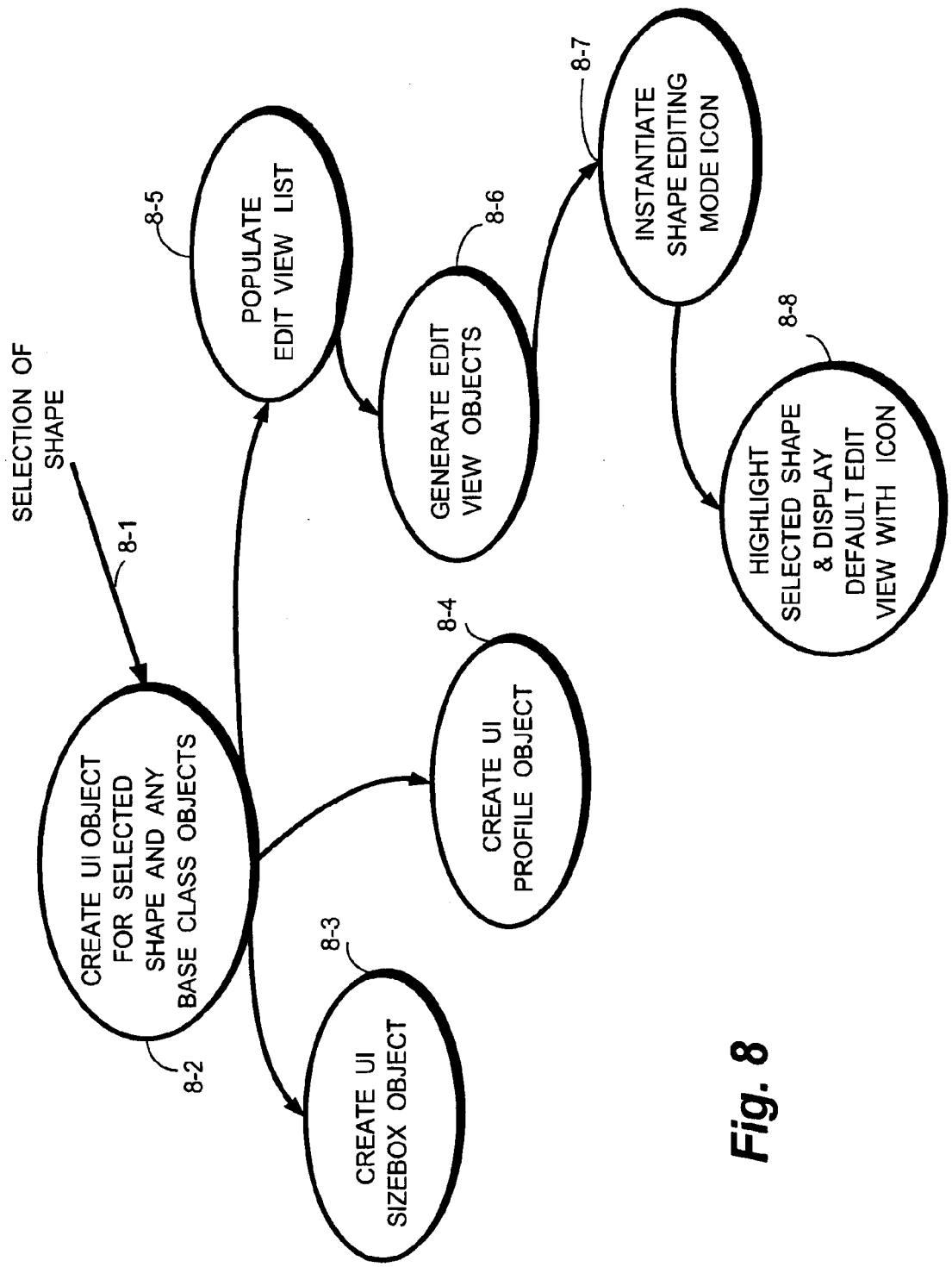
FIG. 8 is a diagrammatic view showing basic example actions involved with commencing a shape editing procedure in accordance with the invention.

FIG. 8 shows basic example actions involved with commencing a shape editing procedure. Action 8-1 shows a user selecting, via mouse click or otherwise, a particular solid shape already displayed on the screen of the workstation (e.g., solid shape 200 of FIG. 2). As evident from the remainder of FIG. 8, the selection of a displayed solid shape initiates creation of an entire set of further program objects which correspond to the selected displayed solid object. Whereas the displayed solid object already has one or more associated program objects such as those shown in FIG. 6A, the selection of an object as depicted by action 8-1 results in creation of user interface program objects which facilitate the various edit modes associated with the selected solid shape. The one or more associated program objects like those of FIG. 6A are hereinafter referred to as data objects, and remain in existence (in Intellishapes program objects 350) as long as the corresponding solid shape is included in the scene or assembly depicted on the screen. The user interface program objects, hereinafter referred to as user interface or UI objects, are created and remain in existence (managed by main user interface program object 354 [see FIG. 7]) only while the corresponding solid shape is selected. Upon de-selection of the solid shape, all user interface objects for the solid shape are destroyed. Therefore, the UI objects are ephemeral.

Upon the shape selection of action 8-1, the computer program 190 performs action 8-2 (see FIG. 8). As part of action 8-2, certain UI objects are created for the selected solid shape. Upon shape selection, selection set manager 360 looks at data in the Intellishapes program object (in the set of objects 350) to determine what type of solid shape was selected. The type of solid shape selected influences what type of UI objects are to be created at action 8-2. In particular, when solid shape 200 (which is an extruded solid part) is selected, in action 8-2 the selection set manager 360 determines that solid shape 200 is an extrude solid shape, and accordingly UI solid (extrude) shape 803 (hereinafter also termed UI Extrude Shape 803) is created. UI Extrude Shape 803, managed by main user interface program object 354, has a correspondence to the solid extrude shape (shape bag) 300 in Intellishapes program objects 350.

In view of the object-oriented nature of computer program 190, any higher class (e.g., base class) objects for UI Extrude Shape 803 are also created as part of action 8-2. In the particular illustrated scenario, as part of action 8-2 UI Shape object 800 and UI Event Object 801 are also created as base class objects for UI Extrude Shape 803 (see FIG. 6B), with UI Event Object 801 being the lowest level of base class object. The UI Extrude Shape 803 inherits functionality from its base class objects UI Shape object 800 and UI Event Object 801.

Figure 6B:
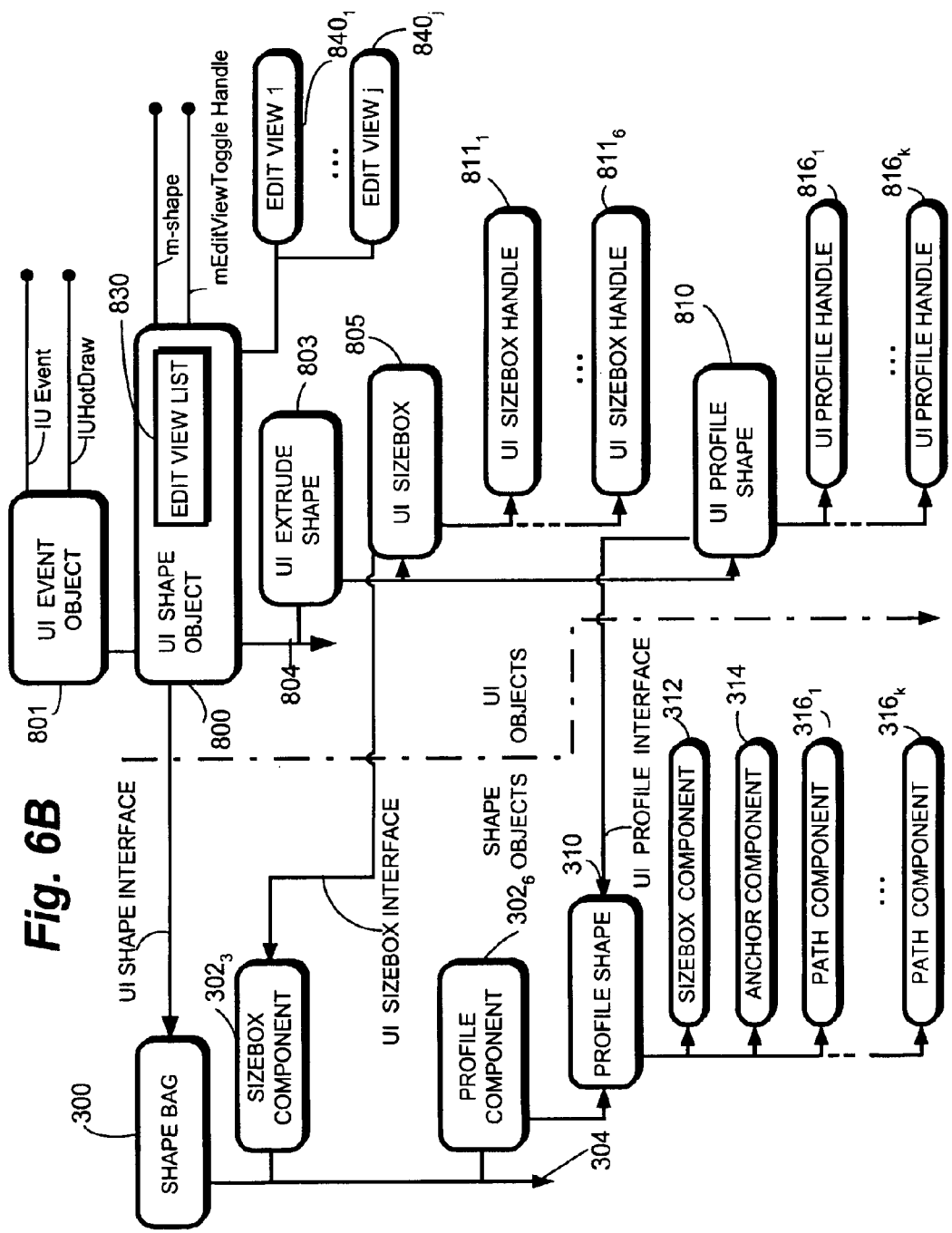
FIG. 6B is a diagrammatic view showing selected shape program objects and selected user interface program objects associated with a selected solid shape.

FIG. 6B shows UI Event Object 801, UI Shape object 800, and UI Extrude Shape 803 as managed by main user interface program object 354. It will be recognized that FIG. 6B shows, to the left of the dotted-dashed vertical line, some (but, for sake of simplicity, not all) of the same components for solid shape 200 as illustrated in FIG. 6A. The UI Event Object 801, UI Shape object 800, and UI Extrude Shape 803 are illustrated as managed by main user interface program object 354 by being to the right of the dotted-dashed vertical line in FIG. 6B.

UI Shape object 800 functions as a user interface wrapper around the data of shape bag program object 300. UI Shape object 800 holds onto a pointer (e.g., UI Shape Interface) to the corresponding shape bag program object 300 for solid shape 200. In addition, UI Shape object 800 has two other interfaces, m-shape and mEditViewToggleHandle, the significance of which will be explained subsequently. The UI Event Object 801 (the lowest level base class) includes functions for, e.g., handling certain user interface events, and for this reason includes two interfaces UI Event and IUHotDraw, which are also described below.

The creation of UI Shape object 800 also engenders creation, under control of main user interface program object 354, of other unillustrated components which communicate with UI Shape object 800 over bus 804. In fact, an entire tree of objects, essentially mirroring many (but not all) of the objects of FIG. 6A communicating over bus 304, is created for the user interface side.

Upon creation of the UI Extrude Shape 803 at action 8-2, the computer program 190 also performs other actions in connection with selection of the solid shape. Seven of these other actions are illustrated in FIG. 8 as action 8-3 (creation of UI Sizebox Object 805); action 8-4 (creation of UI Profile Shape Object 810); action 8-5 (populating an edit view list); action 8-6 (creating edit view objects); action 8-7 (instantiating the shape editing mode icon); and action 8—8 (highlighting a selected shape & displaying a default edit view with the shape editing mode icon 250).

As shown in FIG. 6B, UI Sizebox Object 805, created as action 8-3, has an interface/pointer (UI Sizebox Interface) to and is a wrapper for its associated sizebox component $302_2$ on the shape object side (in Intellishapes program objects 350). The UI Sizebox Interface is utilized to change parameters in the sizebox component $302_2$ when the sizebox handles are used to edit the sizebox. The UI Sizebox Object 805 is utilized for generating the display of sizebox 220. In addition, creation of the UI Sizebox Object 805 results in creation of other UI objects associated with UI Sizebox Object 805, such as six user interface program objects corresponding to each of the sizebox handles. For solid shape 200, FIG. 6B shows six such user interface program objects, e.g., UI Sizebox Handle Objects $811_1$–$811_6$ which are associated with sizebox handles 221–226, respectively (see FIG. 3A).

The UI Profile Shape Object 810, created at action 8-4, has a correspondence to and is a wrapper for profile shape component 310 for solid shape 200 in Intellishapes program objects 350. Moreover, UI Profile Shape Object 810 has an interface/pointer (UI Profile Interface) to its associated profile shape component 310. Creation of UI Profile Shape Object 810 results in creation of other UI objects associated with UI Profile Shape Object 810, including creation of a UI object for each of the profile handles of the selected solid shape. The number k of profile handles for the selected solid shape depends, of course, on the number of segments or paths for the profile of the selected solid shape. Thus, FIG. 6B shows creation of UI Profile Handle Objects $816_1$–$816_k$. For solid shape 200, which as the five segments or paths 201–205 shown in FIG. 4A and thus the five profile handles 261–265, an instance of a UI Profile Handle Object 816 is created for each of profile handles 261–265. In this regard, UI Profile Handle Object $816_1$ is created for profile handle 261; UI Profile Handle Object $816_2$ is created for profile handle 262; and so forth continuing to UI Profile Handle Object $816_5$ for profile handle 265.

Figure 6D:
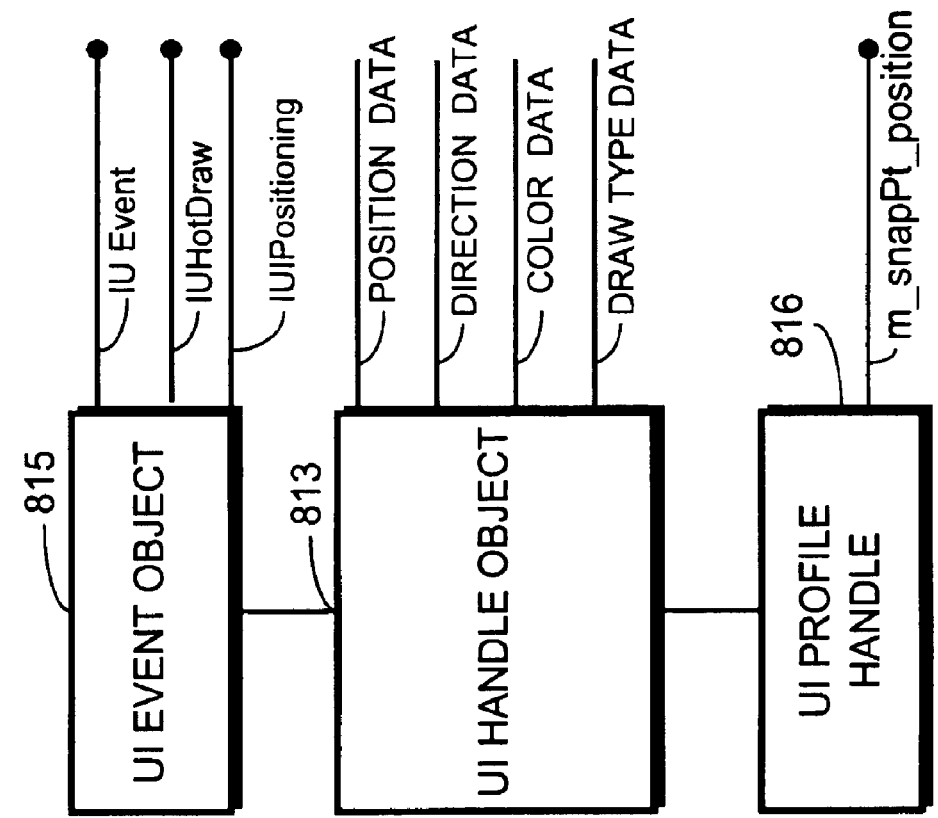
FIG. 6D is a diagrammatic view showing program objects associated with a user interface profile handle.
Figure 6C:
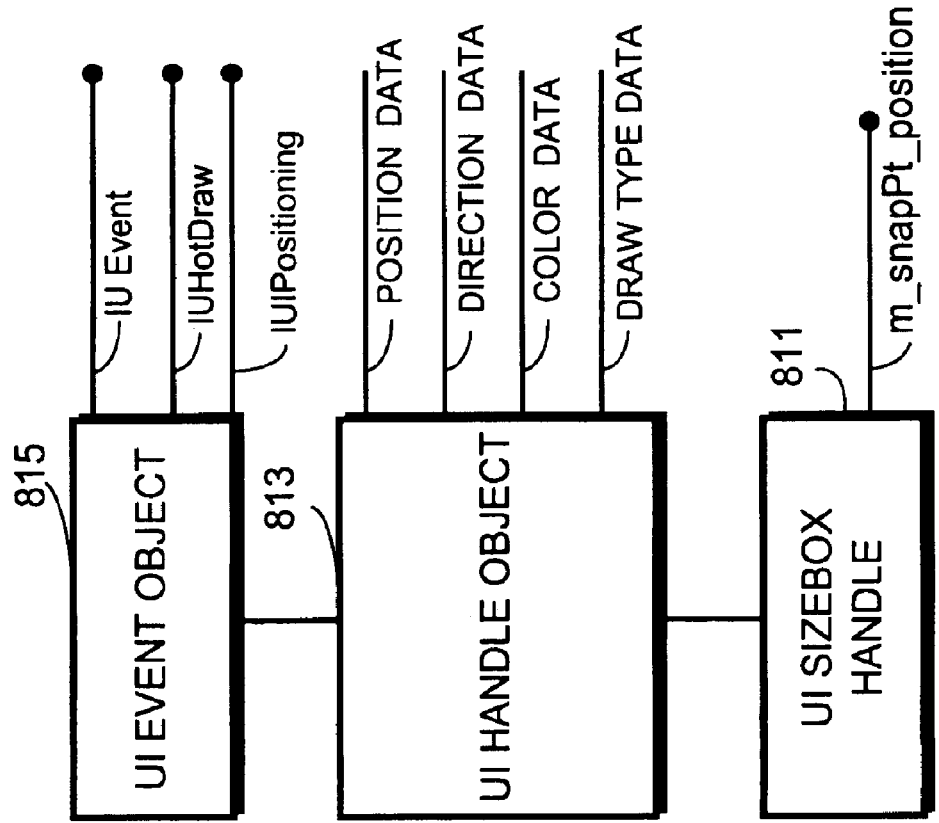
FIG. 6C is a diagrammatic view showing program objects associated with a user interface sizebox handle.

As explained above, creation of UI Sizebox Object 805 results in creation of six instances of UI Sizebox Handle Objects 811. Similarly, creation of UI Profile Shape Object 810 results in creation of k number of instances of UI Profile Handle Objects 816. The creation of each UI Sizebox Handle Object 811 and each UI Profile Handle Object 816 also resulted in creation of certain base class objects, including base class objects for each UI Sizebox Handle Object 811 and each UI Profile Handle Object 816. FIG. 6C shows base class objects created for UI Sizebox Object 805, while FIG. 6D shows base class objects created for UI Profile Handle Object 816. Both UI Sizebox Object 805 and UI Profile Handle Object 816 have a UI Handle Object 813 and a UI Event Object 815 (see FIG. 6C and FIG. 6D, respectively). Like UI Event Object 801, the UI Event Object 815 is responsible for and include functions for, e.g., handling certain user interface events, and for this reason include interfaces such as IU Event, IUHotDraw, and IUIPositioning. The IUIPositioning Interface supports positioning of an object that a UI Object corresponds to. UI Handle Object 813 has various types of data that represent the handle itself, including Position Data; Direction Data, Color Data; and Draw Type Data (as shown in FIG. 6C and FIG. 6D, respectively).

As action 8-5, the UI Shape object 800 populates an edit view list 830 (also known as the active view list) which it maintains (see FIG. 6B). The edit view list 830 is a list of the of possible edit views (e.g., edit modes) for the selected solid shape. For example, the solid shape 200 of the illustrated example has two edit views, i.e., the sizebox editing mode edit view and the shape profile editing mode edit view. Then, as action 8-6, instances of edit view objects $840_1$ through

840$_j$ are created in accordance with the j number of edit views for the selected shape (see FIG. 6B). For the UI Extrude Shape 803 in the illustrated example, the number for j is two, so that two edit view objects are created, particularly edit view object 840$_s$ for the sizebox editing mode edit view and edit view object 840$_p$ for the shape profile editing mode edit view.

Figure 9:
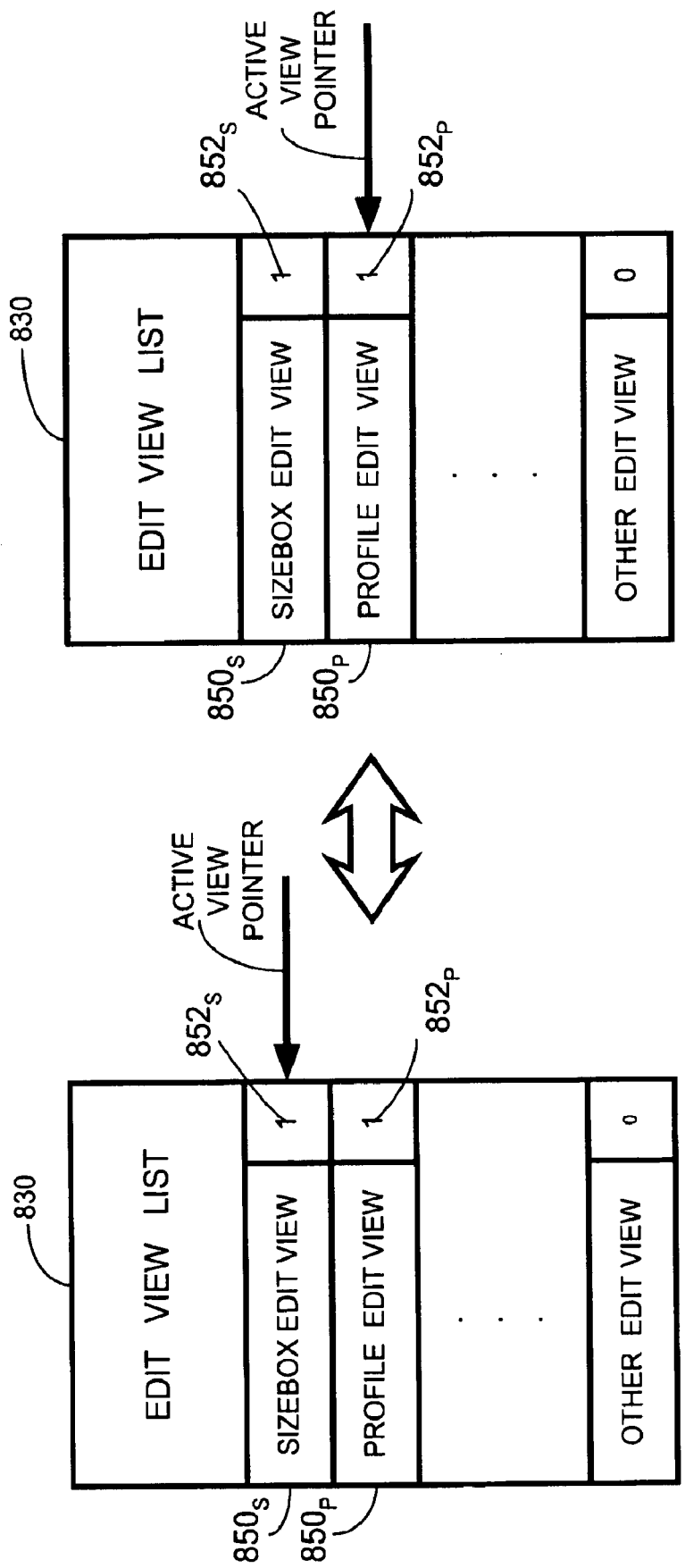
FIG. 9 is a diagrammatic view depicting example contents of an active view list maintained by a selection set manager of the invention in context of toggling between the two editing states of FIG. 5.

An example format for edit view list 830 is shown in FIG. 9. The example edit view list 830 of FIG. 9 has an entry for each of the j number of possible edit views, such as entry 850$_s$ at address 0 for the sizebox editing mode edit view and entry 850$_p$ at address 1 for the shape profile editing mode edit view. Each entry 850 includes a field 852 which indicates whether the associated edit view is enabled or not. For example, entry 850$_s$ has enablement field 852$_s$ and entry 850$_p$ has enablement field 852$_p$. An integer index or pointer, e.g., the Active View Pointer, is used to keep track of which editing view in edit view list 830 is the actual active edit view as the shape editing mode icon 250 is toggled or cycled through the various possible edit views. The doubleheaded arrow in FIG. 9 represents the toggling between the the sizebox editing mode and the shape profile editing mode, much in the same manner as does the arrow in FIG. 5. Thus, when the shape editing mode icon 250 has its sizebox editing mode representation, the Active View Pointer has a value of "0" and points to 850$_s$ at the corresponding address 0 for the sizebox editing mode edit view as shown in the left representation of edit view list 830 in FIG. 9. When shape editing mode icon 250 is toggled, the Active View Pointer is incremented by one, and the entry at the incremented addressed is check to ensure that it is enabled. In the situation shown at the right in FIG. 9, the incrementing of the Active View Pointer is such that the Active View Pointer now points to entry 850$_p$ at address 1 for the shape profile editing mode edit view. Thus, when the user selects the shape editing mode icon 250, the Active View Pointer gets incremented by one with each selection. At each increment, there is a check to see if the edit view entry having the address corresponding to the incremented value has an enabled status indicator. If the edit view entry does not have an enabled status indicator, the Active View Pointer is incremented again and continuing until the next available (enabled) edit view is encountered. If the user continues to select the shape editing mode icon 250, the Active View Pointer is incremented accordingly, wrapping back to zero when it reaches the maximumnumber of edit views in edit view list 830.

As action 8-7, an instance of shape editing mode icon 250 is generated (depicted as user interface program object 860 in FIG. 7). The UI Shape Object 830 has its interface mEditViewToggleHandle directed toward the UI Icon Object 860. Then, as action 8—8, the selected solid shape is lighted, and a default one of the edit views is shown along with the shape editing mode icon 250. For example, the default edit view may be the first edit view shown appearing in edit view list 830, e.g., the sizebox edit view (see FIG. 9).

Selection set manager 360 holds onto a UI entity list 824 that contains the UI Shape corresponding to the selected shape. Preferably selection set manager 360 adds the newly selected UI Extrude Shape to its UI entity list 824 after actions 8-2 through 8—8 of FIG. 8 have been completed.

Actual generation of shapes on the display screen of the workstation occurs in response to certain events which can be classified as either cold draw or a hot draw events. A cold draw event occurs and is invoked by the user interface when the solid display of a shape has changed and the rendering thereof needs to be updated using engine(s) 340. For example, when the user uses any of certain camera tools, moving the camera changes the viewing perspective and requires a refresh of the solid rendering. If a selects and drops new shape from a catalog into the scene or assembly, the solid rendering of the scene or assembly needs to be changed (a cold draw event) to reflect the new shape in the view. A hot draw event is invoked by the user interface intermittently as necessary depending on the function that is operating. The hot draw is responsible for the linear highlights that depict shape selection and the display of user interface objects like handles and icons in the scene. The hot draw is an overlay on top of the shaded rendered image that is produced by the cold draw.

Figure 10:
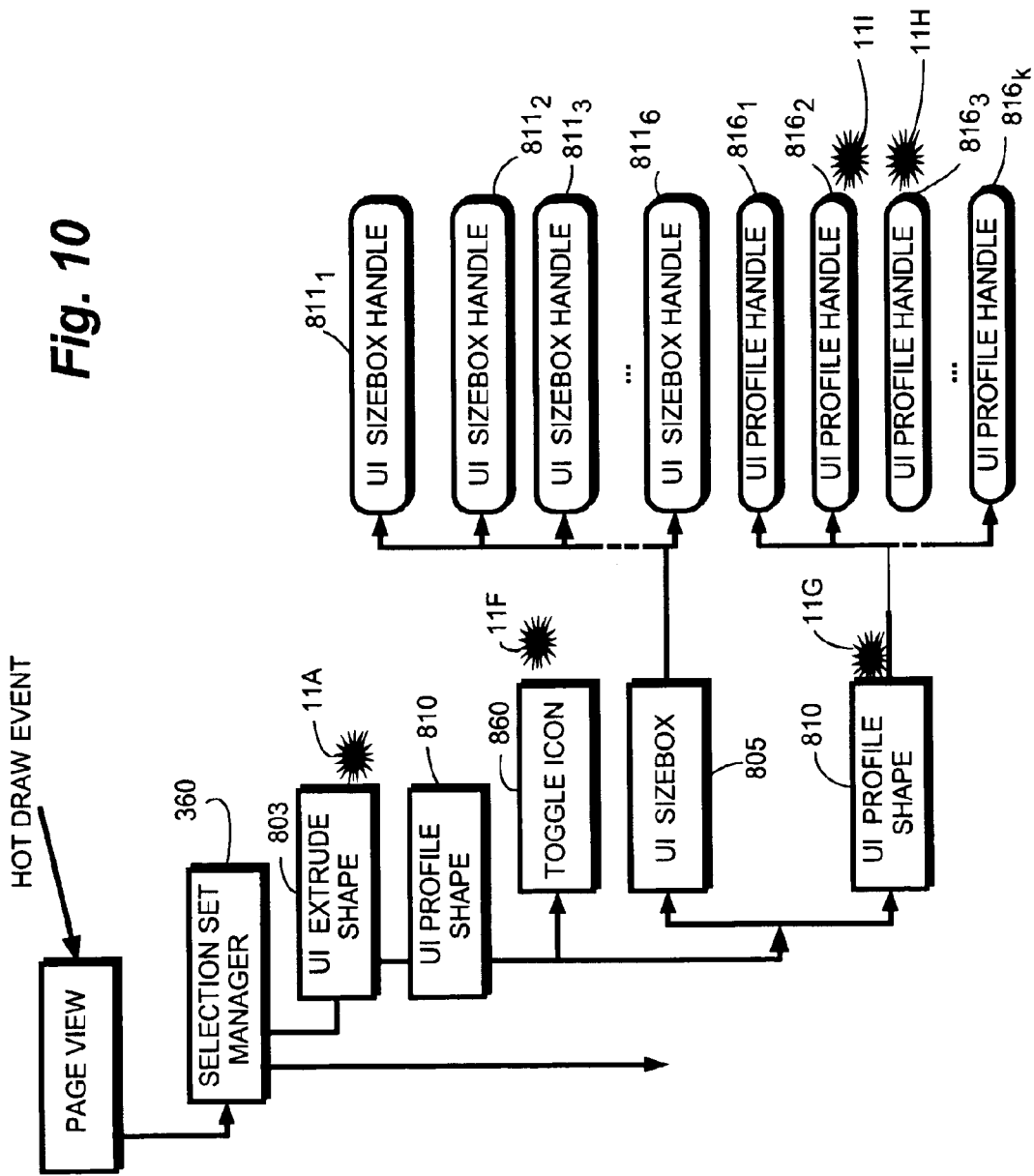
FIG. 10 is a diagrammatic view showing example actions involved in various hot draw event scenarios of the invention.

The selection of a solid shape, such as described above with reference to FIG. 8, can occur upon specified user input, such as depression of the left mouse button, for example. Such selection causes a hot draw event, as described above. FIG. 10 illustrates how a hot draw event is handled in accordance with the present invention. The hot draw event results in issuance of a global message which starts at the top of a hierarchial object tree shown in FIG. 10 and is passed down to lower level objects. As the global message pertaining to the hot draw event is handed down the object tree, a hit test is performed to enable each program object in the tree to ascertain whether the cursor at the time of the user's "click" is pointing at the shape represented by or associated with the program object.

When the global message pertaining to the hot draw event reaches the selection set manager 360, the selection set manager 360 determines what shapes are eligible for highlighting and/or generation. In the present example, only solid shape 200 has been selected, so that UI entity list 824 presently has the user interface program object for only solid shape 200 (e.g., UI Extrude Shape 803). However, it is possible that plural shapes can be selected (e.g., by a seriatim clicking on the plural shapes), in which case the UI entity list 824 may contain a user interface program object for each selected solid shape. In the case of multiple selection, some features (such as sizebox and profile handles) may be hidden and not subject to hot draw events.

FIG. 10 shows the situation in which the user has just selected solid shape 200, e.g., by clicking (left mouse button down) on solid shape 200. As the global message pertaining to the hot draw event works its way down the tree of FIG. 10, the selection set manager 360 checks with UI Extrude Shape 803 and determines from the hit test results that solid shape 200 has been selected. The selection of solid shape 200 is depicted by burst 11A in FIG. 10. At this juncture, as a result of the hot draw event UI Extrude Shape 803 requests engine(s) 340 to draw UI Extrude Shape 803 in a highlighted format, as illustrated in FIG. 11A. In addition, the shape editing mode icon 250 is drawn, as well as the default one of the edit views. In the illustrated embodiment, the default edit view is the sizebox edit view, which has default display features of the sizebox 220 together with its sizebox handles 221–226. The drawing of the highlights of the selected solid shape, of the features of the default edit view, and of the shape editing mode icon 250 are represented by action 8—8 in FIG. 8.

Thus, FIG. 11A shows that the hot draw event obtains positive hit test results causing highlighting of solid shape 200, along with the sizebox 220 (with its sizebox handles 221–226) for solid shape 200 and shape editing mode icon 250.

FIG. 11B shows the user moving the mouse so that cursor C is proximate the sizebox handle 222 on the right face of solid shape 200. FIG. 11C shows that the cursor continues to roam, and after leaving the position show in FIG. 11 B moves to a position proximate sizebox handle 221 (on the front face of solid shape 200). Throughout the roamings of FIG. 11B and FIG. 11C, the entire sizebox 220 including all of its sizebox handles 221–226 remain visible.

As understood from the foregoing, the user may click (left mouse button down) and drag on one of the sizebox handles 221–226 (keeping the left mouse button down) in order to adjust the size of the sizebox 220, and thus influence the size of the solid shape 200. FIG. 11D shows such a situation, and particularly shows the user dragging sizebox handle 221 with cursor C in the direction shown by arrow 230 (e.g., the −Y direction in FIG. 11D). As the drag of sizebox handle 221 occurs, sizebox 220 is extended (elongated) in the −Y direction. However, with the dragging of handle 221 the solid shape 200 still remains in its original position. With every predetermined incremental move of cursor C in the dragging of sizebox handle 221, a hot draw event occurs.

Figure 12A:
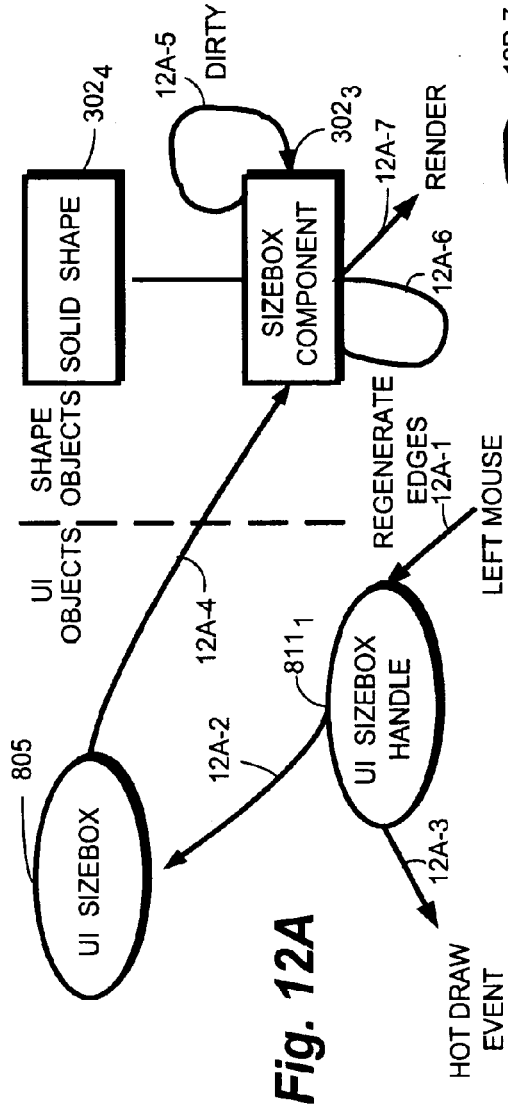
FIG. 12A and FIG. 12B are diagrammatic views showing example actions involved in various sizebox move scenarios of the invention.

Basic actions performed upon clicking on a sizebox handle (action 12A-1) and dragging of that sizebox handle are shown in FIG. 12A. As a handle (such as sizebox handle 221) is moved each predetermined increment, as action 12A-2 the UI Sizebox handle user interface program object (e.g., UI Sizebox Handle Object $811_1$,) feeds back to its parent user interface object (e.g., UI Sizebox Object 805) an indication of how far the sizebox handle has been dragged. Each predetermined incremental move also causes generation of another hot draw event as depicted by action 12A-3. The hot draw event is handled so that the sizebox 220 (having UI Sizebox Object 805) and sizebox handle 221 are redrawn. The movement (e.g., elongation in the present example) of the sizebox 220 is also communicated by UI Sizebox Object 805 to sizebox component $302_3$, as indicated by arrow 12A-4 in FIG. 12A. In other words, the UI Sizebox Object 805 knows the degree of the move of the cursor, and hence the corresponding change in the sizebox, and communicates that data to sizebox component $302_3$. Since the sizebox component $302_3$ has its data changed, the sizebox component $302_3$ marks itself as being "dirty" (action 12A-5) to indicate that the integrity of the sizebox 220 has been compromised and must be regenerated. Accordingly, as action 12A-6 the sizebox component $302_3$ regenerates itself and, as a hot draw event of action 12A-7, requests an updated rendering from engine(s) 340.

As long as the sizebox handle 221 is dragged in the direction of arrow 230, the sizebox 220 gets further elongated in the −Y direction. Basic actions which occur when the dragging ceases are depicted in FIG. 12B. Action 12B-1 shows the left mouse button going up (e.g., being released by the user). When the dragging ceases, the UI Sizebox Handle Object $811_1$ sends an update message to its UI Sizebox Object 805 as action 12B-2. The UI Sizebox Object 805 in turn sends an update message (as action 12B-3) to its sizebox component 312, advising the sizebox component 312 to update itself and its associated shape (e.g., solid shape 200). Like the update message of action 12A-4, the update message of action 12B-3 advises of the extent of movement of the cursor C (which, in the case of the left mouse button going up, gives the position of the sizebox handle 221 upon completion of the drag). As action 12B-4, the sizebox component 312 updates itself, and requests (as action 12B-5) that it be rendered (as updated) by engine(s) 340. Further, sizebox component 312 advises solid component $302_4$ to update itself (action 12B-6). Regeneration of solid component $302_4$ occurs as action 12B-7, with the updated solid component $302_4$ requesting (as action 12B-8) that it be rendered by engine(s) 340. As a result of the end of dragging (e.g., left mouse button up) and the consequential regeneration of solid component $302_4$, the solid shape 200 is now displayed (see FIG. 11E) as being elongated (in the −Y direction) in response to manipulation of the sizebox handle 221 in the manner described above.

FIG. 11F shows that, subsequent to the cursor movement of FIG. 11E, the user has moved the cursor C to the shape editing mode icon 250. With the cursor C in a neighborhood of the shape editing mode icon 250, a hot draw command results in the UI shape editing mode icon program object 860 responding positively to the hit test, as indicated by burst 11F in FIG. 10. Thereafter, as shown in FIG. 11G, the user performs a left mouse button click on shape editing mode icon 250, resulting in a toggling of shape editing mode icon 250. The toggling of shape editing mode icon 250 is reflected by the fact that the display of the shape editing mode icon 250 changes from its sizebox editing mode representation (e.g., the letter "S") to its shape profile editing mode representation (e.g., the letter "P"). Moreover, since the shape profile editing mode is now active, the Active View Pointer points to the edit view list 830 in the manner of the right side of FIG. 9 (i.e., pointing to entry $850_p$). Further, the profile formed by segments or paths 201–205 is highlighted in FIG. 11G in view of the shape profile editing mode being active. However, in accordance with one aspect of the present invention, the profile handles 261–265 are only selectively displayed, one profile handle at a time, and only when the cursor C has ventured near one of the profile handles 261–265. When the cursor C is in a neighborhood of one of the profile handles 261–265, that profile handle appears and stays displayed until the cursor C roams into a neighborhood of another one of the profile handles 261–265, at which time the another one of the profile handles 261–265 whose neighborhood has been broached by the cursor C is displayed. Thus, in FIG. 11G, since the cursor C is not yet in a neighborhood of any one of the profile segments 201–205, none of the profile handles 261–265 are displayed in FIG. 11G.

FIG. 11H shows a subsequent moment in time in which the cursor C has moved into a neighborhood of one of the profile segments 201–205, particularly segment 203.

The hit test result associated with the hot draw event is passed by selection set manager 360 to UI Extrude shape 803, which passes the hit test result to UI Profile Shape Object 810. The UI Profile Shape Object 810 determines whether the hit test result is close to one of the paths or segments of the profile shape. If the cursor C hits or is in a neighborhood of one of the profile paths or segments, the UI Profile Shape Object 810 displays the particular one of the profile handles 261–265 associated with the hit curve or path. The hit test results returned at the time of FIG. 11H indicate that profile handle 263 for profile segment 203 was hit, as indicated by burst 11H in FIG. 10 at UI Profile Handle Object $816_3$ (corresponding to profile handle 263). Accordingly, the profile handle 263 is rendered. Yet subsequently, the cursor C roams to the neighborhood of profile segment 202, as shown in FIG. 11I. The hit test results returned at the time of FIG. 11I indicate that profile handle 262 for profile segment 202 was hit, as indicated by burst 11I in FIG. 10 at UI Profile Handle Object $816_2$, so that profile handle 262 is rendered.

Figure 11J:
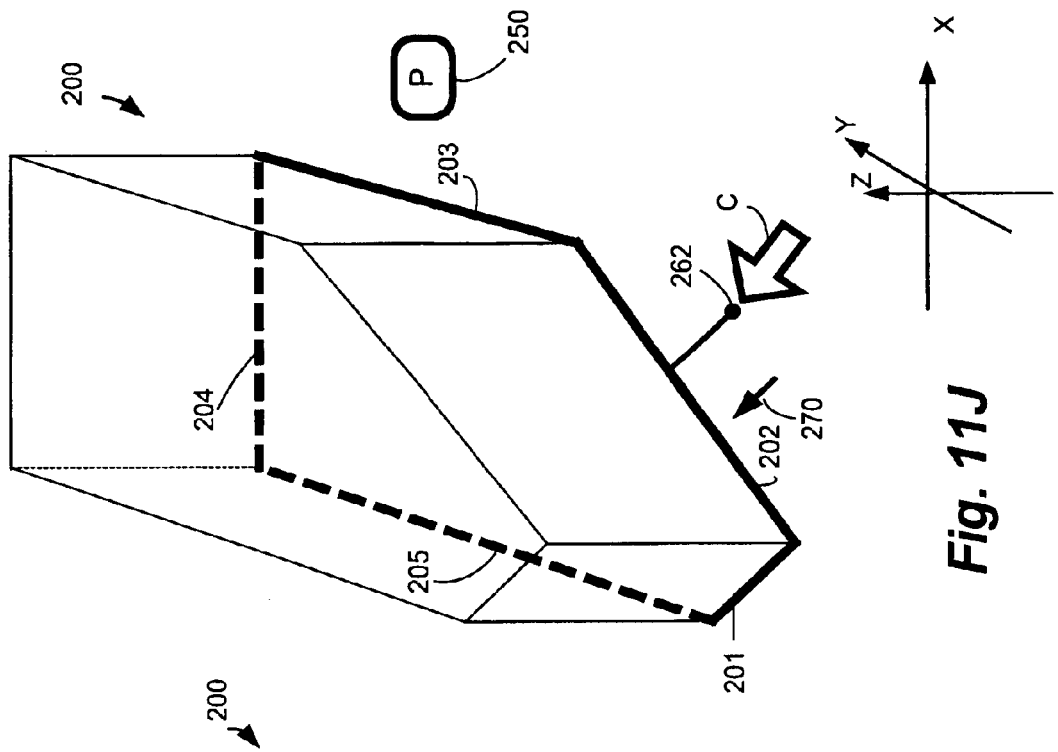
Figure 11I:
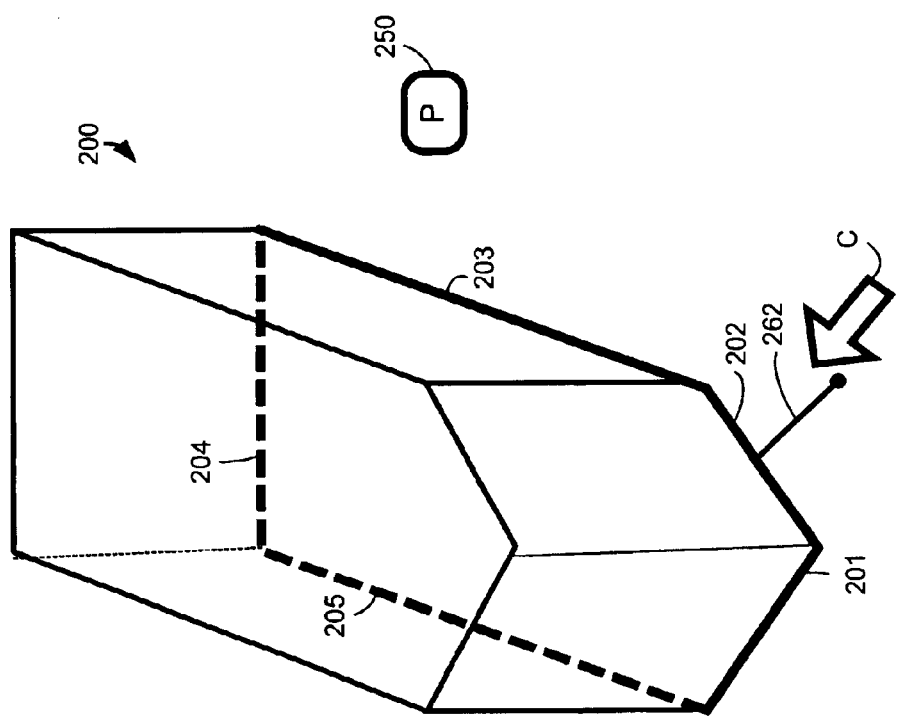
Figure 12B:
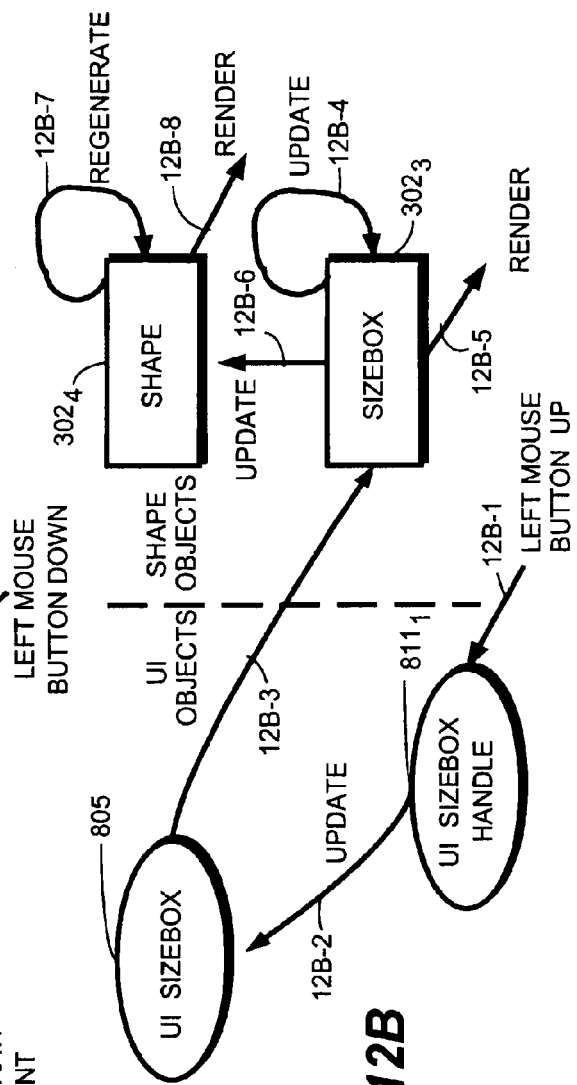

FIG. 11J shows the user performing a left mouse click on profile handle 262, and then moving the profile handle 262 in the direction shown by arrow 270. As the profile handle 262 is dragged, both the profile and the solid shape 200 are redrawn. As shown in FIG. 11J, the movement of profile handle 262 results in numerous hot draw events, with consequential modification of the profile. In the particular movement illustrated with reference to FIG. 11J, the path 202 becomes longer at the expense of path 201 (which becomes shorter). Upon cessation of the dragging of the profile handle 262 by the cursor C (as sensed by the left mouse button being released), the solid shape 200 is updated and a cold draw is invoked in order to update the image of solid shape 200 on the screen.

It has been described above how shape editing mode icon 250 can be utilize to cycle or toggle between two editing modes, e.g., the sizebox editing mode and the shape profile editing mode. As previously stated, the cycling or toggling of the present invention is not confined to these two illustrative editing modes. Rather, other editing modes of the invention are also possible. Some of these other editing modes are dependent upon the type of solid part being modeled. For example, there is a particular type of solid part known as a sheet metal bend which a set of sheet metal bend shape editing handles. When a sheet metal bend solid shape has been selected, the user can employ shape editing mode icon 250 to toggle between a sheet metal bend editing mode (in which the sheet metal bend shape editing handles can be employed) and another editing mode. In the sheet metal bend editing mode the user can edit or modify various unique aspects of the sheet metal solid part.

A more detailed discussion of sheet metal solid parts is provided in U.S. patent application Ser. No. 09/425,987, entitled "Sheet Metal Geometric Modeling System", which is incorporated herein by reference. A bend solid shape is a rather complex solid shape, and can have plural child solid shapes. In this regard, and as illustrated in FIG. 13A, FIG. 13B, and FIG. 13C, a representative bend solid shape 1300 comprises as many as five child solid shapes, including a first stock or flange segment 1360, a second stock or flange segment 1362, a bend segment 1364, a first relief 1366, and a second relief 1368. Thus, bend solid shape 1300 is not just an arc-shaped segment (e.g., not just bend segment 1364), but a zone of influence which includes a stock segment on either side of the bend segment (e.g., segments 1360 and 1362 adjoining opposite ends of bend segment 1364). The relief solid shapes 1366, 1368 are notches which are cut out to allow tearing of the target solid shape (see FIG. 13B).

Figure 14A:
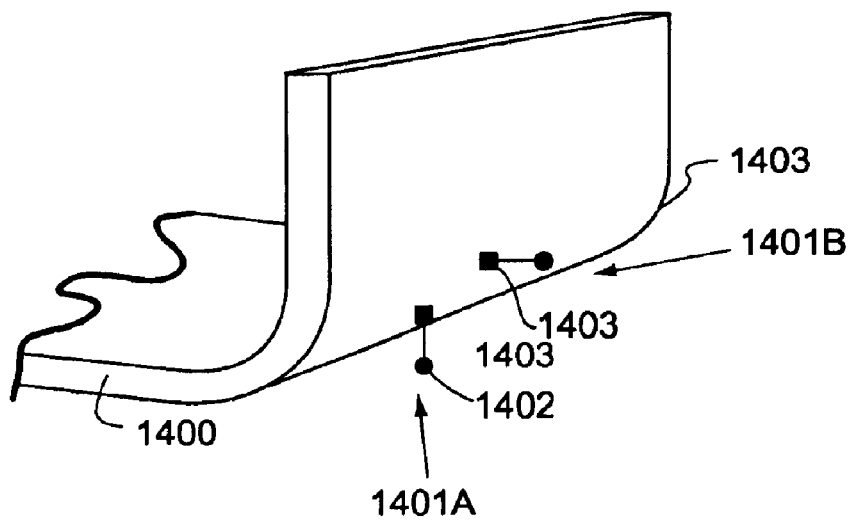
FIG. 14A is a diagrammatic view showing part level distance editing handles and angle editing handles for a sheet metal bend solid shape.
Figure 14B:
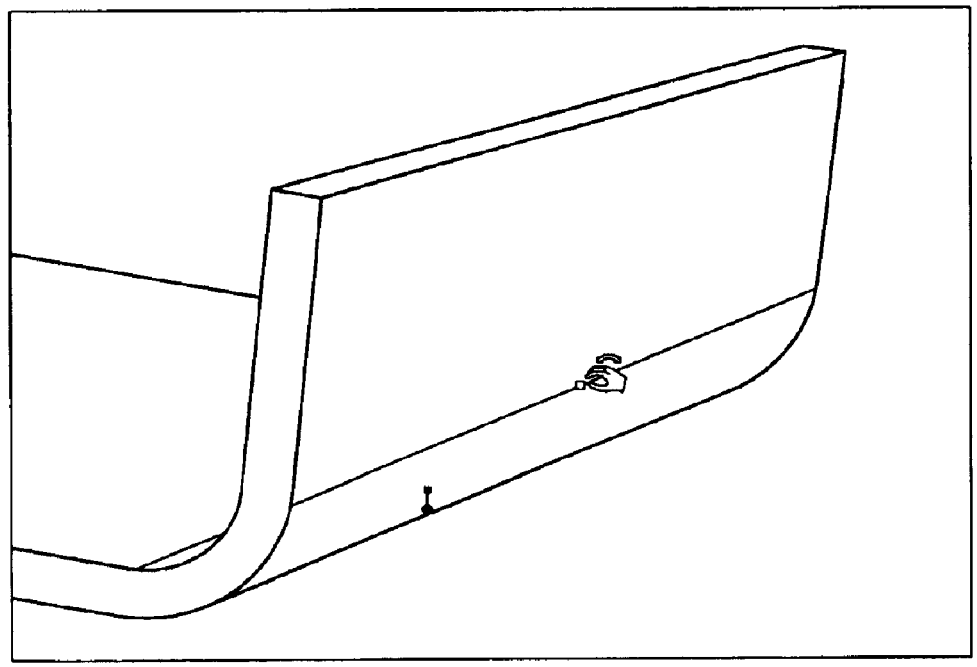
FIG. 14B is a diagrammatic view of a cursor changed to a hand and double-pointed arc proximate the angle editing handle of FIG. 14A.

A sheet metal bend solid shape has handles both at a part level and at a shape level. First described are the handles for the sheet metal bend solid part at the part level, since the behavior of some of the handles at the shape level is similar. FIG. 14A illustrates part level editing handles for parts that include bend shapes. In particular, FIG. 14A shows a bend solid shape 1400 along with two sets of handles 1401A, 1401B. Each set of handles 1401A, 1401B includes a distance editing handle 1402 and an angle editing handle 1403. The two sets of handles 1401A, 1401B are displayed when bend sold shape 1400 is selected at the part editing level and the cursor is placed over bend solid shape 1400. The two distance editing handles 1402 are shown as having a spherical shape; the two angle editing handles 1403 are shown as having a square shape. One of set of handles 1401A is located at a start of the bend where it is attached to flat stock; the other of set of handles 1401B is situated at the other end of the bend. The angle editing handles 1403 can be used visually to edit the angle of the bend by moving the cursor over the desired angle editing handle 1403 until the cursor changes to a hand and double-pointed arc (as shown in FIG. 14B). The user then clicks and drags on angle editing handle 1403 to obtain the approximate angle desired.

Figure 14C:
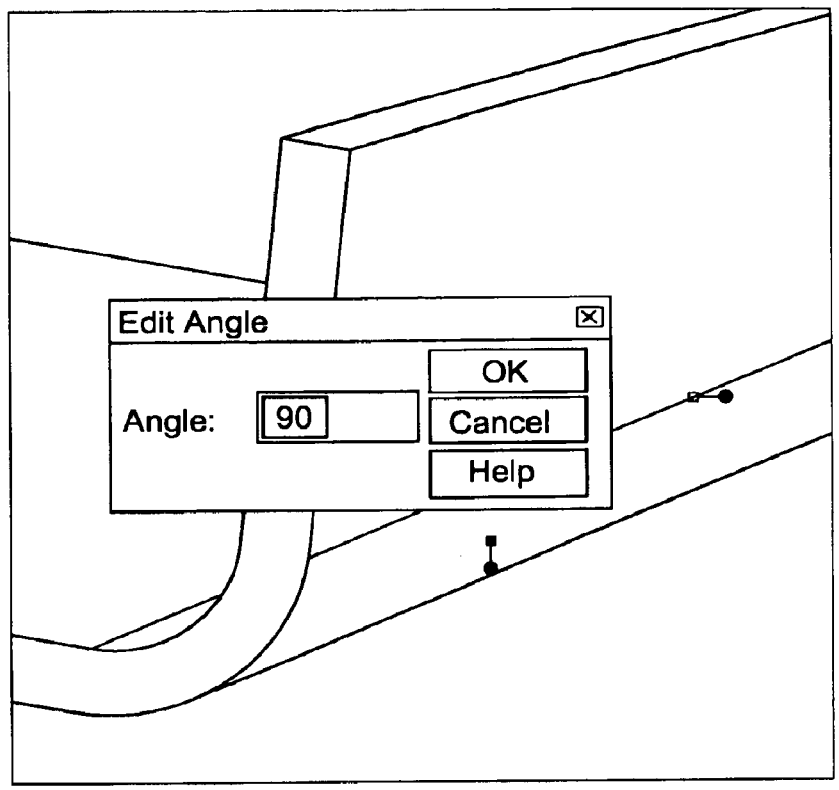
FIG. 14C is a diagrammatic view of a edit angle dialog box.

Dragging on the angle editing handle 1403 of FIG. 14A modifies the angle by repositioning the associated side of the bend, along with any unconstrained solid shapes also connected to that side of the bend. The user can right click on angle editing handle 1403, and thereby obtain a pop-up menu having a list of the following options from which to select: (1) edit angle; (2) switch edit side; (3) parallel to edge. Upon selecting the edit angle option, the user is presented with the edit angle dialog box of FIG. 14C. The user can enter a user desired value in the edit angle dialog box of FIG. 14C, and thereby precisely edit the angle of the bend shape relative to the flat stock to which it was added.

Figure 14D:
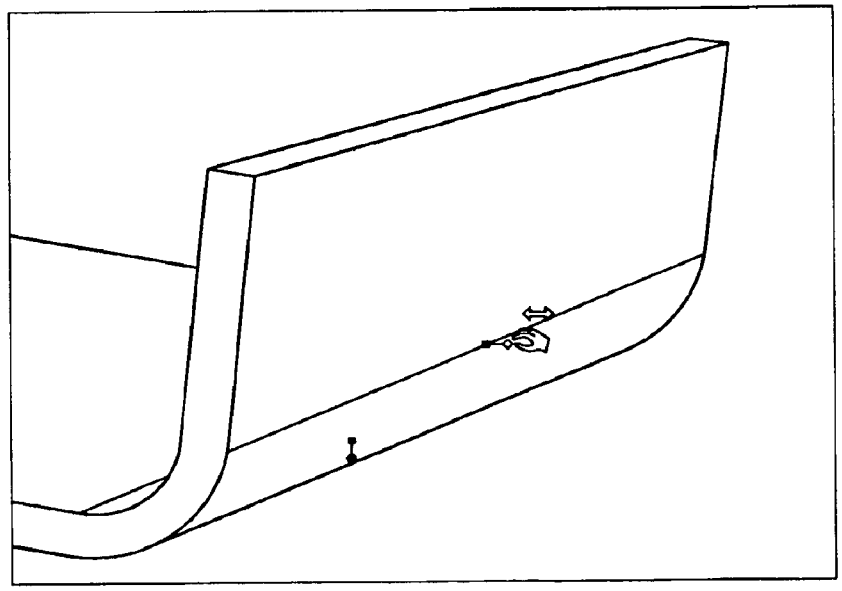
FIG. 14D is a diagrammatic view of a cursor changed to a hand and double-pointed arrow proximate the distance editing handle of FIG. 14A.

The alignment handles 1402 can be used to edit visually the height or length of the solid shape. The cursor can be moved over the distance editing handle 1402 until the cursor changes to a hand and double-pointed arrow as shown in FIG. 14D, and the distance editing handle 1402 then dragged to employ the neighborhood calculation to move a half space as defined by a corresponding half bend. The distance editing handle 1404 can similarly be used.

Figure 14F:
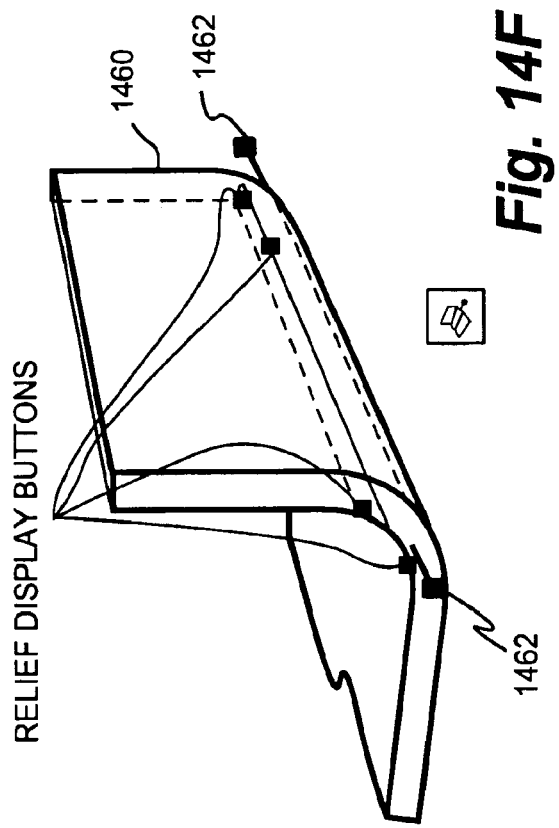
FIG. 14F is a diagrammatic view showing bend relief editing tools for a relief editing mode.
Figure 14E:
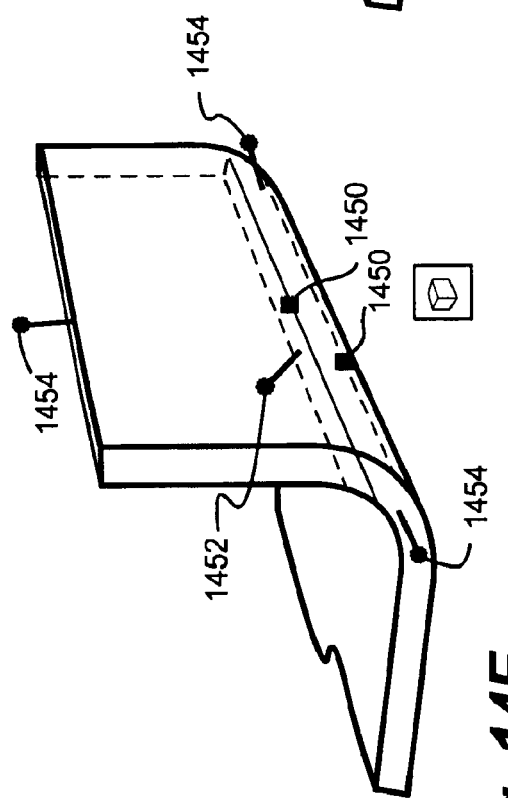
FIG. 14E is a diagrammatic view showing, at a shape level, bend shape editing handles for a bend shape in a bend shape editing mode.

The bend shape editing handles, illustrated in FIG. 14E, allow editing of the angle of the bend, its radius, and its distance from stock to which it is added. The bend shape editing handles includes the following handles: angle editing handles 1450; radius editing handle 1452; and distance editing handles 1454. The angle editing handles 1450, at the shape editing level, function identically to the angle editing handles 1403 at the part editing level as previously described in connection with FIG. 14A. The distance editing handles 1454 are displayed at both ends and the top of the bend solid shape, and can be used to edit visually the height or length of the bend solid shape. The user moves the cursor over the desired one of the distance editing handle 1454 until the cursor changes to a hand and double-pointed line, and then drags the distance editing handle 1454 to increase/decrease the height or length of the bend shape. Right-clicking on one of the distance editing handles 1454 results in the same type pop-up menu options available in connection with the distance editing handle 1402 as previously discussed (see FIG. 14A). The radius editing handle 1452 is used to edit visually the radius of the bend of the bend solid shape. The user moves the cursor over the radius editing handle 1452 at the center of the bend until the cursor changes to a hand and double arc with arrow. The user can then drag the radius editing handle 1452 toward or away from the bend's surface to decrease/increase the radius of the bend. Alternatively or additionally, the user can right click on the radius editing handle 1452 to obtain a pop-up menu with an option to edit the radius. Upon selecting the edit radius option from the pop-up menu, program 198 generates a dialog box in which the user can enter a precise value for the radius of the bend.

In addition to allowing toggling to the sheet metal bend shape editing mode with its sheet metal bend shape editing handles, shape editing mode icon 250 can be utilized to toggle or cycle to a sheet metal relief editing mode. In this regard, and as illustrated in FIG. 14F, program 198 also includes relief tools for modifying relief of a bend solid shape as illustrated in FIG. 14F. These bend relief tools allowing the user to choose whether or not to display the bend relief and to increase/decrease the corner relief of the bend. The bend relief editing tools of FIG. 14F, if not currently active at the shape editing level, can be displayed either by clicking on shape editing mode icon 250 to switch to the bend shape relief view or by right-clicking the bend solid shape, selecting Show Edit Handles, and then selecting Relief. The program 198 then displays the relief display buttons 1460 and corner relief editing handles 1462 of FIG. 14F. The relief display buttons 1460 allow a user to work with or without bend reliefs being displayed on sheet metal solid shape. The relief display buttons 1460, which are square in shape, are displayed at ends of the bend at the point where the bend joins the stock. The relief display buttons 1460 are inactive by default. To display a specific bend relief, the user moves the cursor over the corresponding relief display button 1460 until it changes to a pointing finger, after which the user selects the relief display button 1460. The relief display button 1460 then lightens in color, and the specified bend relief is displayed. Right clicking on the relief display button 1460 accesses certain bend properties. The corner relief editing handles 1462, diamond in shape, are displayed at ends of a bend shape. The corner relief editing handles 1462 permit a user to increase or decrease a corner relief of a bend solid shape. The user moves the cursor over a selected corner relief editing handle 1462 until it changes to a hand with a double pointed line, and then clicks and drags on the corner relief editing handle 1462, to edit the corner relief. To precisely edit the corner relief of the bend, the user can right click on the selected corner relief editing handle 1462 to obtain a pop-up menu with the same options available for the stock distance editing handles.

Figure 15:
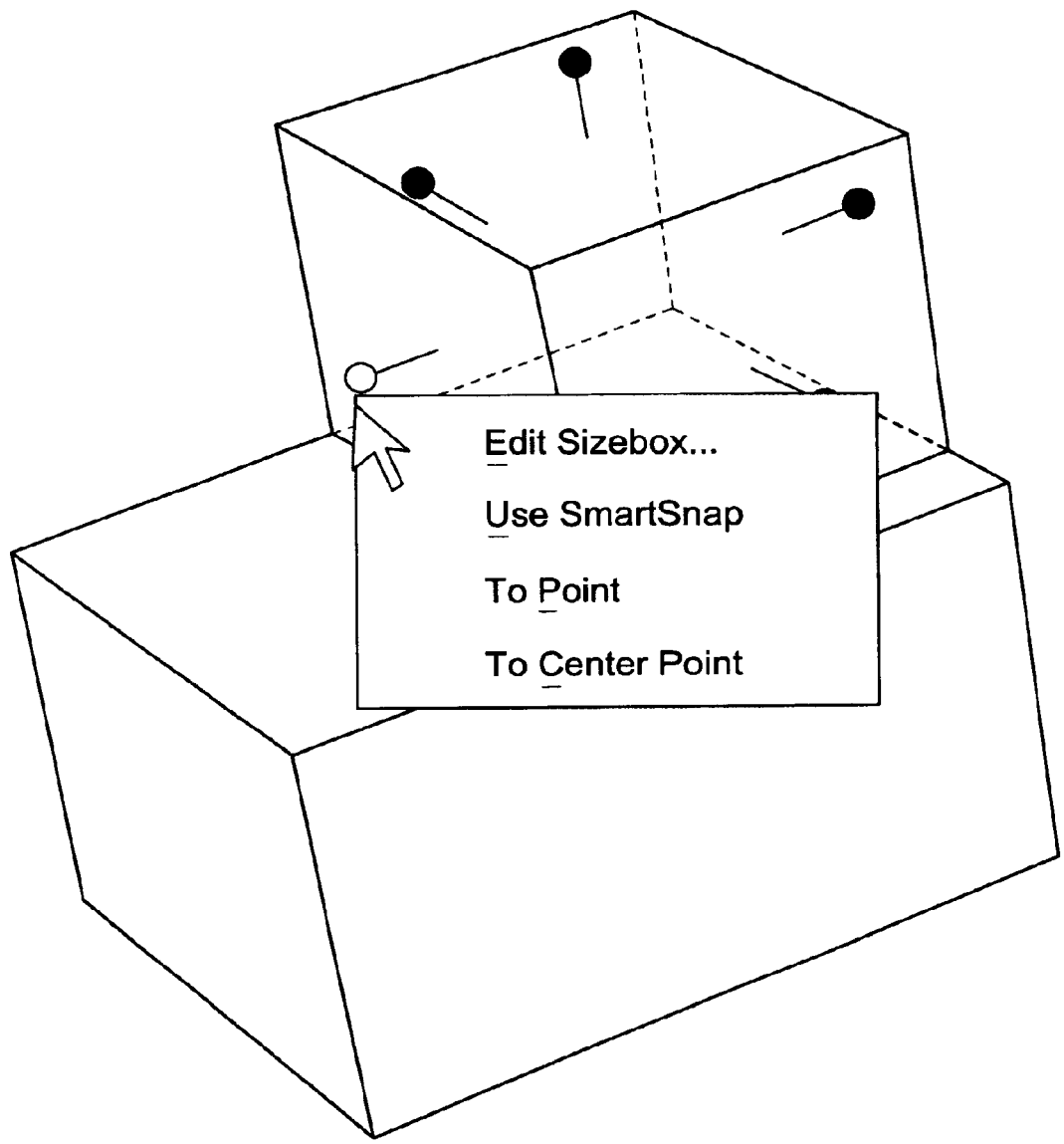
FIG. 15 is a diagrammatic view showing a handle edit menu according to an aspect of the invention.

Thus, the shape editing mode icon 250, as described above, enables the cycling or toggling between various edit views, with the various edit views having differing editing handle sets. A handle is a user interface object that allows a user to interact with and edit three dimensional data in the three dimensional space of the objects. The handle is an access point for the user to interactively change a parameter or edit a feature of a solid shape. A user selects the handle with the left mouse button (LMB) and drags the handle across the screen. When the user selects a handle, the handle changes color. The display of the solid shape changes with the dragging motion of the handle to provide feedback to the user. An example of such a "free" drag of a handle is that described above with reference to the dragging of the sizebox handle 221 in FIG. 11D. As shown in FIG. 15, the user may access other handle features by selection of the handle with the right mouse button (RMB) to bring up a menu providing for the three other handle features or operations applicable to all handles: the SmartSnap™ operation; the To Point operation; and the To Center Point operation.

Figure 16A:
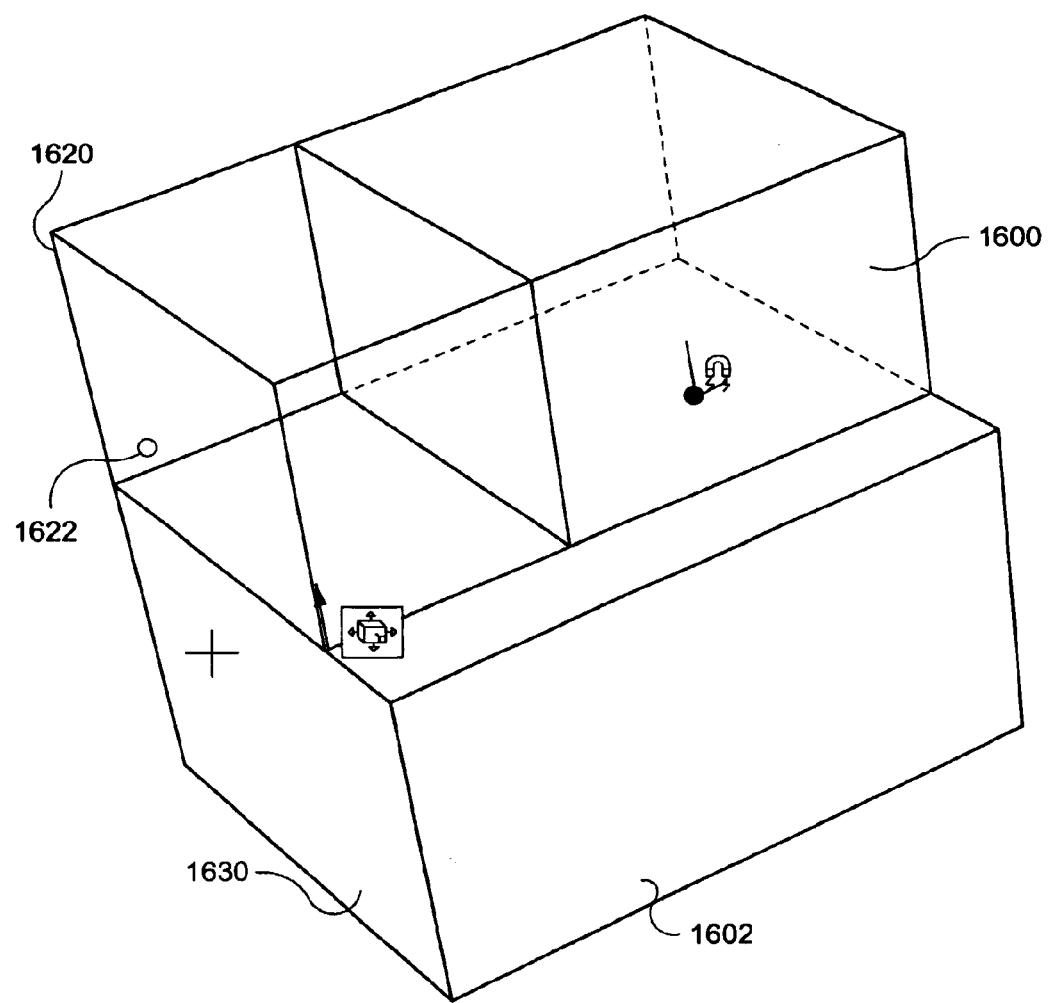
FIG. 16A and FIG. 16B are diagrammatic views illustrating SmartSnap™ operations according to aspects of the invention.
Figure 16B:
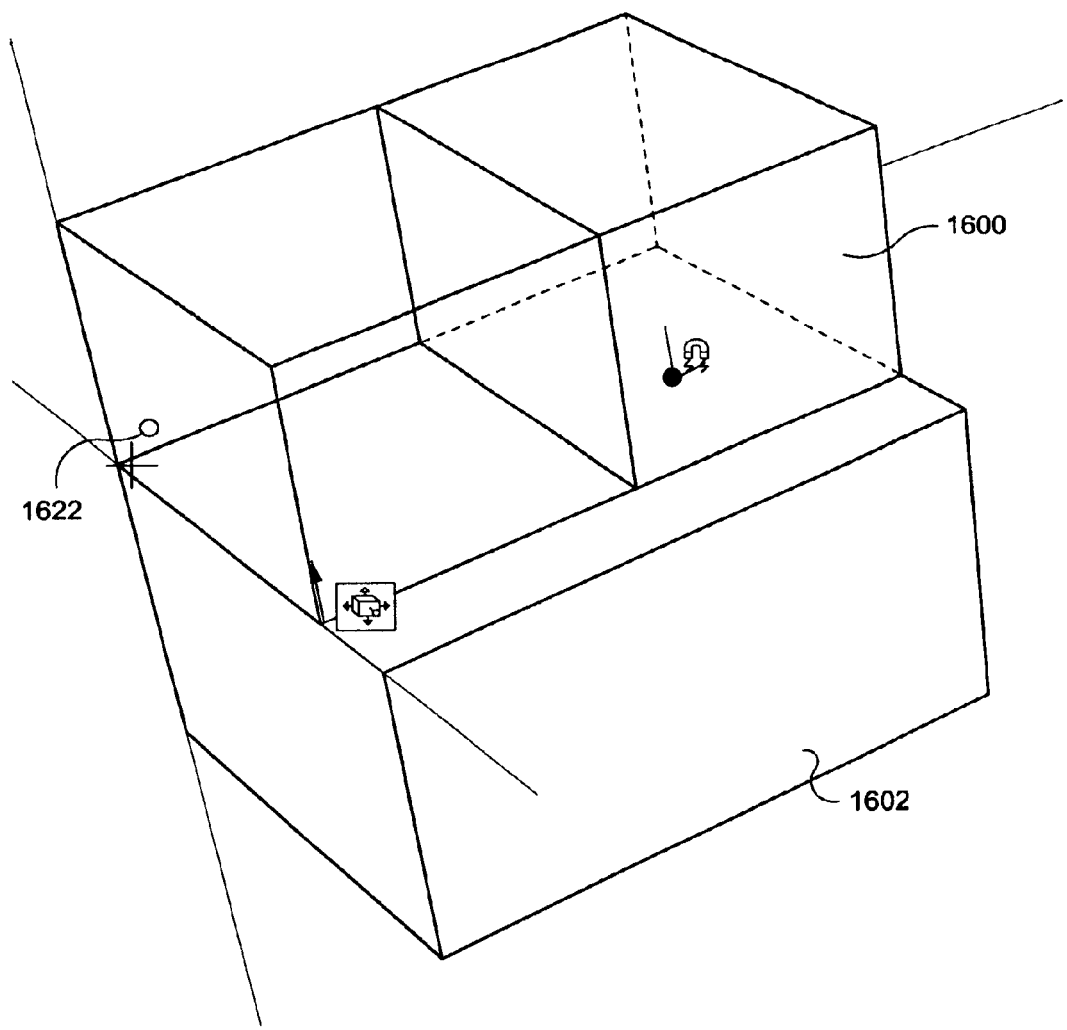

Computer program 190 provides two SmartSnap™ operations for editing view handles of solid shapes. A first of these SmartSnap™ operations is described with reference to FIG. 16A; a second operation is described with reference to FIG. 16B. FIG. 16A actually describes a Drag with Direct SmartSnap™ operation which is the default operation occurring when the user modifies the free drag by holding down or depressing the shift key of the keyboard. FIG. 16B describes an alternate snapping behavior which must first invoke the "Use SmartSnap" option on the menu of FIG. 15, and then move a handle while the shift key is depressed.

In connection with the SmartSnap™ operations, it will be recalled from the earlier discussion of handle structure that a handle is displayed as a handle base point and a handle knob, connected by a handle stem. The SmartSnap™ operations are performed relative to a "snap point", the snap point by default being the handle base point (As described hereinafter, the snap point can be relocated from its default position at the handle base). The snap point is utilized in a SmartSnap™ operation as a special point whose geometric coordinates are used to compare with coordinates of another feature in the SmartSnap™ operation, e.g., for alignment purposes.

FIG. 16A illustrates a default Direct SmartSnap™ operation wherein a handle is used to quickly snap to alignment with whatever three dimensional point is hit when the cursor C is roamed across the screen. The face, edge, or vertex that the user hits during the handle roaming is highlighted for visual feedback. FIG. 16A shows a top block 1600 and a lower block 1602, as well as sizebox 1620 for top block 1600. FIG. 16A further shows sizebox handle 1622 being pulled (while the shift key on the keyboard held down) toward the left of the scene. The handle 1622 is moved to a point computed by a projection of the hit point on the highlighted face 1630 of bottom block 1602 in the direction of the handle 1622. In the particular case of FIG. 16A, the result is that the user quickly aligns the face of the top block with the highlighted face 1630 of bottom block 1602.

FIG. 16B illustrates the alternate SmartSnap™ operation wherein, after selection of the "Use SmartSnap" option on the menu of FIG. 15, the user moves a handle while the shift key is depressed. The SmartSnap™ operation of FIG. 16B snaps the handles to points where the line specified by the handle direction and the handle location intersect with a face, edge, or special point geometry on the shape. Special highlights are displayed to the user as the user drags the handle to alert the user when an intersection condition is met. FIG. 16B illustrates the SmartSnap™ operation and its particular highlighting when the selected handle direction of handle 1622 has intersected with a plane of a highlighted face of bottom block 1602.

Figure 17:
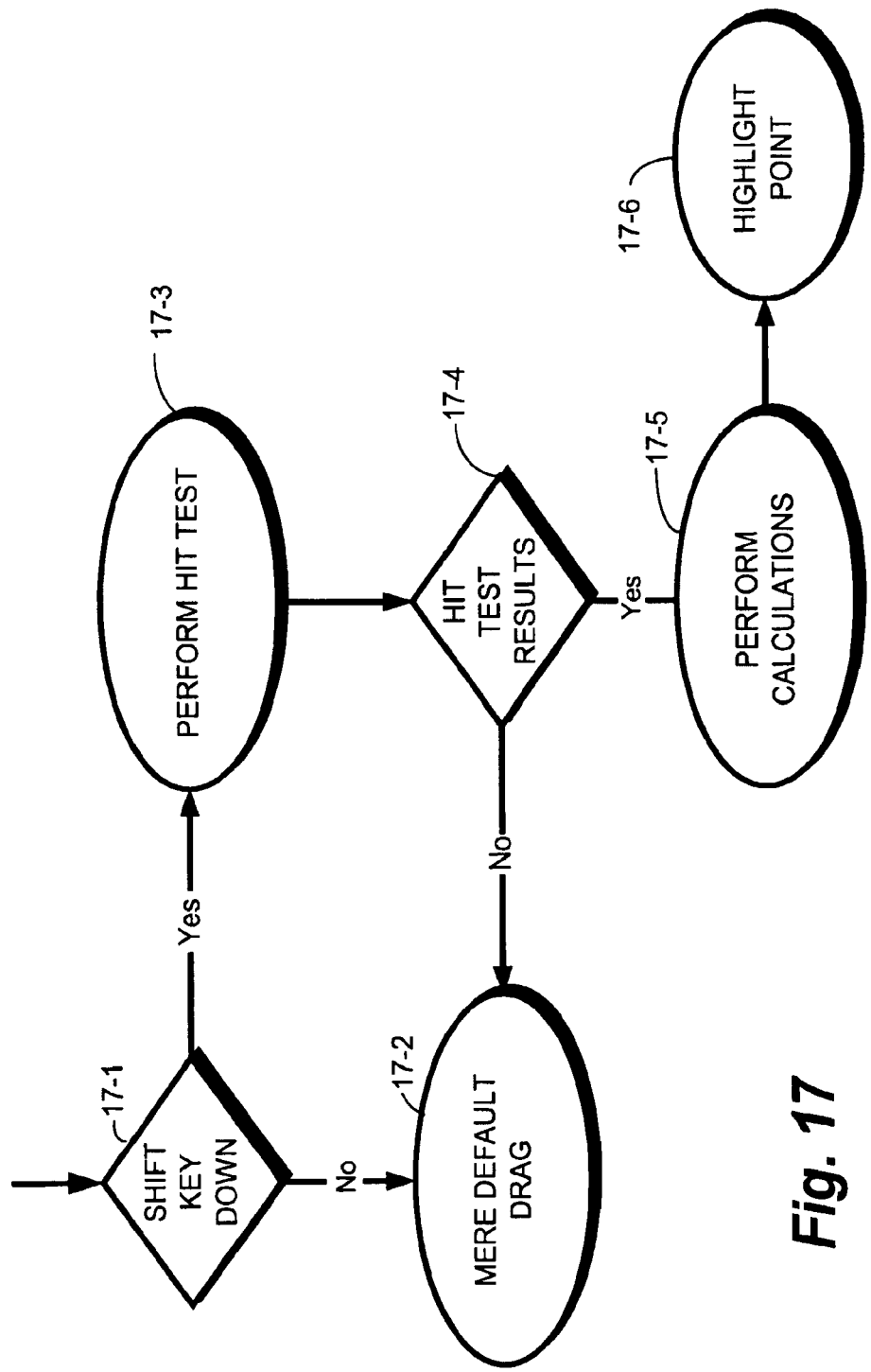
FIG. 17 is a diagrammatic view showing example actions involved in smart snap scenarios of the invention.

FIG. 17 shows basic steps performed by computer program 190 during a SmartSnap™ operation. The steps of FIG. 17 assume that a handle of a solid shape has been selected and is being dragged, resulting in a hot draw event. In fact, a hot draw event occurs upon each predetermined incremental move of the handle. As shown by step 17-1, upon occurrence of each hot draw event a check is first made whether the shift key of the keyboard has been depressed. If the shift key has not been depressed, computer program 190 concludes that a mere default ("free") drag is to be performed and at step 17-2 causes various free drag updating operations (e.g., an updating of the highlighting of the position of the sizebox and handle). Otherwise, computer program 190 realizes that a SmartSnap™ operation is in effect, and as a result at step 17-3 performs a hit test. The hit test results are checked at step 17-4 to determine whether the cursor C (which is dragging the handle) has hit any three dimensional face, edge, vertex, or geometrical point. If the hit test results are negative, the computer program 190 performs for this hot draw event as it would for a free drag (e.g., executes step 17-2). When at step 17-4 the results of the hot test are positive, indicating that a three dimensional feature was hit, at step 17-5 computer program 190 performs calculations to determine what point or features should be highlighted, and then at step 17-6 causes a highlight of the point or features as calculated at step 17-6.

FIG. 17 thus reflects actions occurring for a potential series of hot draw events accompanying progressive movement of the cursor C dragging the handle. The events of FIG. 17 are repeated as appropriate for each move of cursor C as long as the mouse drags the handle. When the dragging of the handle ends, the handle is repositioned at the last position of the cursor C. Thus, it is possible in a scenario such as that of FIG. 16B, for example, that in dragging the handle 1622 leftward across the screen several features may be hit and highlighted in progressive fashion as the cursor C roams. However, the final position of the handle (and of the shape owning the handle) will be determined by which feature is selected upon the end of the drag of the handle.

Figure 18:
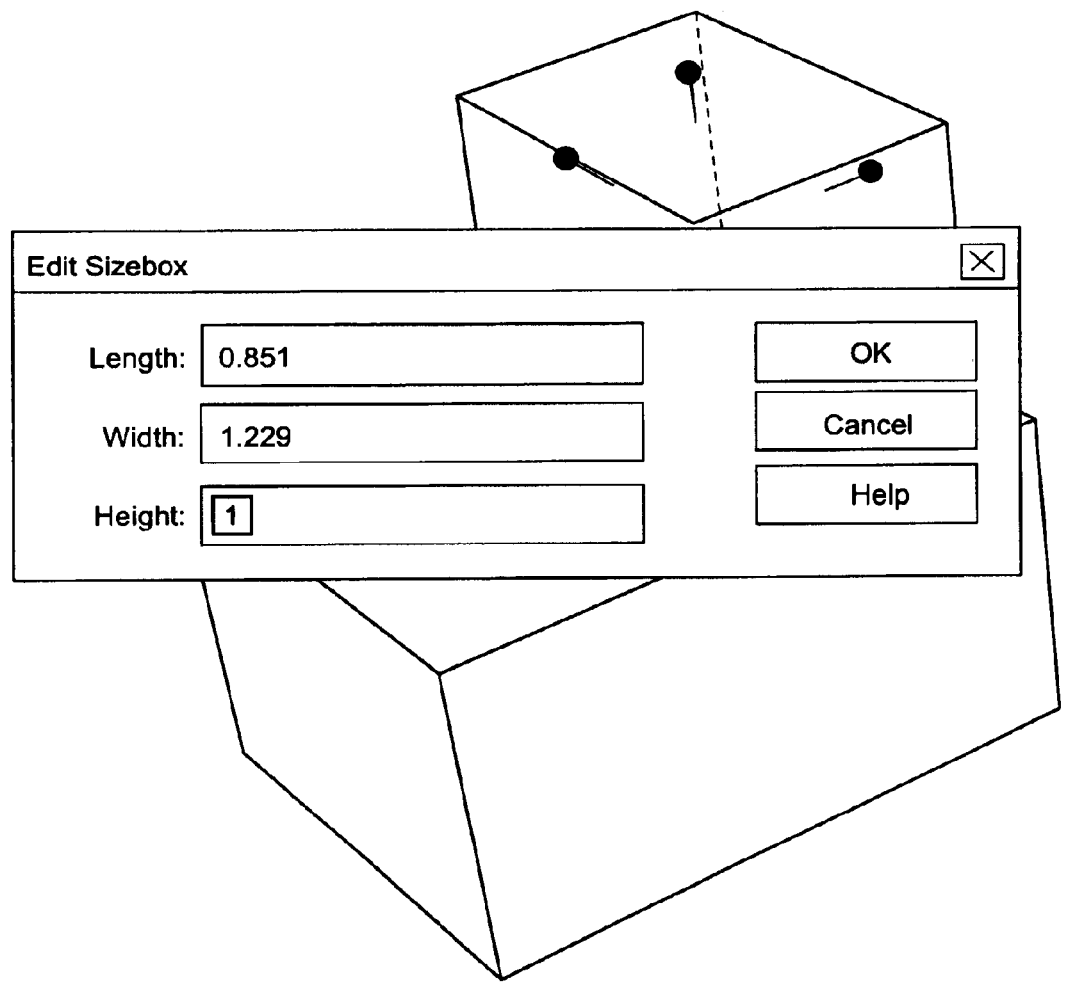
FIG. 18 is a diagrammatic view showing an edit sizebox dialog box according to an aspect of the invention.

FIG. 18 shows that a shape or edit parameter that is represented by a handle can be edited directly by the user by opening up an edit dialog box. The edit dialog box is accessible from the "Edit" command of the handle menu of FIG. 15.

Figure 19A:
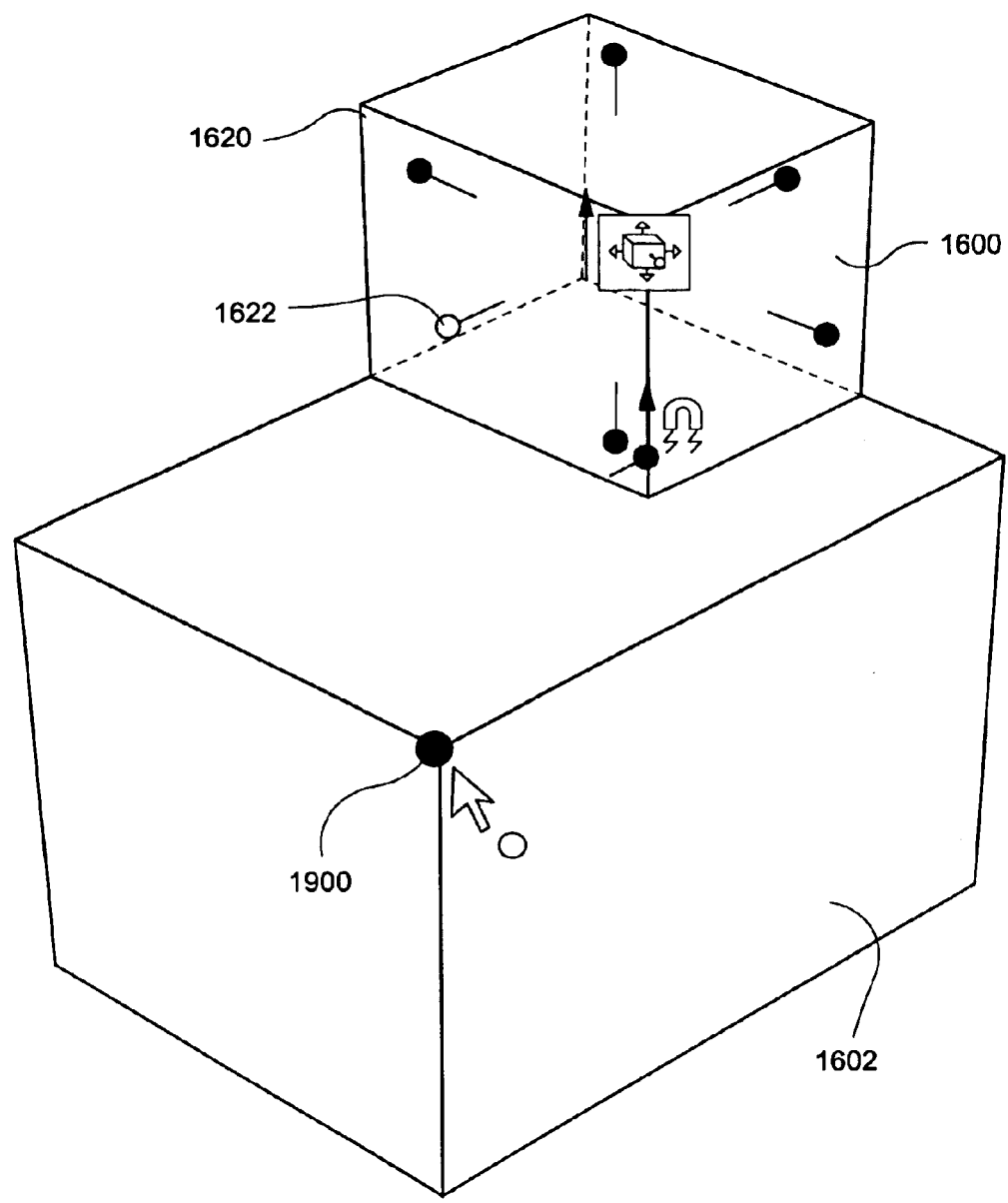
FIG. 19A and FIG. 19B are diagrammatic views illustrating a To Point handle operation according to an aspect of the invention.
Figure 19B:
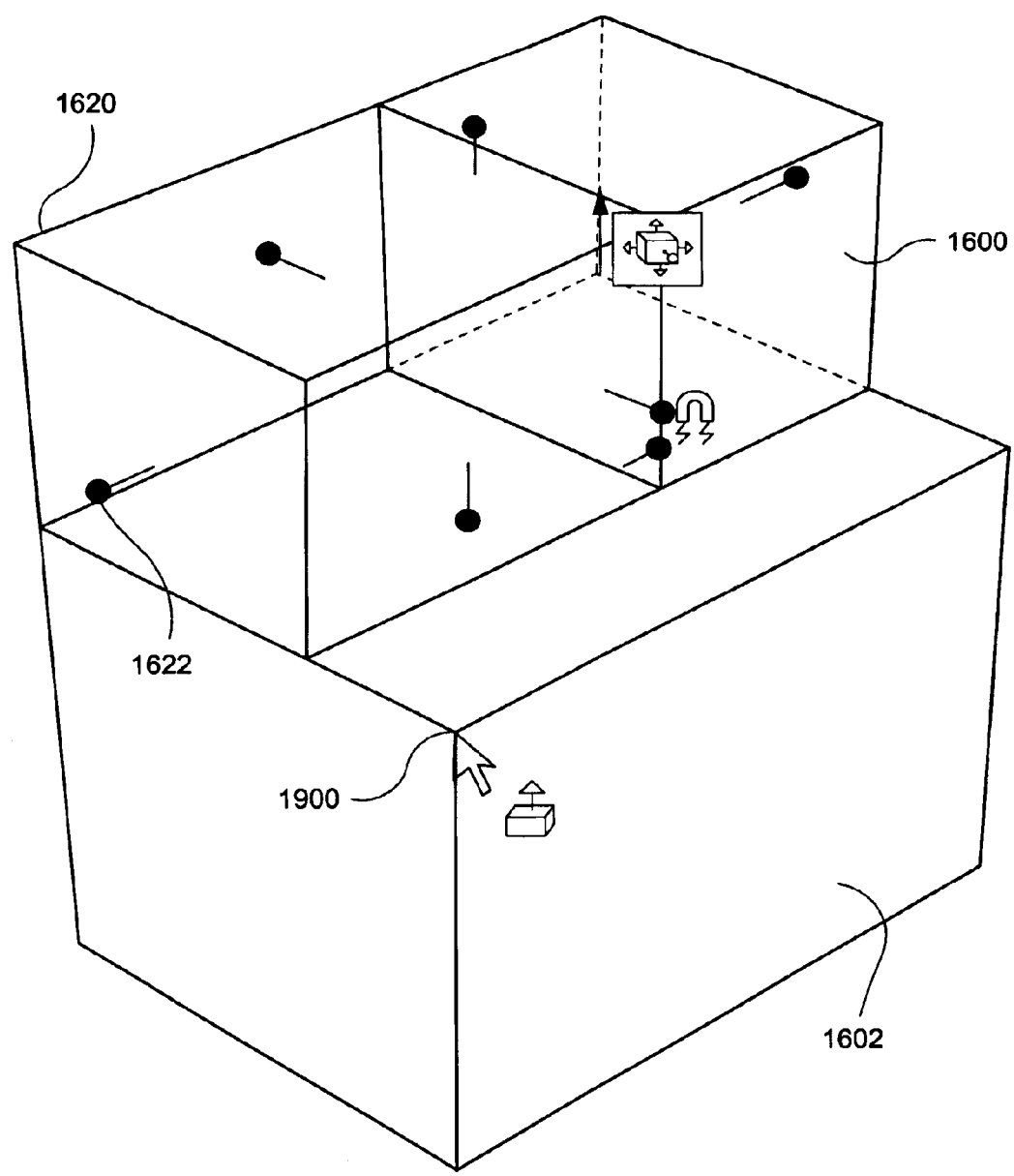

The "To Point" operation shown in the handle menu of FIG. 15 allows another direct method for the user to move a handle so that it is aligned with a specific point on a solid shape. FIG. 19A shows handle 1622 of sizebox 1620 of top box 1600 as again having been selected. The handle menu of FIG. 15 is then accessed by (after selection of handle 1622) clicking on the right mouse button (the menu is not shown in FIG. 19A), and the "To Point" option of the menu is selected. The user then moves the cursor C to point 1900 as highlighted in FIG. 19A, the point 1900A being on a top corner of the lower box 1602. Upon clicking of the mouse with the cursor C at point 1900, the handle 1622 and sizebox 1620 are respositioned/resized in the manner illustrated in FIG. 19B. For sake of contrast, FIG. 19B does shows only the sizebox 1620 as being resized, but it should be understood that upon the clicking on point 1900 the entire box 1600 is resized in the same manner as sizebox 1620.

Figure 20A:
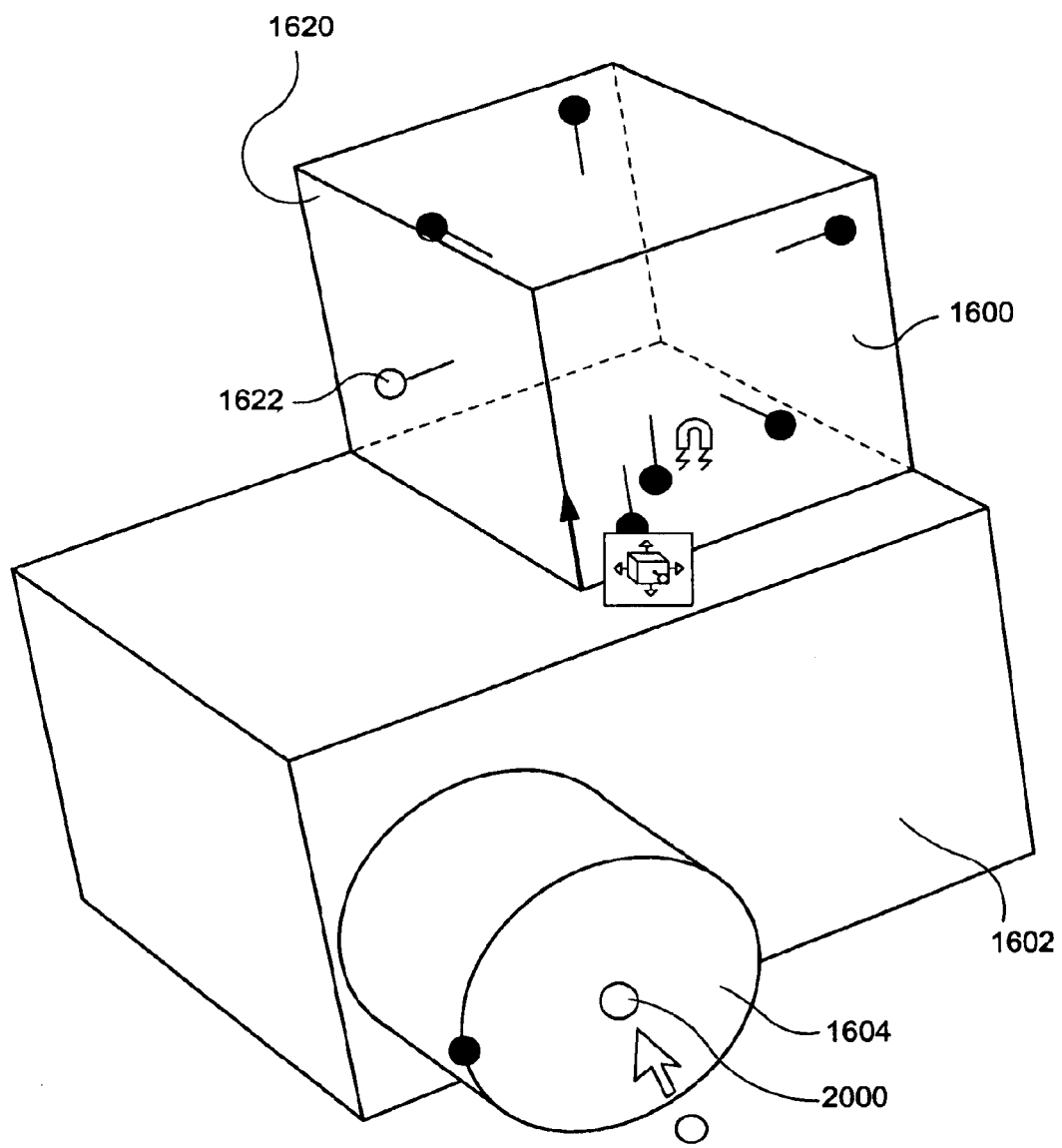
FIG. 20A and FIG. 20B are diagrammatic views illustrating a To Center Point operation according to an aspect of the invention.
Figure 20B:
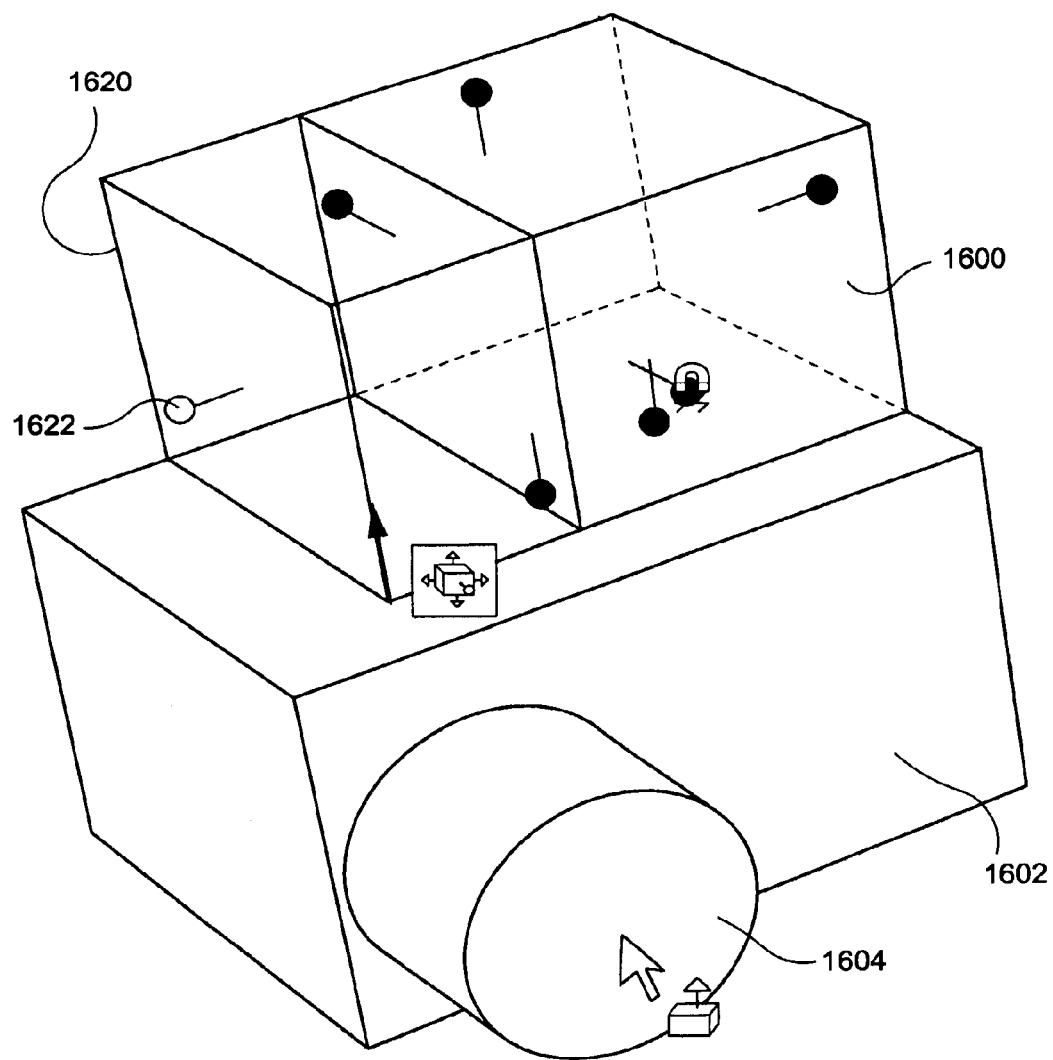

The "To Center Point" operation shown in the handle menu of FIG. 15 allows a direct method for the user to move a handle so that it is aligned with a center point on a face of a solid shape. FIG. 20A shows the same top block 1600 (with its sizebox 1620) and lower block 1602 as illustrated previously, but with lower block 1602 having a cylindrical solid shape 1604 formed on a front side surface thereof. FIG. 20A shows handle 1622 of sizebox 1620 of top box 1600 as again having been selected. The handle menu of FIG. 15 is then accessed by (after selection of handle 1622) clicking on the right mouse button (the menu is not shown in FIG. 20A), and the "To Center Point" option of the menu is selected. The user then moves the cursor C to point 2000 as highlighted in FIG. 20A. The point 2000 is on a center line of the cylindrical solid shape 1604, and lies on the front surface of solid shape 1604. Upon clicking of the mouse with the cursor C at point 2000, the handle 1622 and sizebox 1620 are respositioned/resized in the manner illustrated in FIG. 20B. For sake of contrast, FIG. 20B does shows only the sizebox 1620 as being resized, but it should be understood that upon the clicking on point 2000 the entire box 1600 is resized in the same manner as sizebox 1620.

Figure 21:
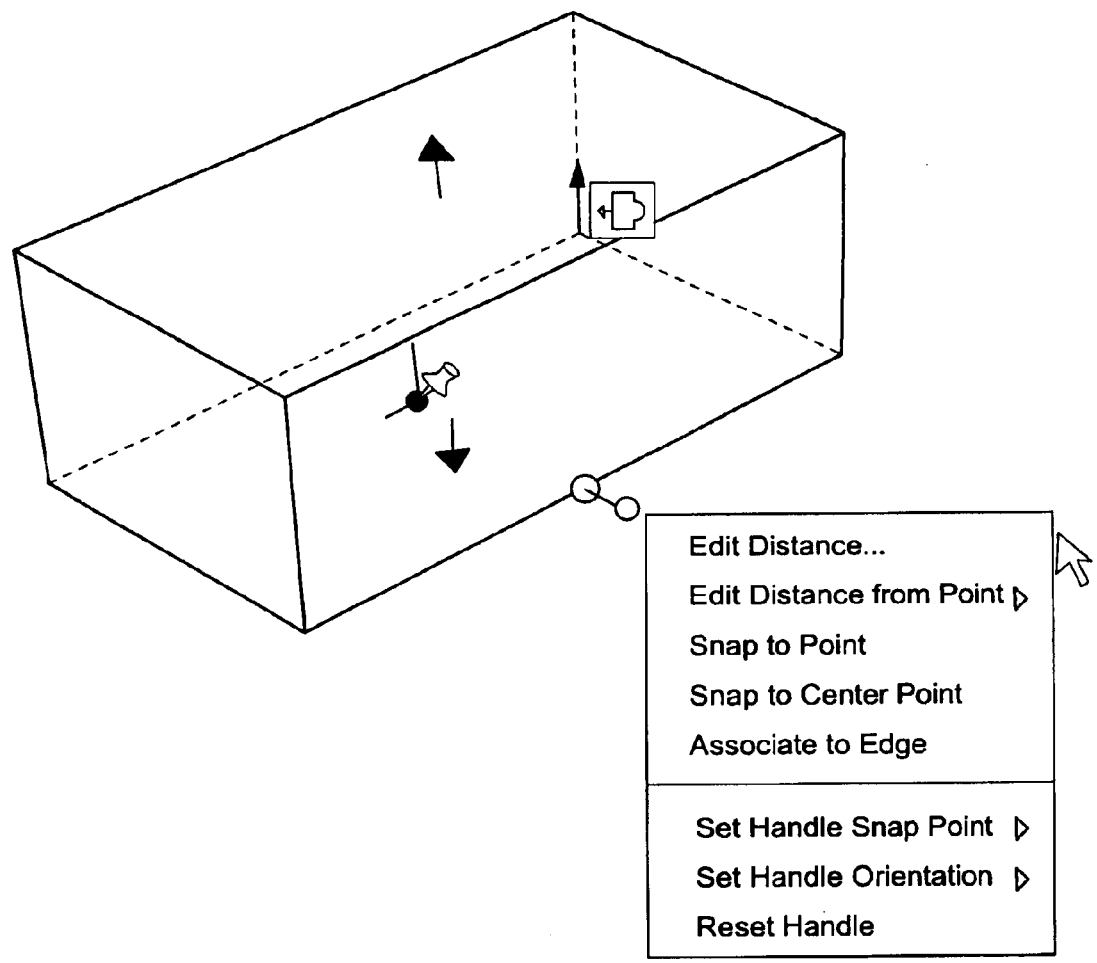
FIG. 21 is a diagrammatic view showing another handle edit menu according to an aspect of the invention.

The computer program 190 also provides yet other features for various editing handles. These features include (1) the ability of a user to specify an offset distance to move a selected handle relative to a chosen point; (2) the ability for the user to specify a snap point other than the default snap point; (3) the ability of the user to orient the handle away from its default orientation; and (4) the display of dimensional feedback. FIG. 21 shows a menu which, after selection of a profile handle, is generated upon right a right mouse click. The menu of FIG. 21 also subsumes the features of menu FIG. 15, with the "Edit Sizebox", "To Point", and "To Center Point" options of FIG. 15 corresponding to the "Edit Distance", "Snap to Point", and "Snap to Center Point" options of the menu of FIG. 21.

Figure 22A:
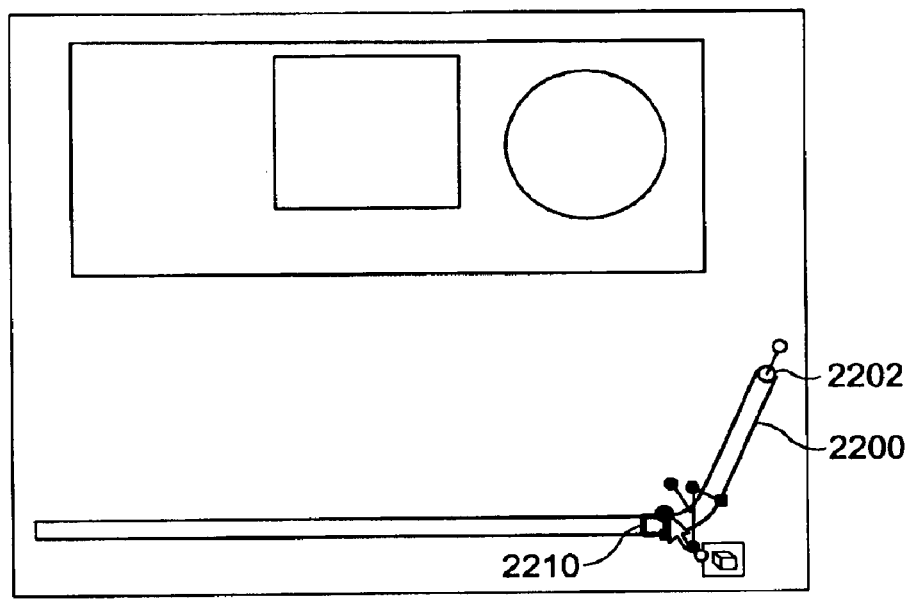
FIG. 22A and FIG. 22B are diagrammatic views showing an Edit Distance From Point operation for a handle according to an aspect of the present invention.
Figure 22B:
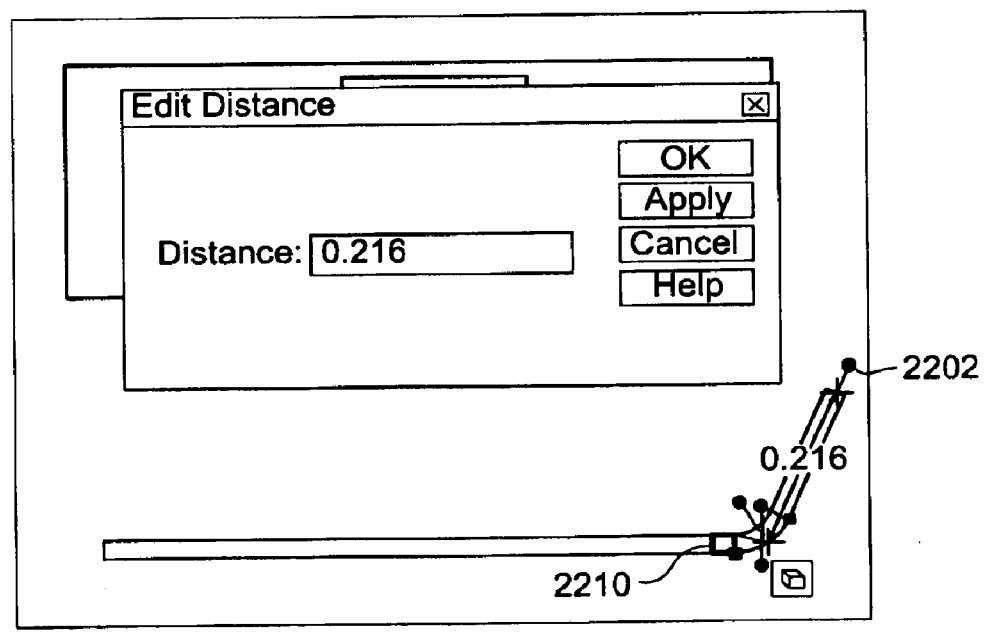

The "Edit Distance From Point" feature option of the menu of FIG. 21 is illustrated in FIG. 22A–FIG. 22D. The "Edit Distance From Point" feature option is an advanced version of the "To Point" option, allowing the user to define a point to which to align the handle by specifying a point and an offset from the point along the direction of the handle. FIG. 22A–FIG. 22D show a sequence of example steps involved in the "Edit Distance From Point" feature option, illustrating particularly a sheet metal bend solid shape. FIG. 22A–FIG. 22D shows a solid shape 2200 having a selected handle 2202. After selection of point 2202, a right mouse click is performed to display the menu of FIG. 21, from which the "Edit Distance From Point" menu option is selected (not shown in FIG. 22A). FIG. 22A shows the next user selecting a point 2210 that defines the "From Point". Upon selection of the "From Point" 2210, the dialog box of FIG. 22B appears. The distance currently appearing in the dialog box of FIG. 22B is the distance currently separating the handle 2202 from the "From Point" 2210 along the axis of the handle 2202. Advantageously, dimensional feedback is provided to the user on the screen. FIG. 22C shows that the user can edit the value in the dialog box, so that a new (edited) value appears in the dialog box as shown in FIG. 22C. Then, when the user selects the "apply" button of the dialog box of FIG. 22C, the handle 2202 moves along the direction of the handle axis to the specified offset distance entered in the dialog box. Thus, whereas in FIG. 22B handle 2202 was separated from point 2210 by 0.216 units, after editing (as shown in FIG. 22C) the handle 2202 is separated from point 2210 by 0.500 units.

Figure 23:
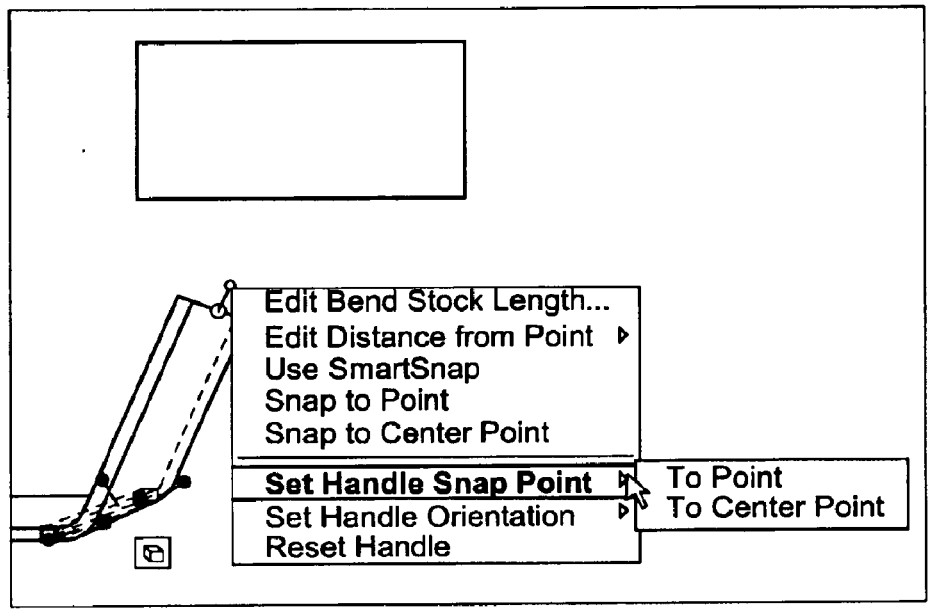
FIG. 23 is a diagrammatic view showing another handle edit submenu according to an aspect of the invention.

As mentioned above, the user has the ability to specify a snap point other than the default snap point. Basic handle functionality assumes that the snap point is the point at which the handle is attached, e.g., the handle base point. Handles that implement the snap point repositioning capability display the snap point as a white dot at the base of the handle when the handle is selected, which is a contrasting representation compared to handles which do not have snap point repositioning capability. In accordance with the present invention, the user may move the snap point by either of two operations/commands. A first snap point repositioning command is the "Set Handle Snap Point→To Point" operation/command; the second snap point repositioning command is the "Set Handle Snap Point→To Center Point" operation/command. FIG. 23 shows a submenu that appears when the user selects the "Set Handle Snap Point" option on the menu of FIG. 21, the submenu of FIG. 23 including both the "To Point" to "To Center Point" suboptions.

Figure 24A:
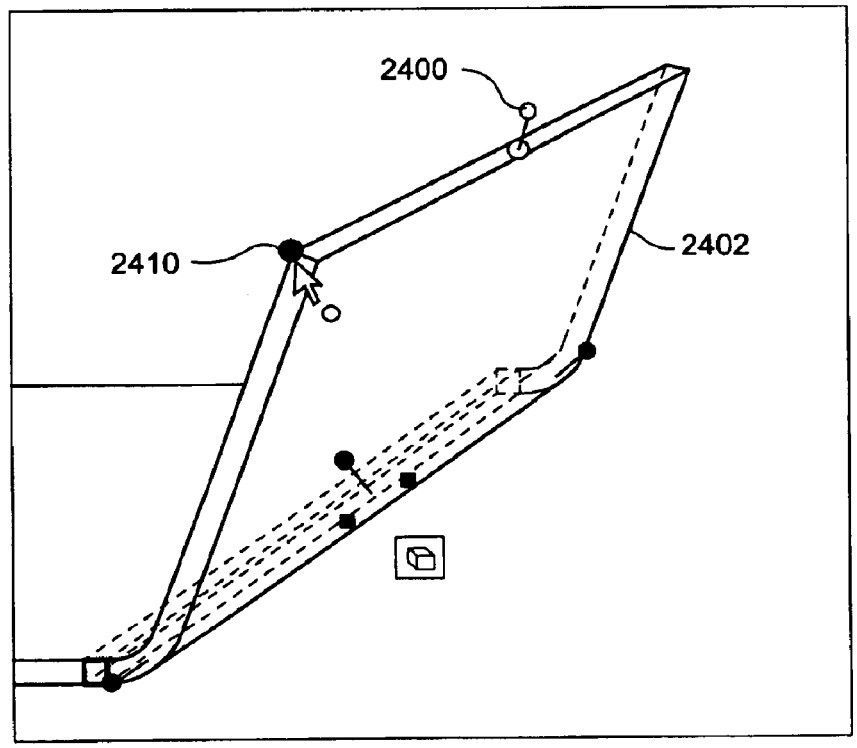
FIG. 24A and FIG. 24B are diagrammatic views showing a Set Handle Snap Point to Point operation according to an aspect of the present invention.
Figure 24B:
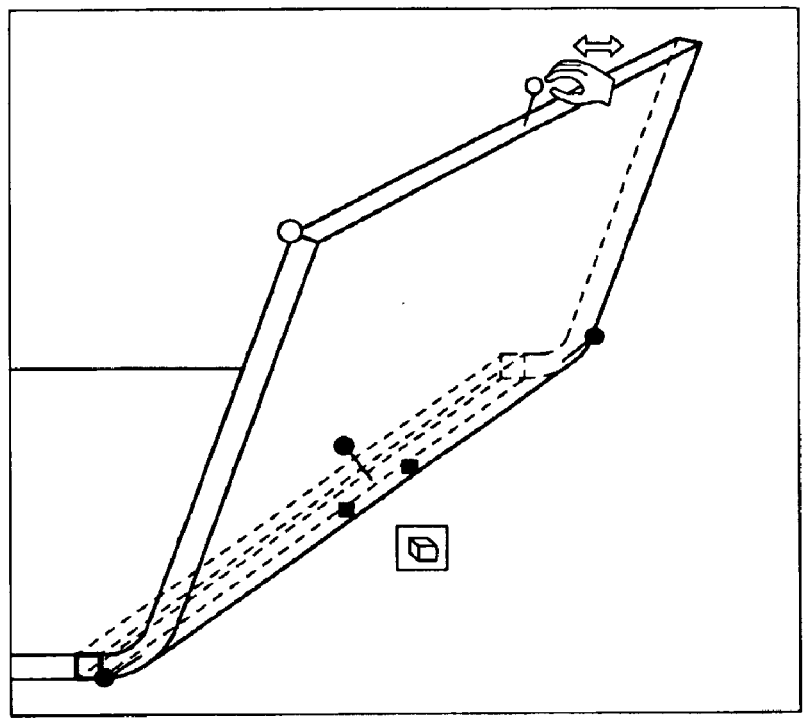

The Set Handle Snap Point→To Point operation is illustrated in FIG. 24A and FIG. 24B. FIG. 24A shows a handle 2400 which, after selection, has a white dot 2402 appearing at the base of the handle. The position of the white dot 2402 in FIG. 24A is the default snap point location. After a right mouse click (handle 2400 having been selected), the menu of FIG. 21, appears, from which the user selects the "Set Handle Snap Point" option, prompting the display of the menu of FIG. 23, from which the user selects the "To Point" option (for simplicity, the menus of FIG. 21 and FIG. 23 are not illustrated in the FIG. 24A, FIG. 24B scenario). FIG. 24A further shows, after the foregoing steps, the user selecting a reposition point (shown as point 2410 in FIG. 24A, pointed to by the white arrow and trailing white dot) to which the snap point will be moved. After moving to and selecting the reposition point 2410, future selections of the handle 2400 will result in the snap point being displayed at the repositioned location, in the manner shown in FIG. 24B.

Figure 25A:
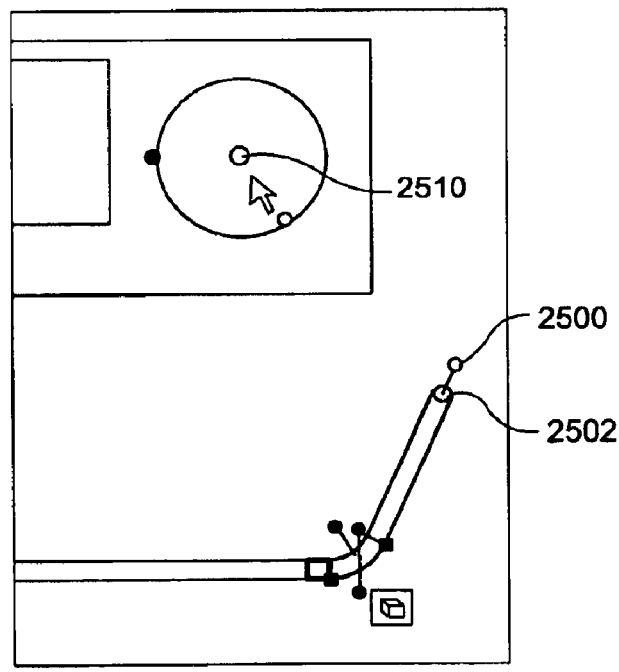
FIG. 25A and FIG. 25B are diagrammatic views showing a Set Handle Snap Point to Center Point operation according to an aspect of the present invention.
Figure 25B:
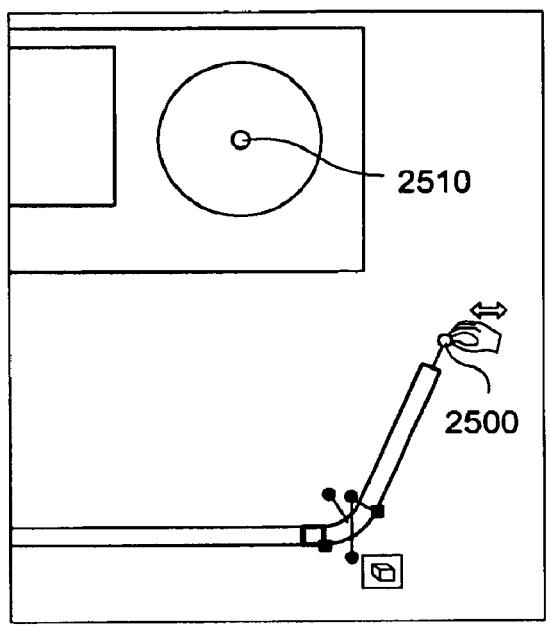

The Set Handle Snap Point→To Center Point operation is illustrated in FIG. 25A and FIG. 25B. FIG. 25A shows a handle 2500 which, after selection, has a white dot 2502 appearing at the base of the handle. The position of the white dot 2502 in FIG. 25A is the default snap point location. After a right mouse click (handle 2500 having been selected), the menu of FIG. 21, appears, from which the user selects the "Set Handle Snap Point" option, prompting the display of the menu of FIG. 23, from which the user selects the "To Center Point" option (for simplicity, the menus of FIG. 21 and FIG. 23 are not illustrated in the FIG. 25A, FIG. 25B scenario). FIG. 25A further shows, after the foregoing steps, the user selecting a reposition point on a face of another shape (shown as point 2510 in FIG. 25A, pointed to by the white arrow and trailing white dot) to which the snap point will be moved. After moving to and selecting the reposition point 2510, future selections of the handle 2500 will result in the snap point being displayed at the repositioned location, in the manner shown in FIG. 25B.

In connection with the Set Handle Snap Point→To Point operation illustrated in FIG. 24A and FIG. 24B, and the Set Handle Snap Point→To Center Point operation illustrated in FIG. 25A and FIG. 25B, it is to be noted that the UI Sizebox Handle Object 811 (FIG. 6C) and the UI Profile Handle Object 816 (FIG. 6D) each have an interface m_snapPt_position which can be utilized to change the snap point position data for the handle object. The changing of the snap point relocation operations result in changes being applied over the m_snapPt_position interface to the respective objects.

Figure 33B:
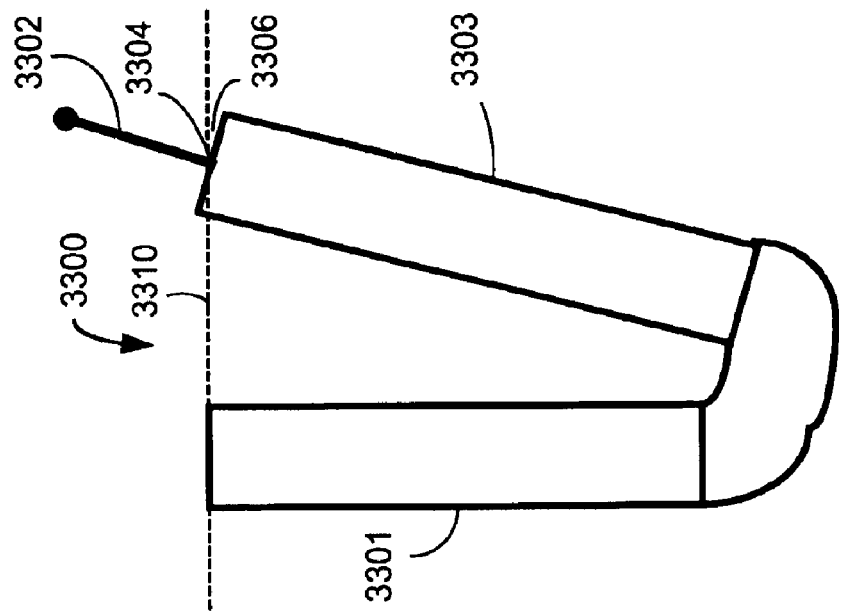
Figure 33A:
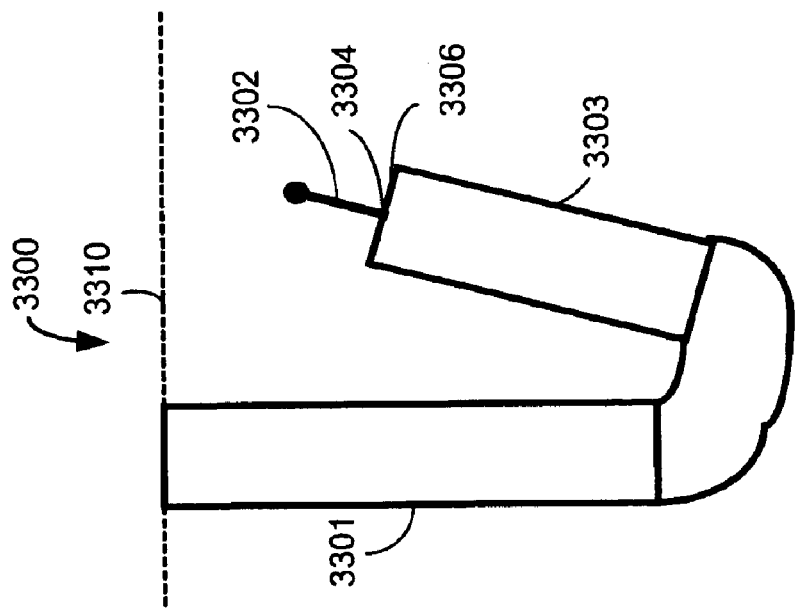

An example of utilization of the snap point relocation (Set Handle Snap Point) feature of the present invention is illustrated in FIG. 33A–FIG. 33D. The solid part of FIG. 33A is a side view of a three dimensional sheet metal bend 3300, with only two dimensions of the sheet metal bend 3300 being illustrated. The sheet metal bend 3300 has two flanges or legs, particularly flange 3301 and 3303. Flange 3301 is vertically upright and has a longer length in the vertical direction than flange 3303, flange 3303 not being upright (e.g., not parallel to flange 3301). Sheet metal bend 3300 has handle 3302 as one of its handles (other handles not being illustrated for sake of simplicity in FIG. 33A). The handle 3302 is positioned on flange 3303 such that its base point 3304 is at a midpoint of a surface 3306. Suppose that it is desired to use handle 3302 to elongate flange 3303 so that the highest point on flange 3303 is aligned with dashed line 3310 in FIG. 33A. If the SmartSnap™ features of the present invention are utilized with handle base 3304 being the snap point (which it is by default), then dragging of handle 3302 in a SmartSnap™ operation will result in base point 3304 being aligned with dashed line 3310, as shown in FIG. 33B. But the objective is to have the that the highest point on flange 3303 is aligned with dashed line 3310. By changing the snap point to point 3320 on flange 3303 in the manner shown in FIG. 33C and described in greater detail above, then the SmartSnap™ operation can be conducted in the manner illustrated in FIG. 33D, so that point 3320 of flange 3303 is aligned with dashed line 3310 during the SmartSnap™ operation. In other words, the geometric comparisons during the dragging of the handle 3302 during the SmartSnap™ operation are performed relative to point 3310 rather than point 3304, with the result that the automatic or Smart alignment occurs when point 3310 is aligned with the plane depicted by line 3310.

As also mentioned above, the user further has the ability to orient the handle away from its default orientation. The basic handle functionality fixes the handle direction to a preset orientation. The ability to orient the handle allows the handle to be more powerfully used to specify handle displacements that are relative to geometry in the scene. There are six different methods for reorienting handle geometry, illustrated in the submenu of FIG. 26 upon selection of the "Set Handle Orientation" option of the menu of FIG. 21. These six methods are (1) "To Point"; (2) "To Center Point"; (3) "Point To Point"; (4) "Parallel To Edge"; (5) "Perpendicular To Face", and (6) "Parallel to Axis".

Figure 26:
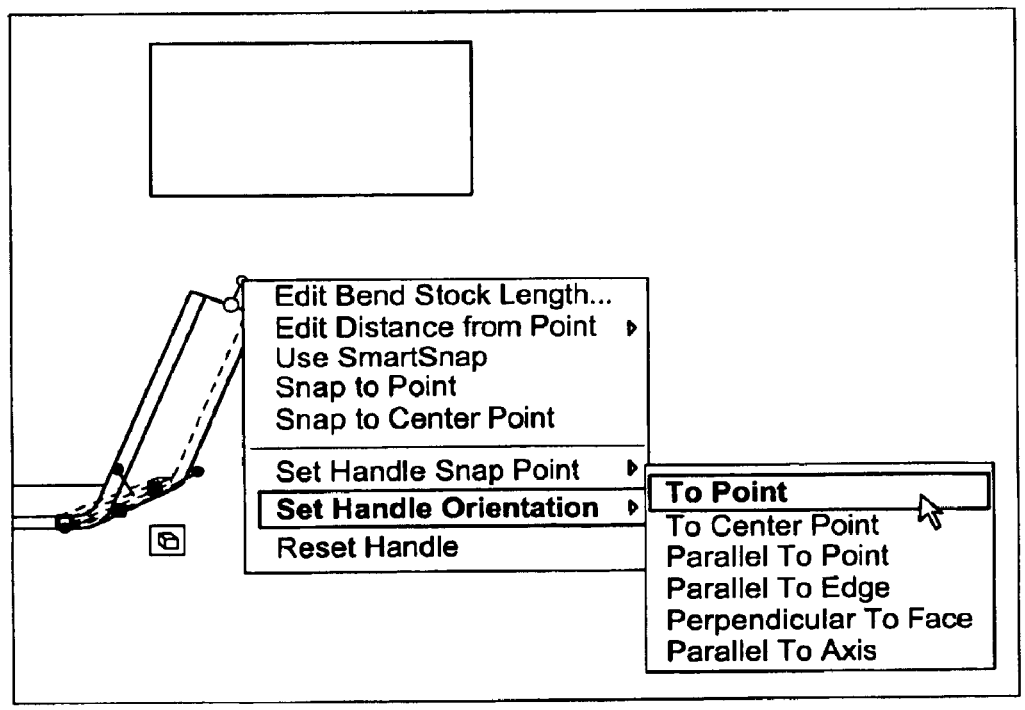
FIG. 26 is a diagrammatic view showing handle reorientation submenu according to an aspect of the invention.
Figure 27A:
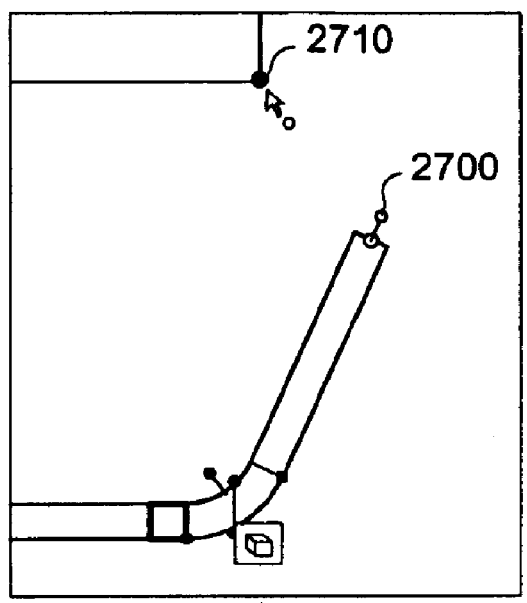
FIG. 27A and FIG. 27B are diagrammatic views showing a "To Point" Handle Reorientation operation according to an aspect of the invention.
Figure 27B:
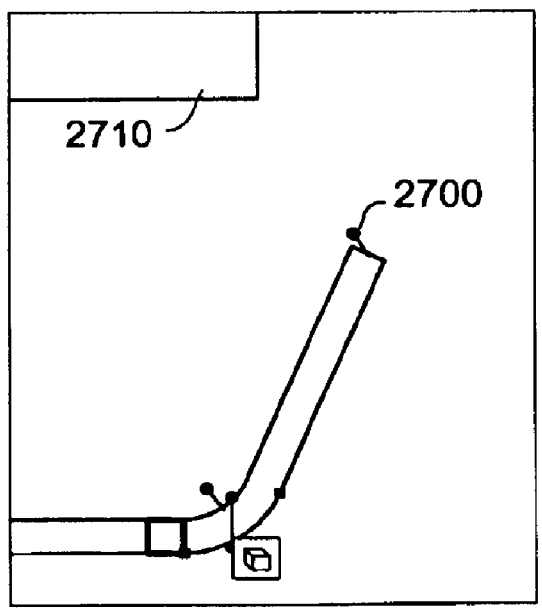

The "To Point" Handle Reorientation operation is illustrated in FIG. 27A and FIG. 27B. As shown in FIG. 27A, the user has selected a handle 2700 whose base appears as a white dot. After a right mouse click (handle 2700 having been selected), the menu of FIG. 21, appears, from which the user selects the "Set Handle Orientation" option, prompting the display of the menu of FIG. 26, from which the user selects the "To Point" option (for simplicity, the menus of FIG. 21 and FIG. 26 are not illustrated in the FIG. 27A, FIG. 27B scenario). FIG. 27A further shows, after the foregoing steps, the user selecting a point, e.g., a point on another shape (shown as point 2710 in FIG. 27A, pointed to by the white arrow and trailing white dot). After moving to and selecting the point 2710, the handle 2700 is reoriented so that the handle 2700 is now aligned with (parallel to) an imaginary straight line connecting the base point of the handle and the selected point 2710 in the manner shown in FIG. 27B. In other words, the stem of the handle (which connects the handle base point and the handle knob) is parallel to the imaginary straight line connecting the base point of the handle and the selected point 2710.

Figure 28A:
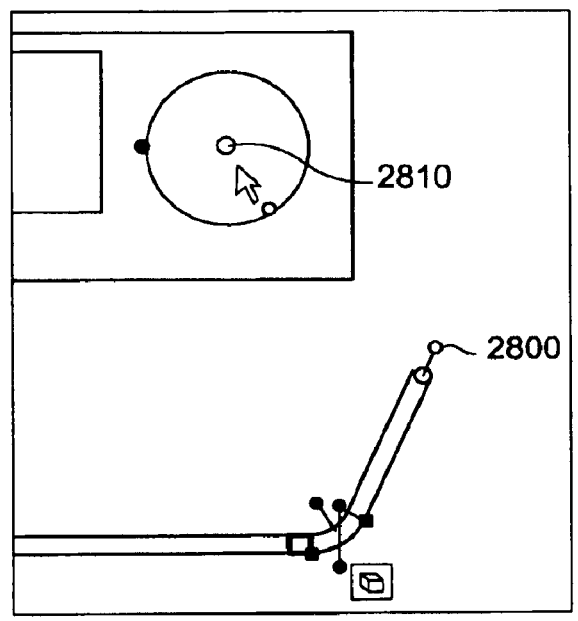
FIG. 28A and FIG. 28B are diagrammatic views showing a "To Center Point" Handle Reorientation operation according to an aspect of the invention.
Figure 28B:
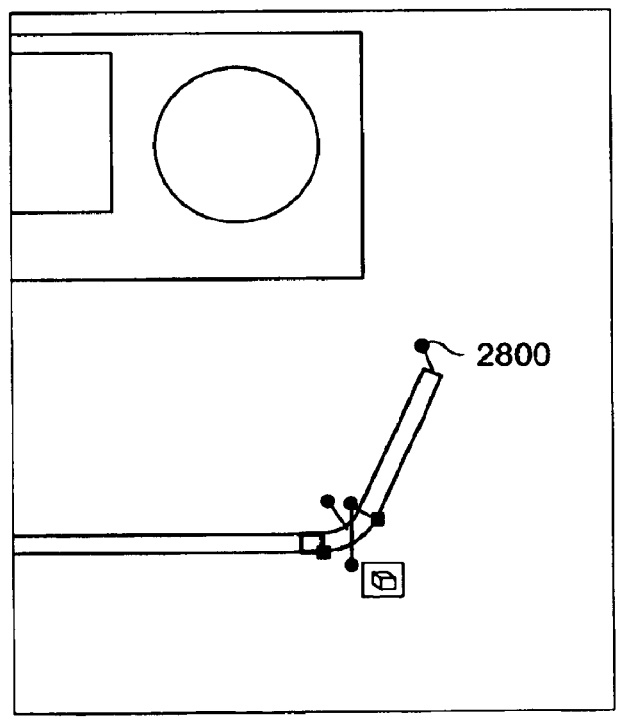

The "To Center Point" Handle Reorientation operation is illustrated in FIG. 28A and FIG. 28B. As shown in FIG. 28A, the user has selected a handle 2800 whose base appears as a white dot. After a right mouse click (handle 2800 having been selected), the menu of FIG. 21, appears, from which the user selects the "Set Handle Orientation" option, prompting the display of the menu of FIG. 26, from which the user selects the "To Center Point" option (for simplicity, the menus of FIG. 21 and FIG. 26 are not illustrated in the FIG. 28A–FIG. 28B scenario). FIG. 28A further shows, after the foregoing steps, the user selecting a face, e.g., a face on another shape (shown as a circular face with center point 2810 in FIG. 28A, pointed to by the white arrow and trailing white dot). After moving to and selecting the face 2810, the handle 2800 is reoriented so that the handle 2800 is now aligned with (parallel to) an imaginary straight line connecting the base point of the handle and the center point of the selected face 2810 in the manner shown in FIG. 28B.

Figure 29A:
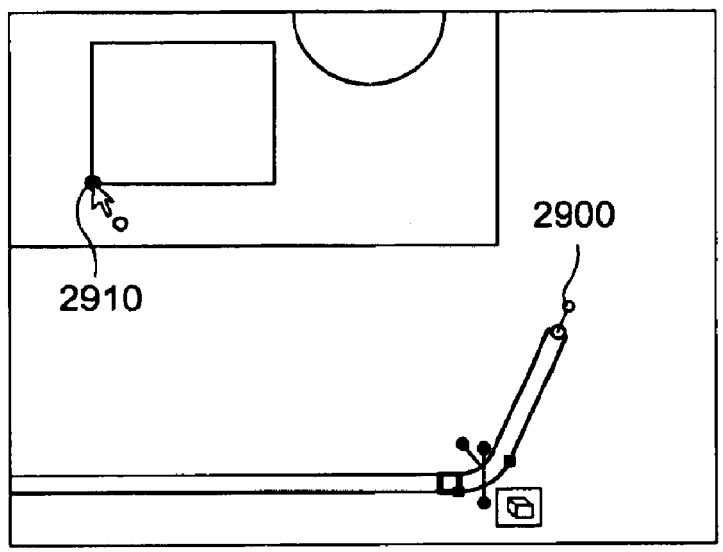
FIG. 29A–FIG. 29C are diagrammatic views showing a "Point To Point" Handle Reorientation operation according to an aspect of the invention.
Figure 29B:
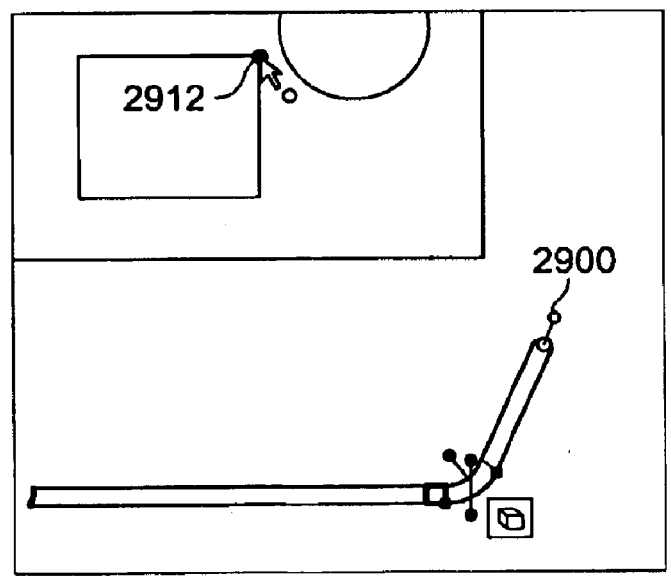
Figure 29C:
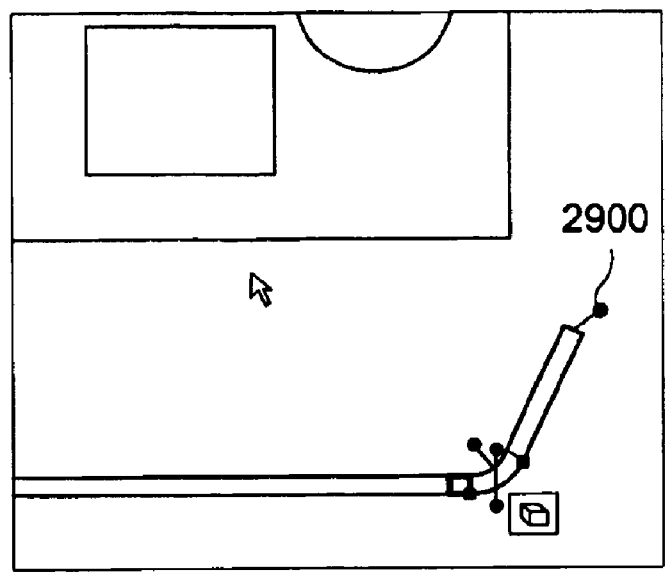

The "Point To Point" Handle Reorientation operation is illustrated in FIG. 29A–FIG. 29C. As shown in FIG. 29A, the user has selected a handle 2900 whose base appears as a white dot. After a right mouse click (handle 2900 having been selected), the menu of FIG. 21, appears, from which the user selects the "Set Handle Orientation" option, prompting the display of the menu of FIG. 26, from which the user selects the "Point To Point" option (for simplicity, the menus of FIG. 21 and FIG. 26 are not illustrated in the FIG. 28A–FIG. 29C scenario). FIG. 29A further shows, after the foregoing steps, the user selecting a first point, e.g., a point on another shape (shown as point 2910 in FIG. 29A, pointed to by the white arrow and trailing white dot). After moving to and selecting the point 2910, the user moves the cursor to a second point (shown as point 2912 in FIG. 29B, pointed to by the white arrow and trailing white dot in FIG. 29B). Upon selecting (clicking on) the second point 2920, the handle 2900 is reoriented so that the handle 2900 is now aligned with (parallel to) an imaginary straight line connecting the first point 2910 and the second point 2920 in the manner shown in FIG. 29C.

Figure 30A:
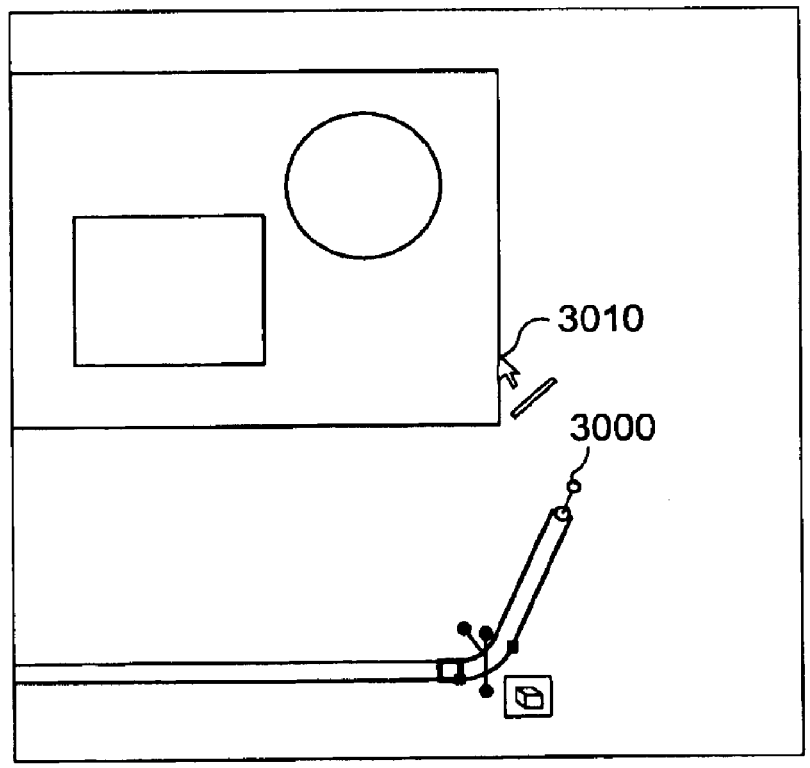
FIG. 30A and FIG. 30B are diagrammatic views showing a "Parallel to Edge" Handle Reorientation operation according to an aspect of the invention.
Figure 30B:
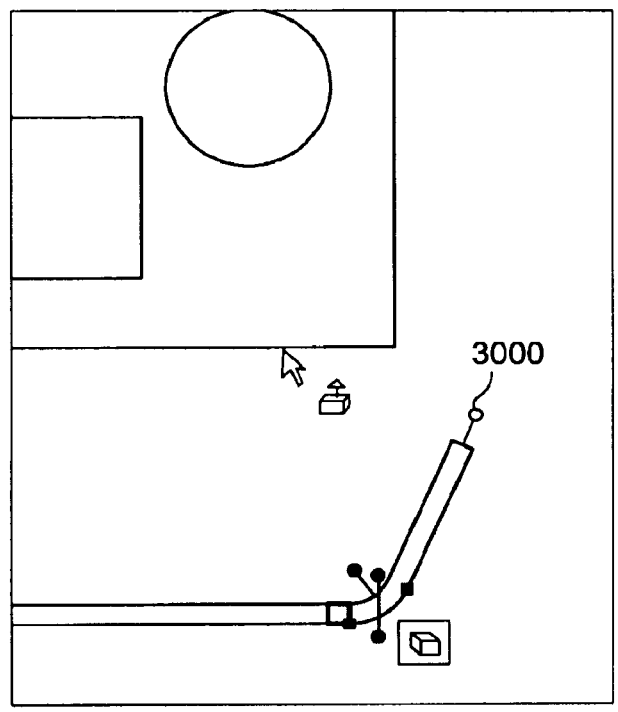

The "Parallel to Edge" Handle Reorientation operation is illustrated in FIG. 30A and FIG. 30B. As shown in FIG. 30A, the user has selected a handle 3000 whose base appears as a white dot. After a right mouse click (handle 3000 having been selected), the menu of FIG. 21, appears, from which the user selects the "Set Handle Orientation" option, prompting the display of the menu of FIG. 26, from which the user selects the "Parallel to Edge" option (for simplicity, the menus of FIG. 21 and FIG. 26 are not illustrated in the FIG.

30A, FIG. 30B scenario). FIG. 30A further shows, after the foregoing steps, the user selecting an edge, e.g., an edge on another shape (shown as edge 3010 in FIG. 30A, pointed to by the white arrow and trailing white edge line). Upon selecting (clicking on) the edge 3010, the handle 3000 is reoriented so that the handle 3000 is now aligned with (parallel to) the selected edge 3010 in the manner shown in FIG. 30B.

Figure 31A:
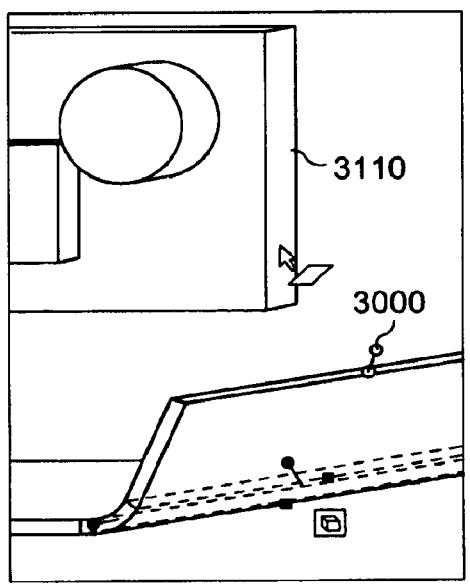
FIG. 31A and FIG. 31B are diagrammatic views showing a "Perpendicular to Face" Handle Reorientation operation according to an aspect of the invention.
Figure 31B:
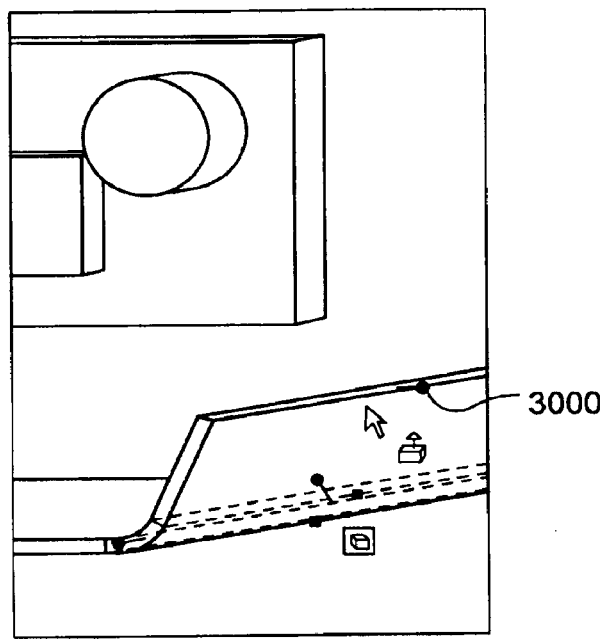

The "Perpendicular to Face" Handle Reorientation operation is illustrated in FIG. 31A and FIG. 31B. As shown in FIG. 31A, the user has selected a handle 3100 whose base appears as a white dot. After a right mouse click (handle 3100 having been selected), the menu of FIG. 21, appears, from which the user selects the "Set Handle Orientation" option, prompting the display of the menu of FIG. 26, from which the user selects the "Perpendicular to Face" option (for simplicity, the menus of FIG. 21 and FIG. 26 are not illustrated in the FIG. 31A, FIG. 31B scenario). FIG. 31A further shows; after the foregoing steps, the user selecting a direction-defining face, e.g., a face on another shape (shown as face 3110 in FIG. 31A, pointed to by the white arrow and trailing white plane). Upon selecting (clicking on) the face 3110, the handle 3100 is reoriented so that the handle 3100 is now aligned with (parallel to) a perpendicular to the selected face 3110 in the manner shown in FIG. 31B.

Figure 32A:
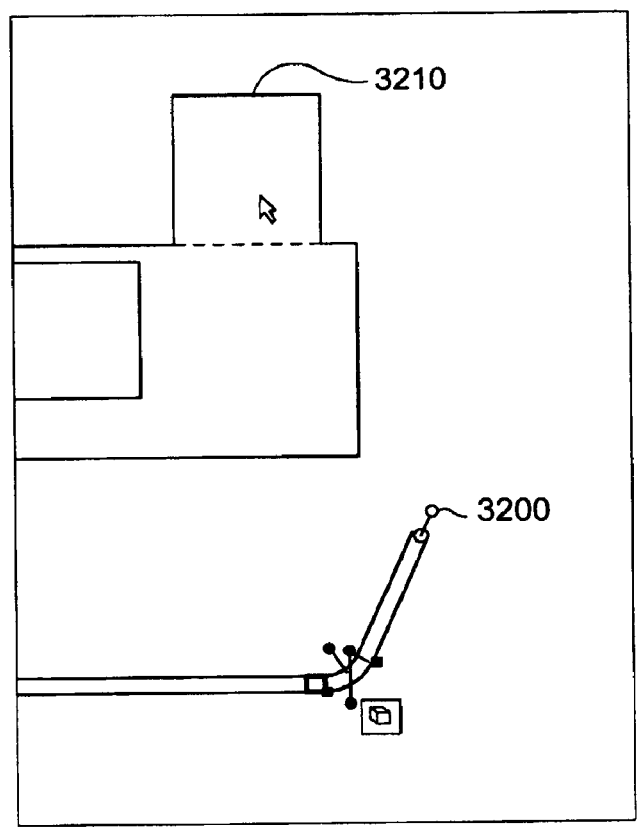
FIG. 32A and FIG. 32B are diagrammatic views showing a "Parallel to Axis" Handle Reorientation operation according to an aspect of the invention.
Figure 32B:
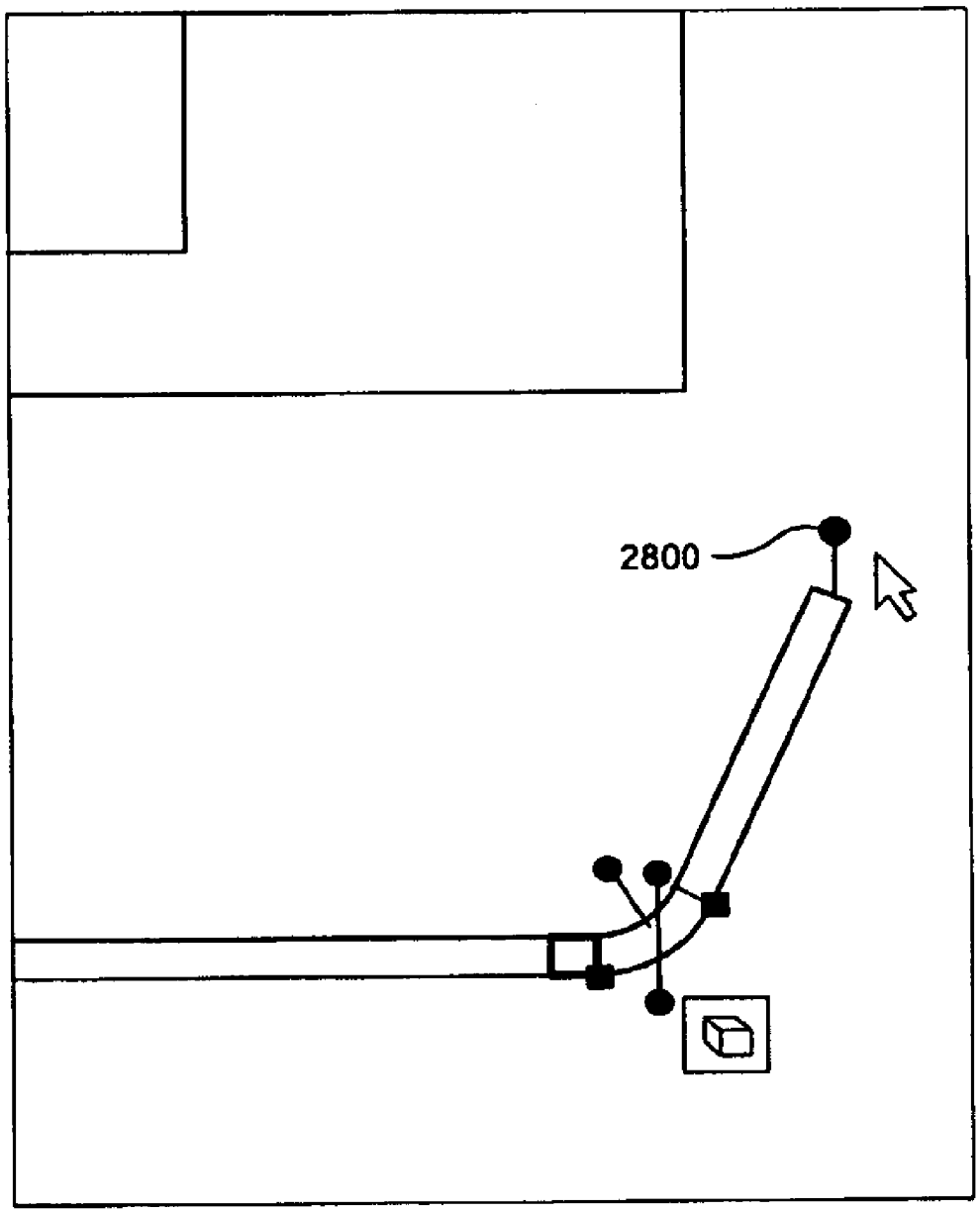

The "Parallel to Axis" Handle Reorientation operation is illustrated in FIG. 32A and FIG. 32B. As shown in FIG. 32A, the user has selected a handle 3200 whose base appears as a white dot. After a right mouse click (handle 3200 having been selected), the menu of FIG. 21, appears, from which the user selects the "Set Handle Orientation" option, prompting the display of the menu of FIG. 26, from which the user selects the "Parallel to Axis" option (for simplicity, the menus of FIG. 21 and FIG. 26 are not illustrated in the FIG. 32A, FIG. 32B scenario). FIG. 32A further shows, after the foregoing steps, the user selecting a face, e.g., a face on another shape (shown as face 3210 in FIG. 32A, pointed to by the white arrow). Upon selecting (clicking on) the face 3210 (the top face of the cylinder), the handle 3200 is reoriented so that the handle 3200 is now aligned with (parallel to) a normal (perpendicular) to the selected face 3210 in the manner shown in FIG. 32B.

In connection with the Handle Reorientation operations described above, it is to be noted that the UI Handle Object 813 (see FIG. 6C and FIG. 6D) each have "direction" data which can be change to in response to a change in handle orientation for the handle object.

The "Reset Handle" option of the menu of FIG. 26 returns the handle orientation back to its default orientation and returns the snap point back to its original position.

At various instances above reference has been made to a neighborhood or certain proximity, as in the case of cursor C roaming into a neighborhood of one of the profile handles 261–265, for example. The person skilled in the art knows how to select the size of specifications of such neighborhood, depending upon various preferences and programming considerations.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

In the example provided above, the sizebox edit view was utilized as the default edit view. It should be understood that such default option can be turned off, so that another edit view (e.g. the profile edit view) becomes the default edit view display.

Advantageously, all editing facilitated by the present invention is accomplished in a three-dimensional editing mode without having to switch to a two-dimensional or other less desirable editing mode.

What is claimed is:

1. A computer program product which provides a visual display of a three dimensional shape upon a display device, the program comprising computer readable coded instructions stored in a memory, the computer readable coded instructions being executable on a processor to which information is input via a user input device; the computer program providing upon execution a graphical user interface for editing a displayed object, the graphical user interface being displayed as a handle which has an attachment point relative to the displayed object, a handle knob, and a handle stem which connects the handle attachment point to the handle knob, and wherein an orientation of the handle stem relative to the displayed object is adjustable using the user input device.

2. The computer program product of claim 1, wherein the orientation of the handle stem is adjustable to be aligned with an imaginary line connecting the handle attachment point and a point specified by the user input device.

3. The computer program product of claim 1, wherein the orientation of the handle stem is adjustable to be aligned with an imaginary line connecting the handle attachment point and a center point of a face of a displayed object specified by the user input device.

4. The computer program product of claim 1, wherein the orientation of the handle stem is adjustable to be aligned with an imaginary line connecting the handle attachment point and two points specified by the user input device.

5. The computer program product of claim 1, wherein the orientation of the handle stem is adjustable to be parallel with a selected edge of a displayed object as specified by the user input device.

6. The computer program product of claim 1, wherein the orientation of the handle stem is adjustable to be perpendicular to a selected edge of a displayed object as specified by the user input device.

7. The computer program product of claim 1, wherein the orientation of the handle stem is adjustable to be perpendicular to an axis of a selected face of a displayed object as specified by the user input device.

8. A computer program product which provides a visual display of a three dimensional shape upon a display device, the program comprising computer readable coded instructions stored in a memory, the computer readable coded instructions being executable on a processor to which information is input via a user input device; the computer program providing upon execution a graphical user interface for editing an associated displayed object, the graphical user interface being displayed as a handle;

wherein, after a point in a scene depicted on the display device has been selected by the user input device, the program provides visual feedback regarding a distance currently separating the selected point and the handle;

wherein the program provides means for the user to input a new distance to be used for separating the selected point and the handle, and in response to input of the new distance the program displays the selected point and the handle as being separated by the new distance.

* * * * *